United States Patent
Jung et al.

(10) Patent No.: US 10,630,440 B2
(45) Date of Patent: Apr. 21, 2020

(54) METHOD AND APPARATUS FOR TRANSMITTING AND RECEIVING SIGNAL IN COMMUNICATION NETWORK

(71) Applicant: ELECTRONICS AND TELECOMMUNICATIONS RESEARCH INSTITUTE, Daejeon (KR)

(72) Inventors: Hoi Yoon Jung, Daejeon (KR); Sung Jin Yoo, Daejeon (KR); Jung Sun Um, Daejeon (KR); Seung Keun Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 15/549,413

(22) PCT Filed: Aug. 5, 2016

(86) PCT No.: PCT/KR2016/008658
§ 371 (c)(1),
(2) Date: Aug. 8, 2017

(87) PCT Pub. No.: WO2017/026754
PCT Pub. Date: Feb. 16, 2017

(65) Prior Publication Data
US 2018/0062806 A1    Mar. 1, 2018

(30) Foreign Application Priority Data

Aug. 12, 2015 (KR) .................. 10-2015-0114089
Sep. 24, 2015 (KR) .................. 10-2015-0135749
Oct. 26, 2015 (KR) .................. 10-2015-0149005

(51) Int. Cl.
*H04L 5/00* (2006.01)
*H04J 11/00* (2006.01)
(Continued)

(52) U.S. Cl.
CPC ........ *H04L 5/0048* (2013.01); *H04J 11/0069* (2013.01); *H04L 5/0091* (2013.01);
(Continued)

(58) Field of Classification Search
None
See application file for complete search history.

(56) References Cited

U.S. PATENT DOCUMENTS

2015/0092768 A1    4/2015  Ng et al.
2015/0163008 A1    6/2015  Kim et al.
(Continued)

FOREIGN PATENT DOCUMENTS

KR    10-2015-0088716 A    8/2015
WO    WO 2015/083914 A1    6/2015
(Continued)

OTHER PUBLICATIONS

LG Electronics, "Measurement and synchronization in LAA", 3GPP TSG RAN WG1 Ad-hoc Meeting, Paris, France, Mar. 24-26, 2015, R1-151084 (Year: 2015).*
(Continued)

*Primary Examiner* — Joseph A Bednash
(74) *Attorney, Agent, or Firm* — NSIP Law

(57) ABSTRACT

A method and an apparatus for transmitting and receiving a signal in a communication network are disclosed. A method for operating UE supporting an unlicensed band comprises the steps of: receiving from a base station DMTC-related information including DMTC cycle and DMTC offset; checking DMTC section to which DRS is transmitted based on the DMTC-related information; and receiving from the base station the DRS using sub-frames apart from a sub-frame corresponding to the DRS cycle within the DMTC section. As a result, the performance of a communication network can be improved.

12 Claims, 36 Drawing Sheets

(51) Int. Cl.
*H04W 72/04* (2009.01)
*H04W 72/12* (2009.01)
*H04L 5/14* (2006.01)
*H04W 72/00* (2009.01)

(52) U.S. Cl.
CPC ... *H04W 72/0446* (2013.01); *H04W 72/1263* (2013.01); *H04L 5/001* (2013.01); *H04L 5/005* (2013.01); *H04L 5/0053* (2013.01); *H04L 5/1469* (2013.01); *H04W 72/005* (2013.01)

(56) References Cited

U.S. PATENT DOCUMENTS

| | | |
|---|---|---|
| 2015/0215856 A1 | 7/2015 | Kim et al. |
| 2015/0223149 A1 | 8/2015 | Liu et al. |
| 2015/0270936 A1 | 9/2015 | Han et al. |
| 2015/0271744 A1 | 9/2015 | Liu et al. |
| 2015/0358827 A1 | 12/2015 | Bendlin et al. |
| 2016/0013984 A1 | 1/2016 | Sun et al. |
| 2016/0050637 A1 | 2/2016 | Behravan et al. |
| 2016/0073366 A1* | 3/2016 | Ng .............. H04W 56/001 370/329 |
| 2016/0095048 A1 | 3/2016 | Nory et al. |
| 2016/0234762 A1 | 8/2016 | You et al. |

FOREIGN PATENT DOCUMENTS

| | | |
|---|---|---|
| WO | WO 2015/105310 A1 | 7/2015 |
| WO | WO 2015/108308 A1 | 7/2015 |
| WO | WO 2015/111961 A1 | 7/2015 |

OTHER PUBLICATIONS

NSN et al., "Discovery Signal Design", 3GPP TSG-RAN WG1 Meeting #77, Seoul, Korea, May 19-23, 2014, R1-142441 (Year: 2014).*
3GPP TS 36.211 V12.5.0 (Mar. 2015); 3rd Generation Partnership Project; Technical Specification Group Radio Access Network; Evolved Universal Terrestrial Radio Access (E-UTRA); Physical channels and modulation (Release 12) (Year: 2015).*
International Search Report dated Nov. 29, 2016, in counterpart International Application No. PCT/KR2016/008658 (3 Pages in English, 3 pages in Korean).
"Discussion on Further Clarifications on Small Cell On/Off and Discovery Signal", 3GPP TSG RAN WG1, 78th meeting, Dresden, Germany, Aug. 18-22, 2014 (7 pages in English).
"DRS Measurement for Small Cell On/Off and Discovery", 3GPP TSG RAN WG1, Meeting #87, Dresden, Germany, Aug. 18-22, 2014 (5 pages in English).
"Further Discussions on Physical layer Enhancement Options for LAA-LTE", 3GPP TSG RAN WG1 #80bis, Belgrade, Serbia, Apr. 20-24, 2015 (7 pages in English).
"Measurements and Synchronization in LAA", 3GPP TSG RAN WG1#80BIS, Belgrade, Serbia, Apr. 20-24, 2015 (5 pages in English).
"Discussion on DL Reference Signal Transmission for LAA", 3GPP TSG RAN WG1, Meeting #81, Fukuoka, Japan, May 25-29, 2015 (3 pages in English).
"Discussion on LAA DRS Design", 3GPP TSG RAN WG1, Meeting #81, Fukuoka, Japan, May 25-29, 2015 (8 pages in English).

* cited by examiner

[FIG. 1]
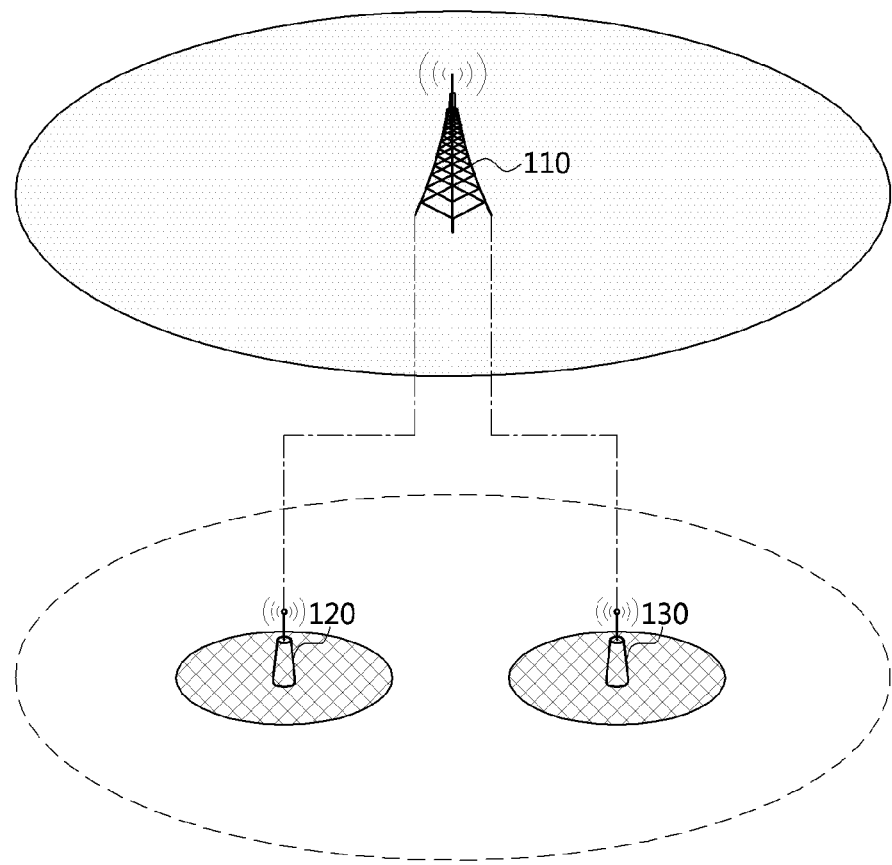

【FIG. 2】
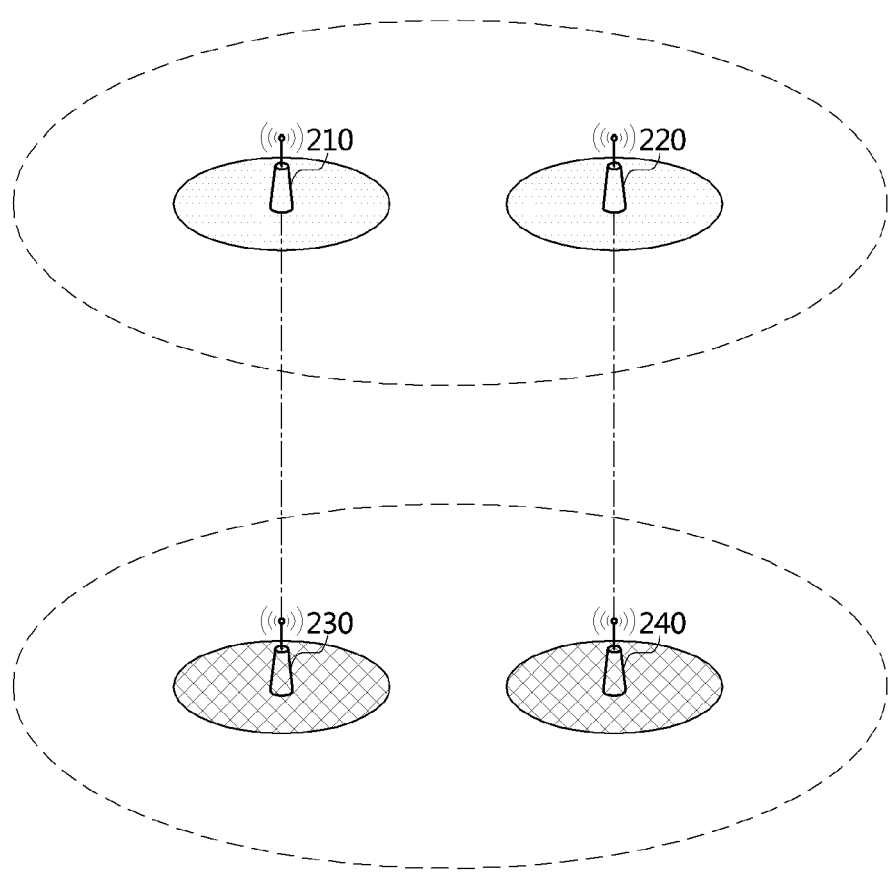

【FIG. 3】
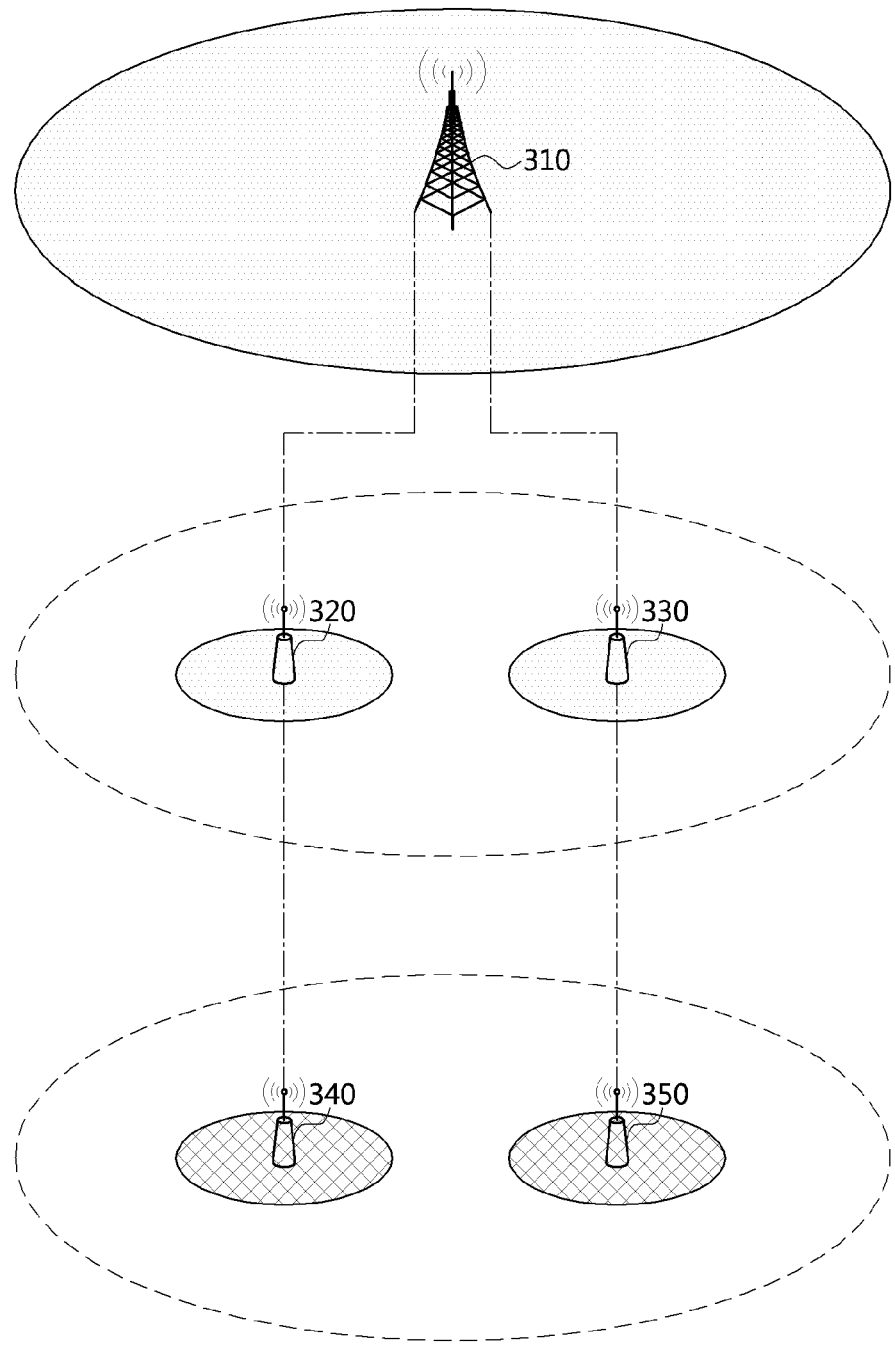

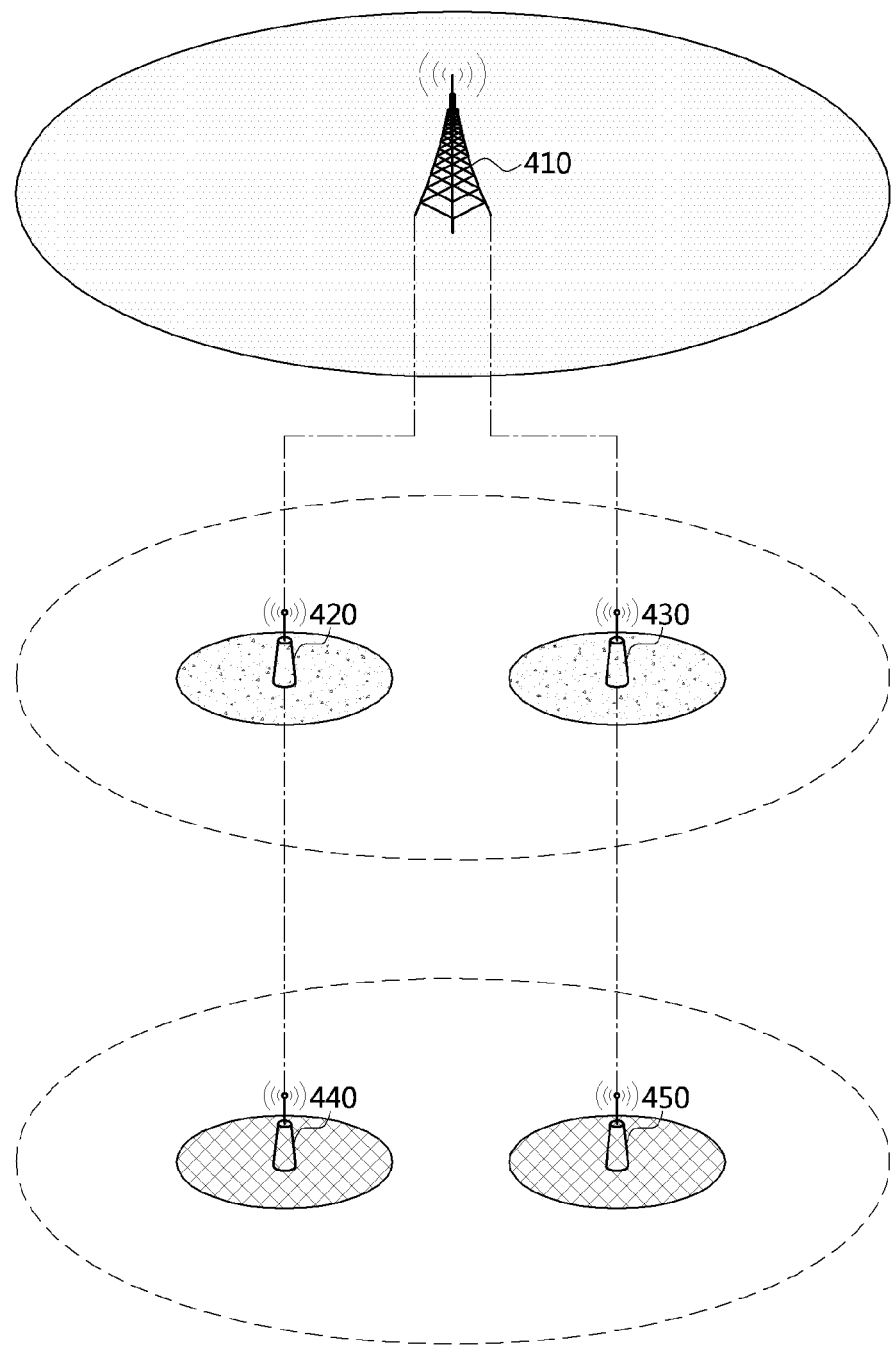
[FIG. 4]

【FIG. 5】
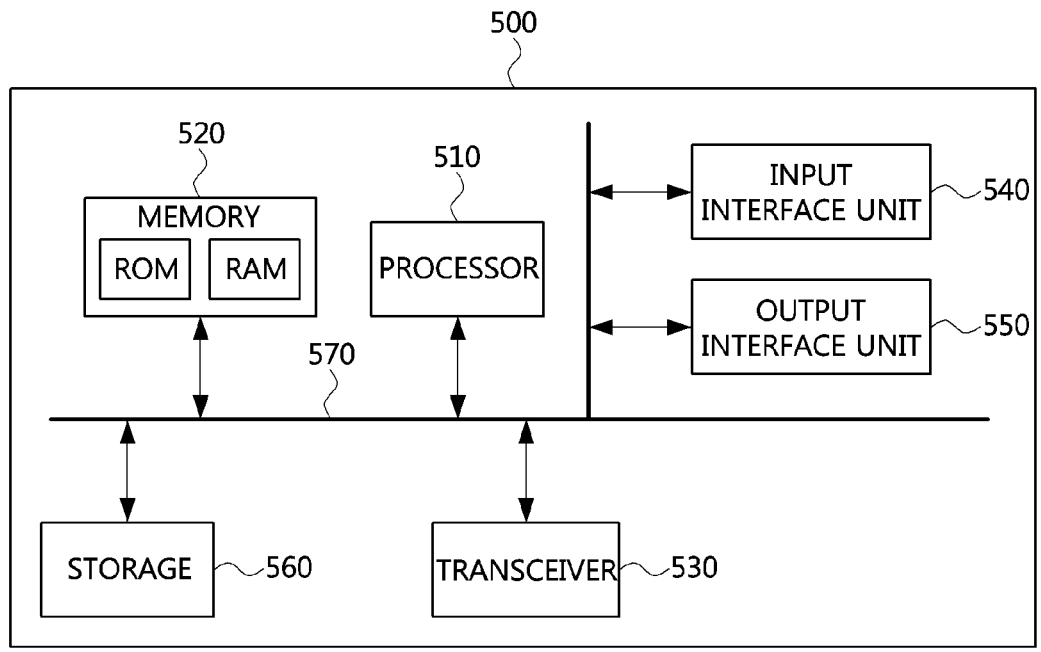
【FIG. 6】
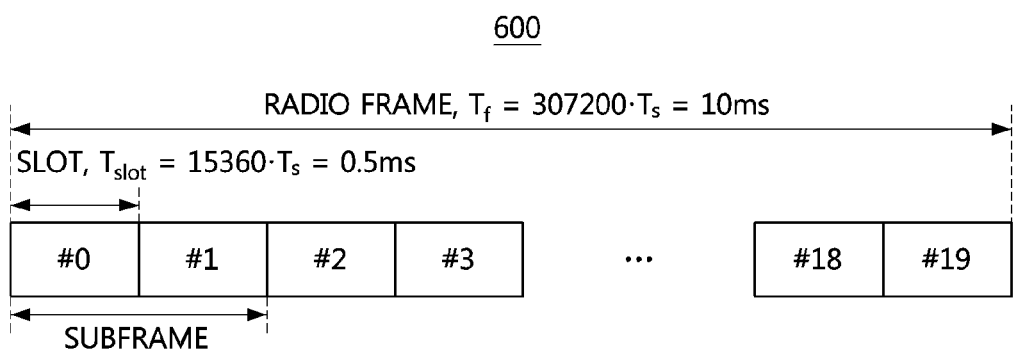

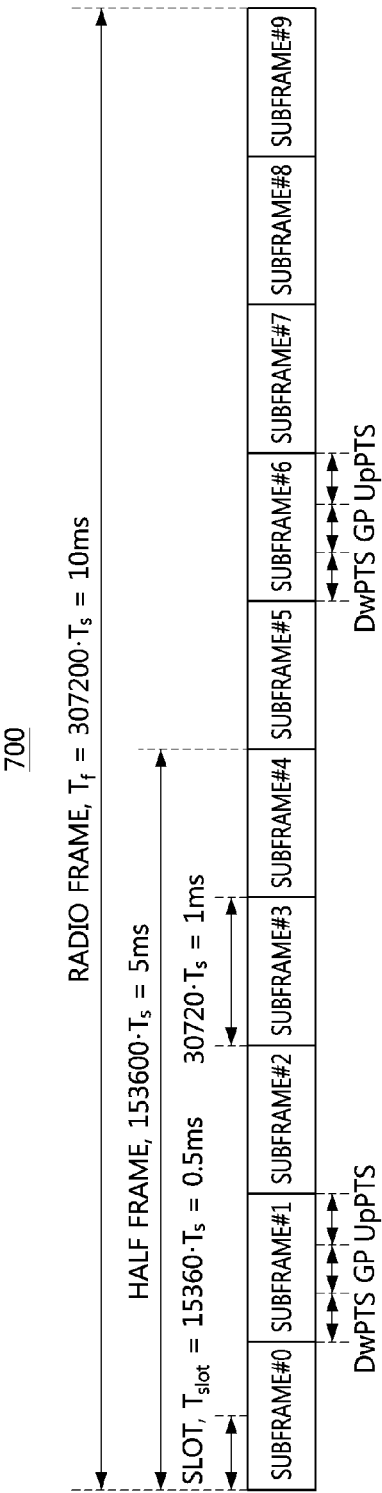

【FIG. 8】
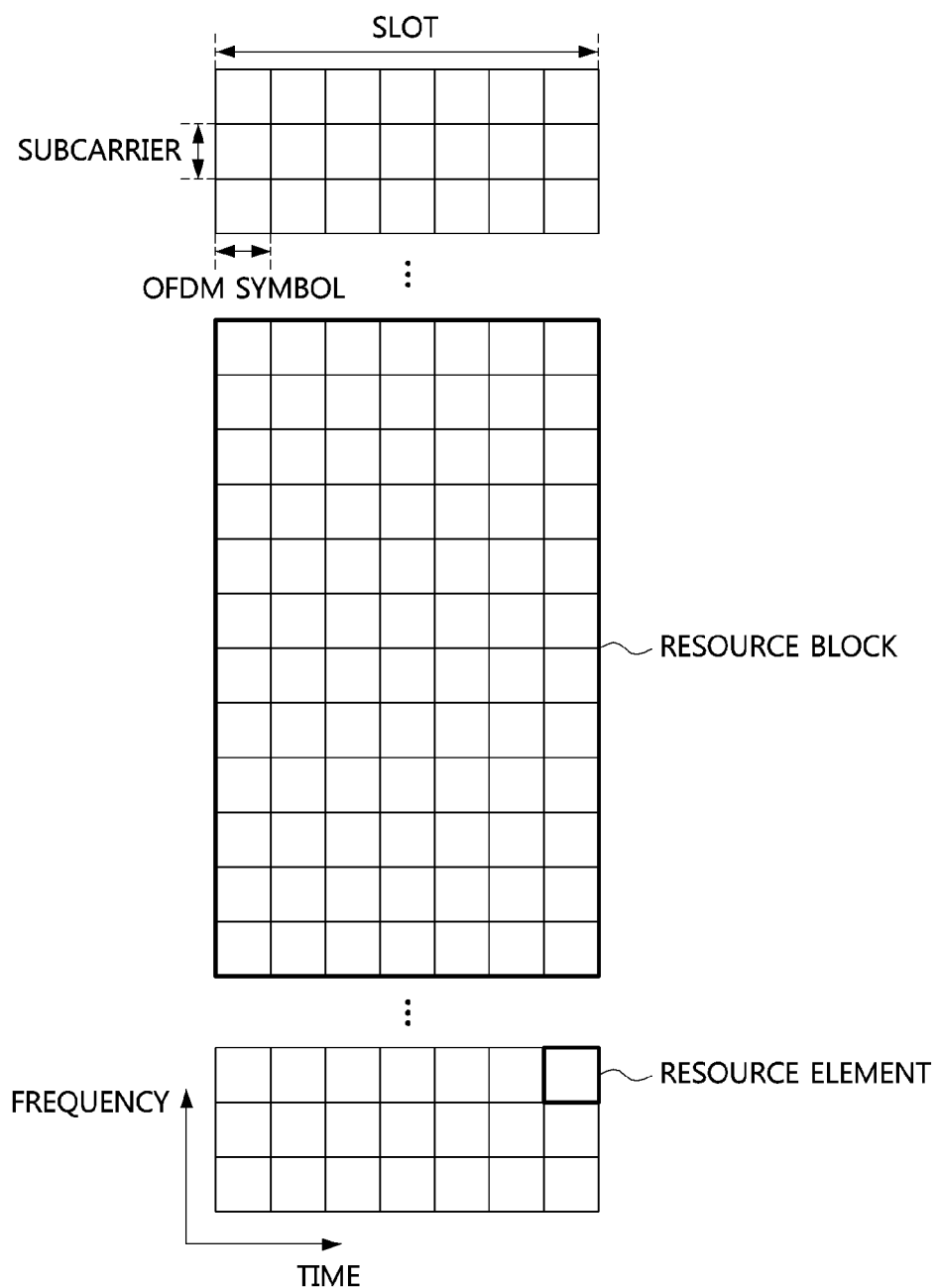

[FIG. 9]
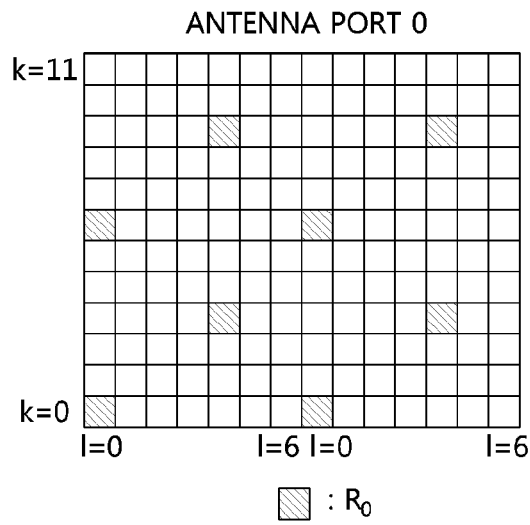
[FIG. 10]
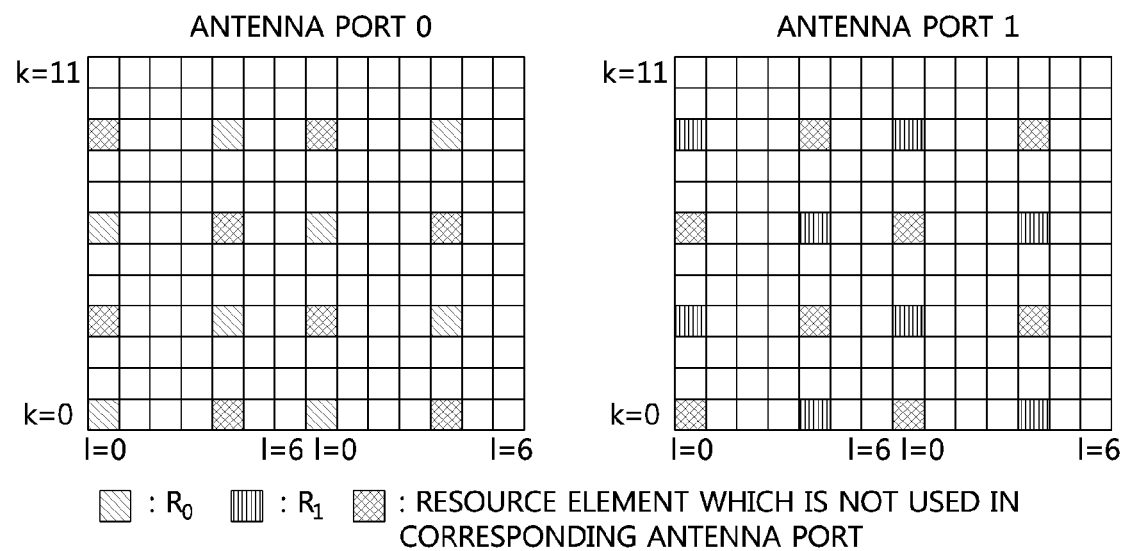

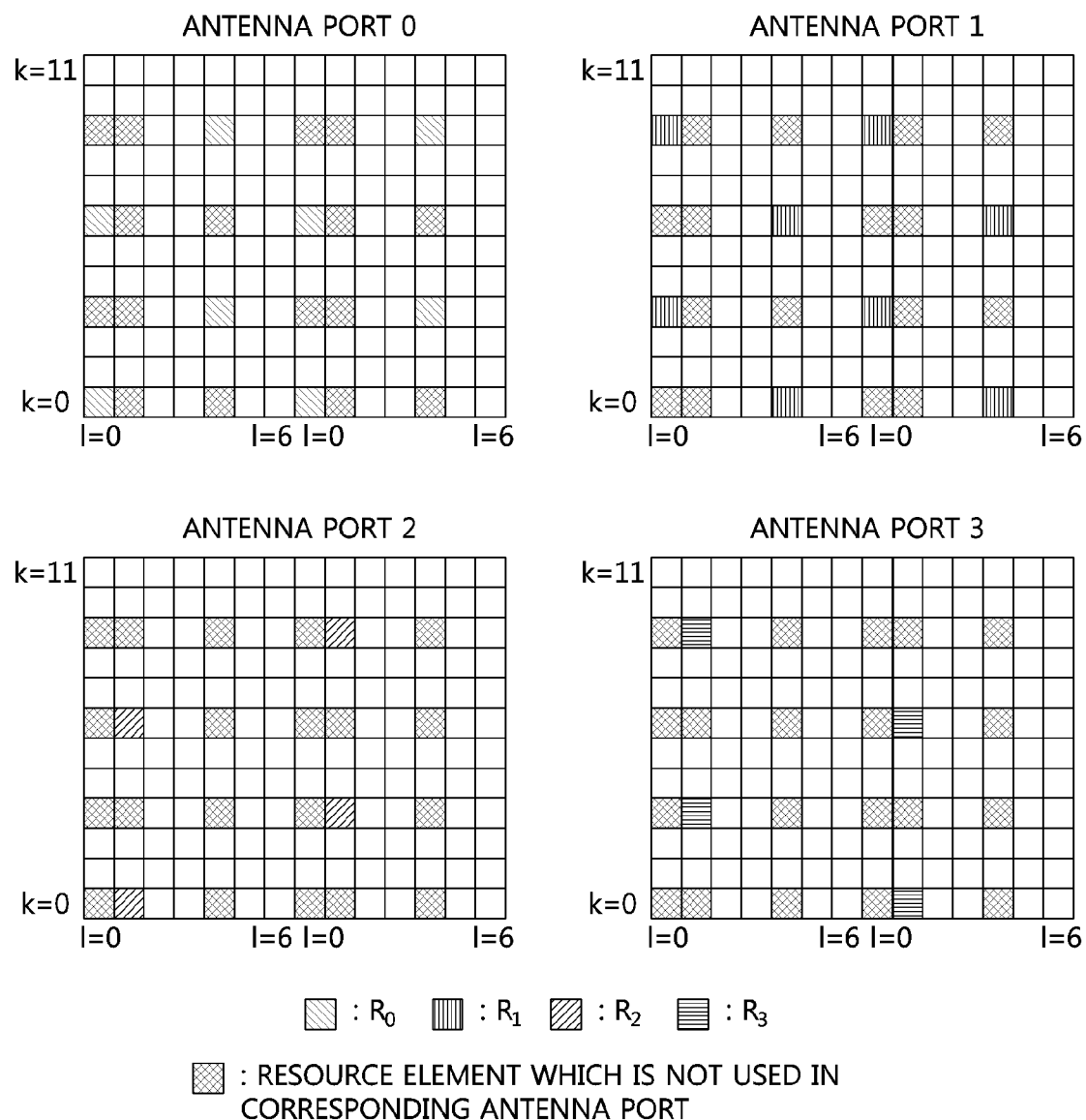
[FIG. 11]

[FIG. 12]
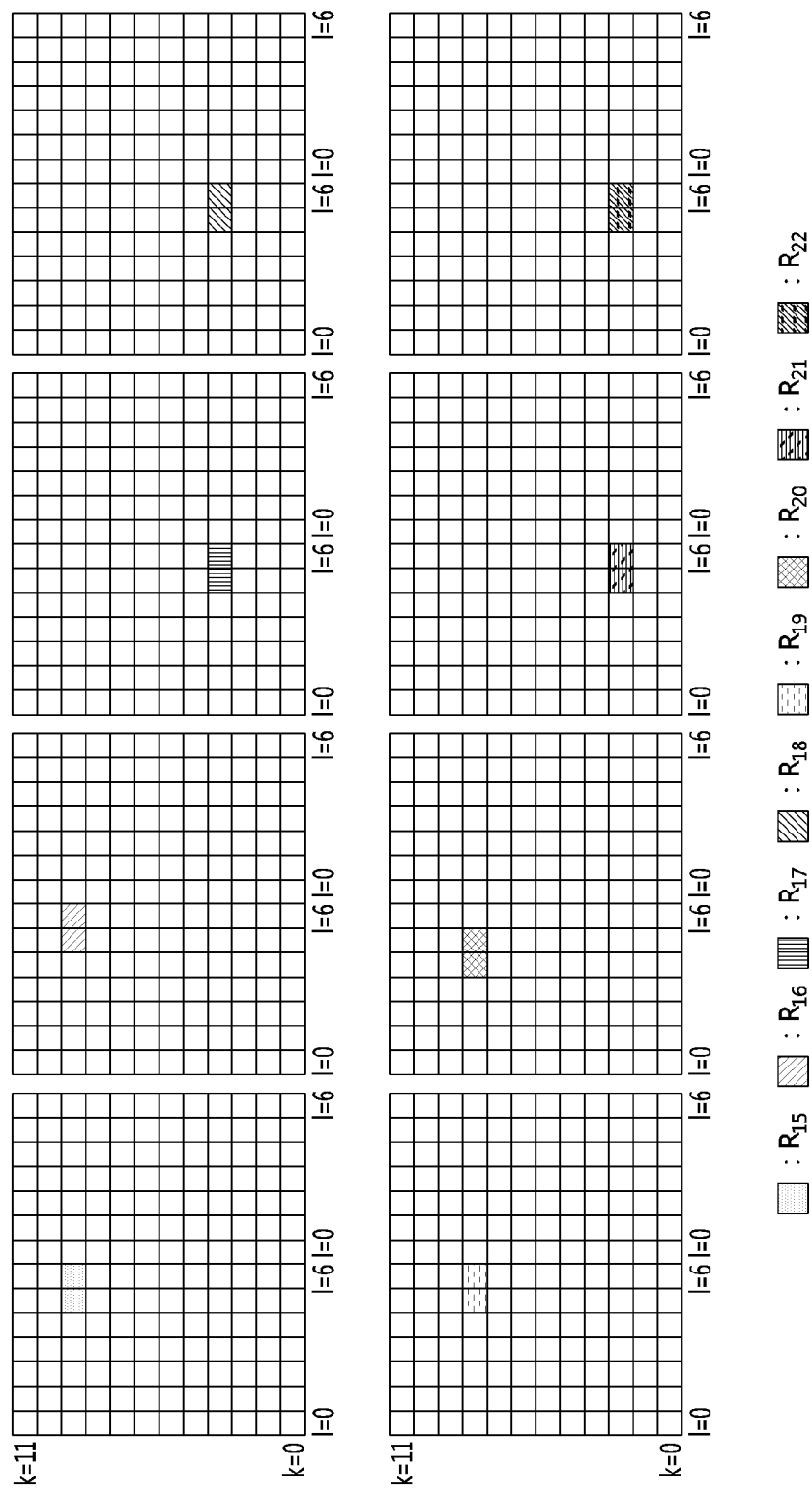

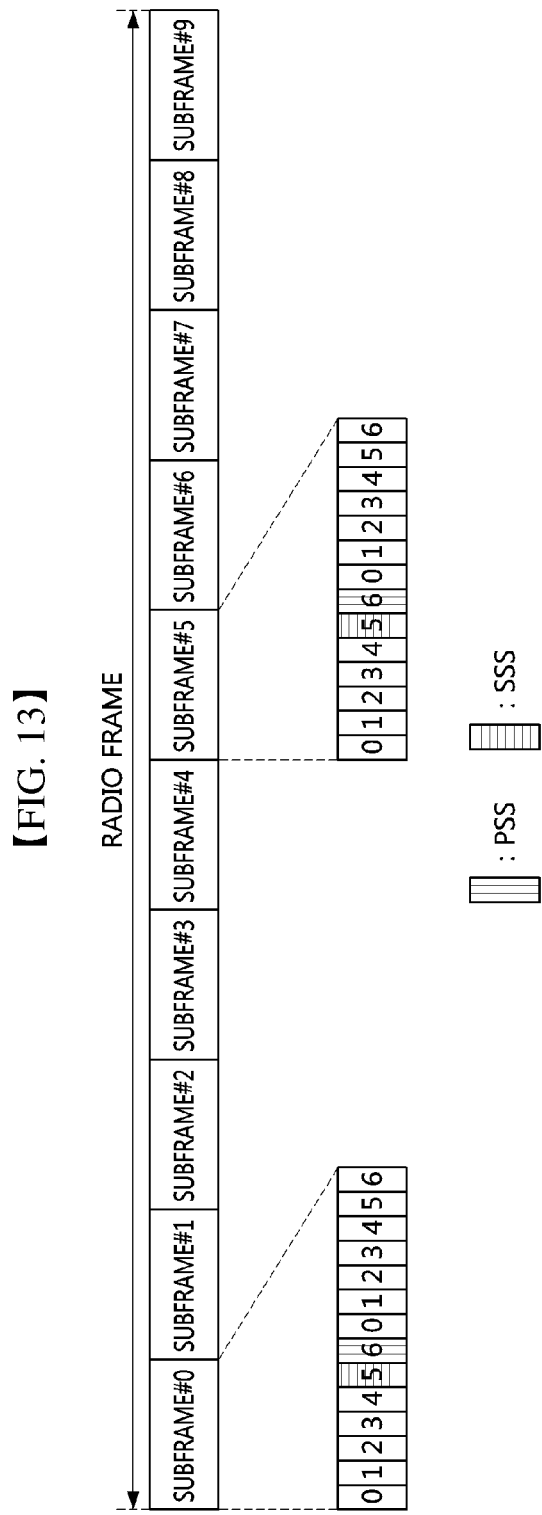
[FIG. 13]

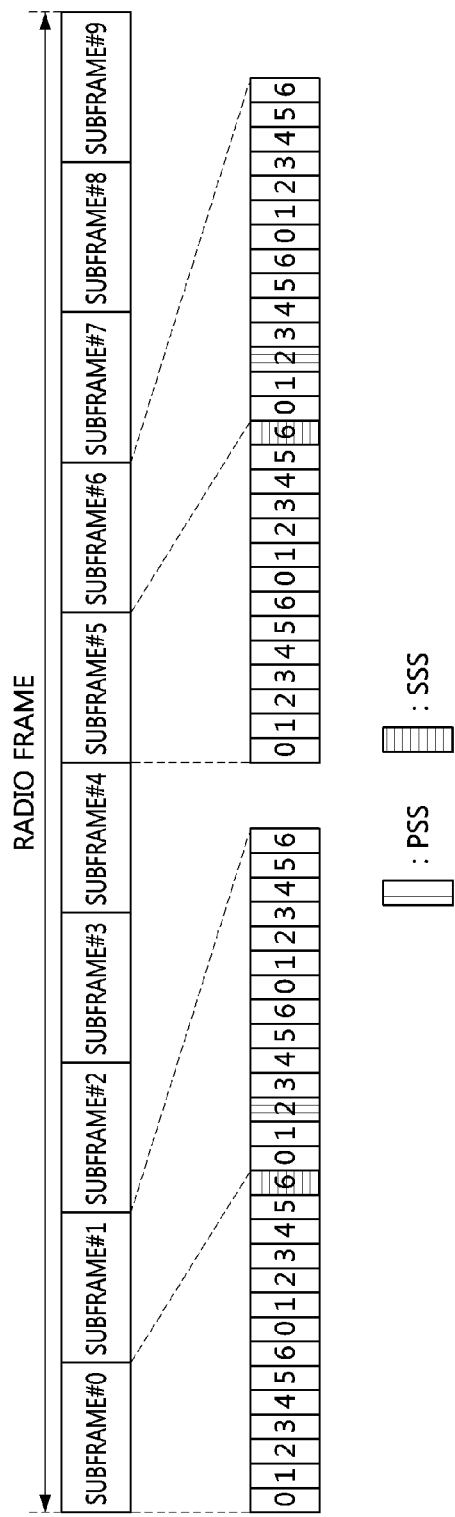
[FIG. 14]

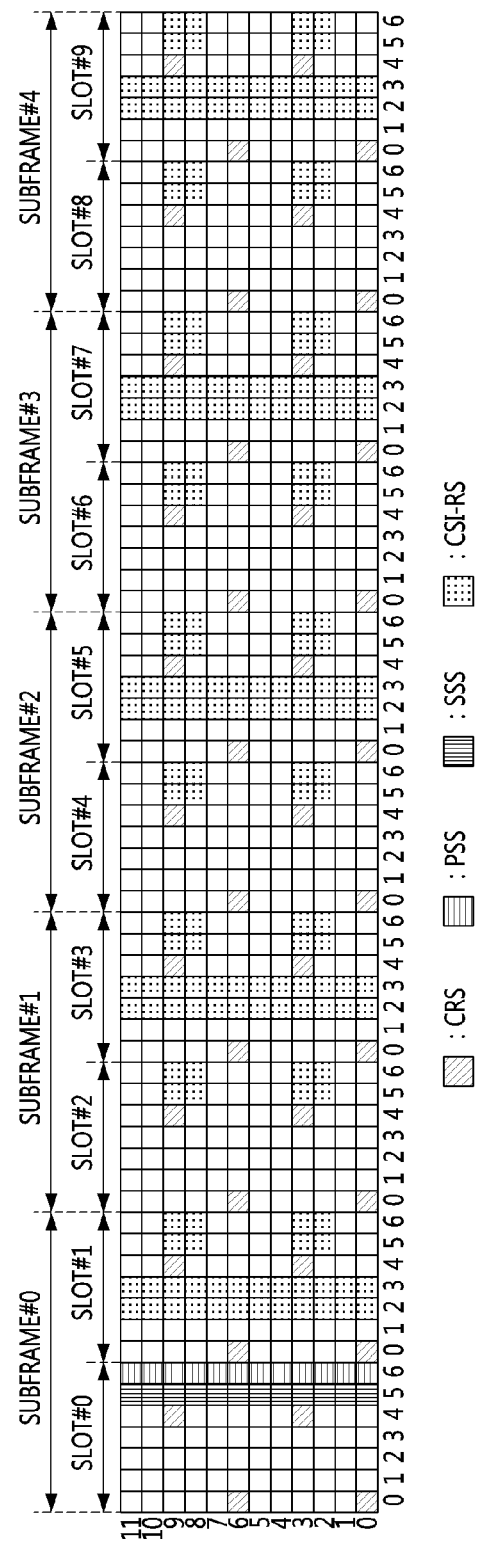
[FIG. 15]

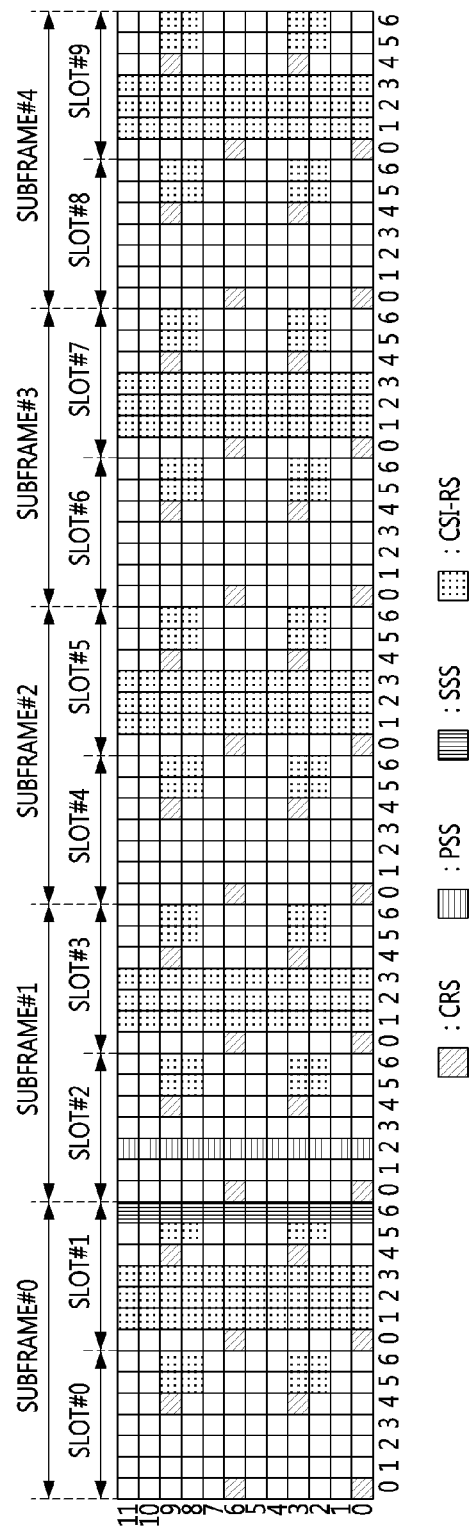
[FIG. 16]

【FIG. 17】
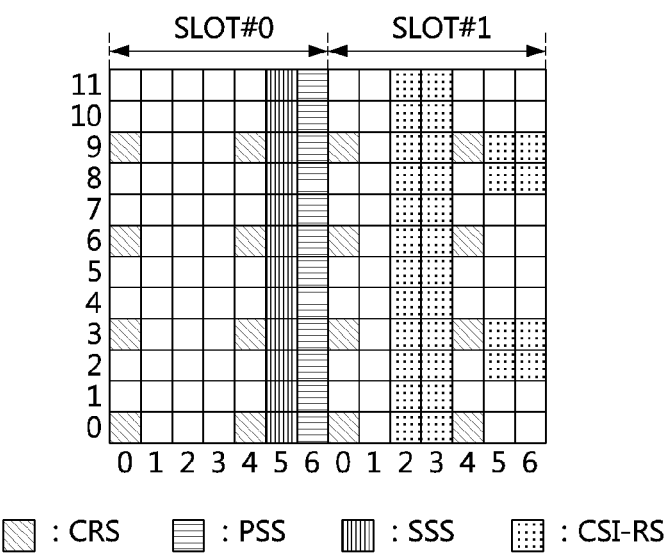
【FIG. 18】
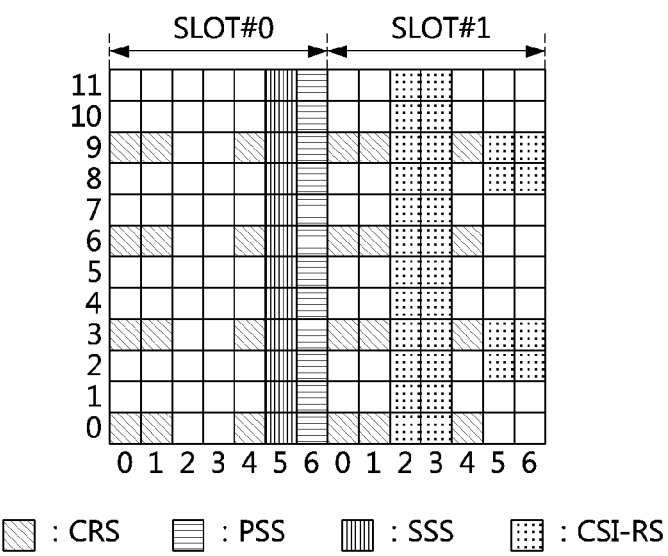

【FIG. 19】
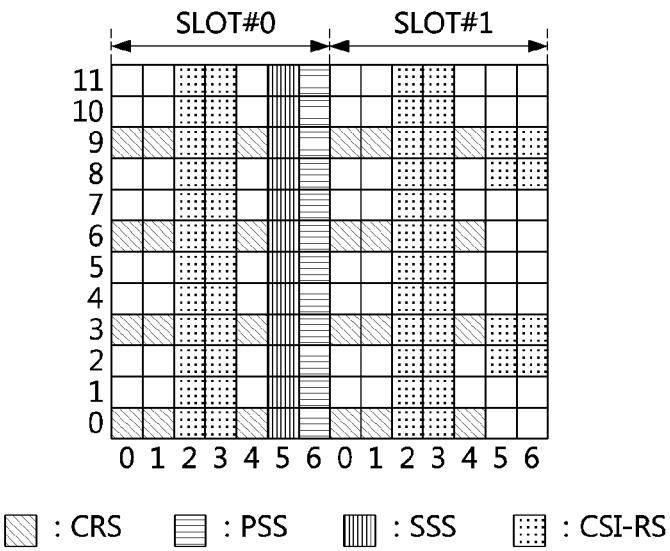
【FIG. 20】
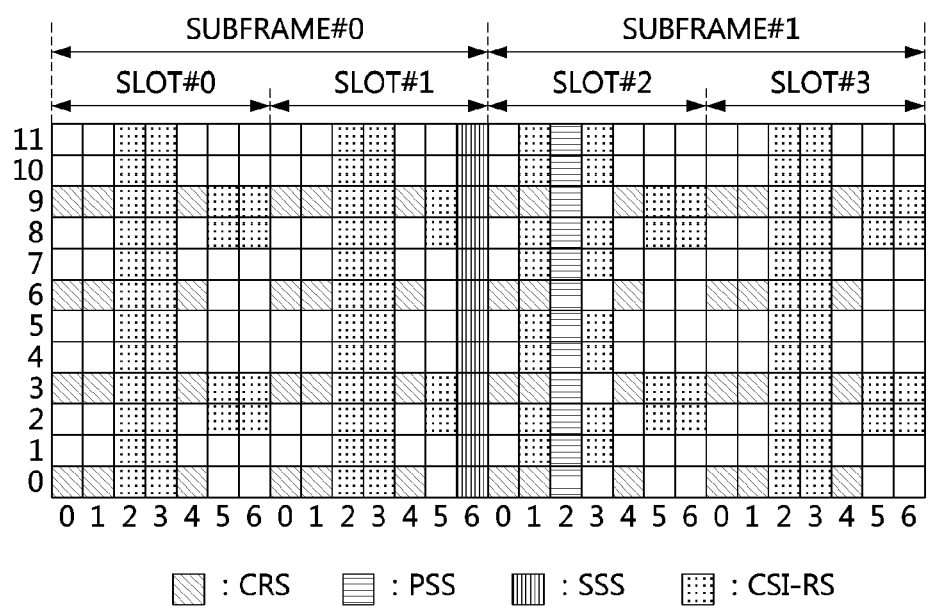

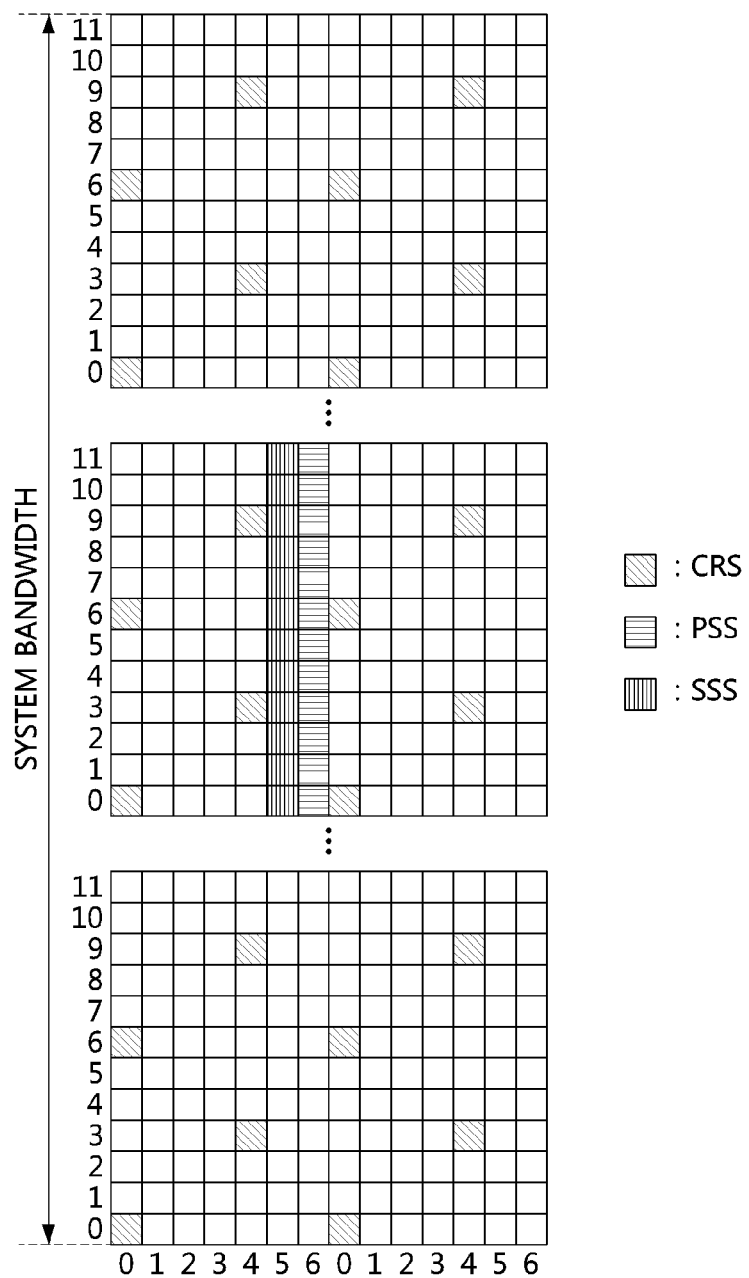

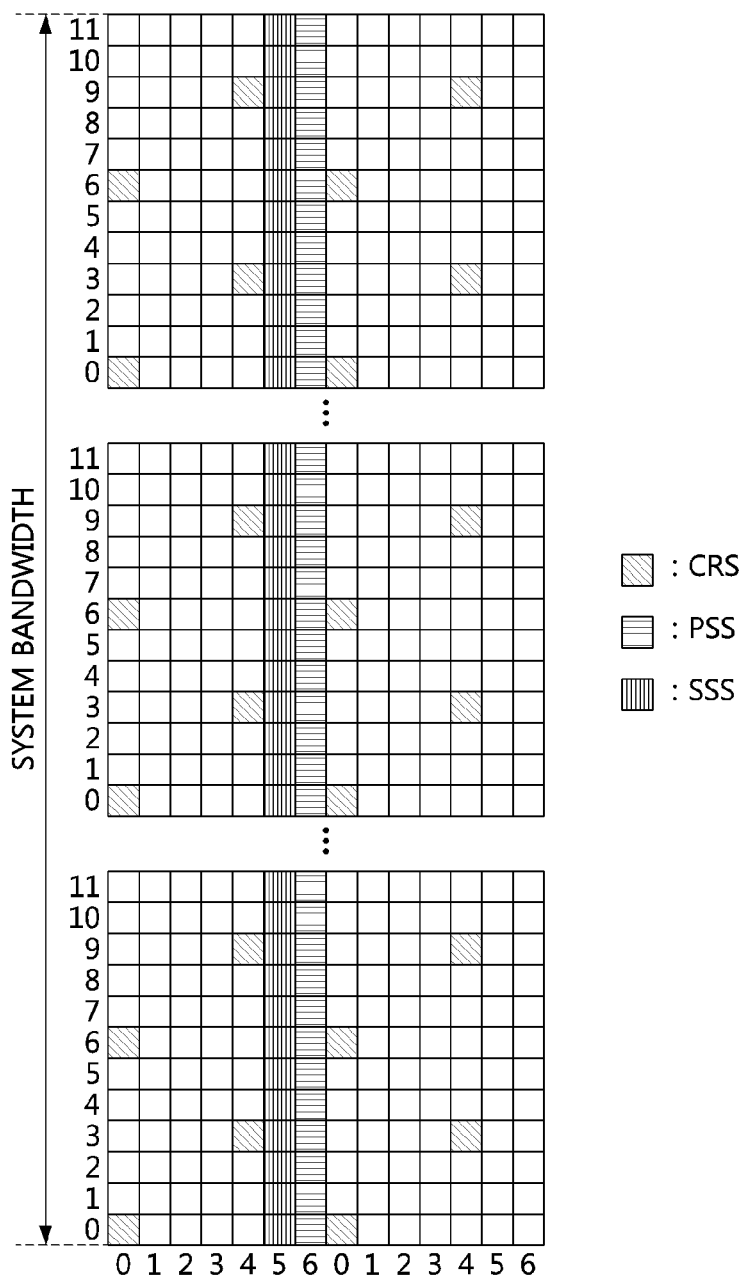
[FIG. 22]

【FIG. 23】
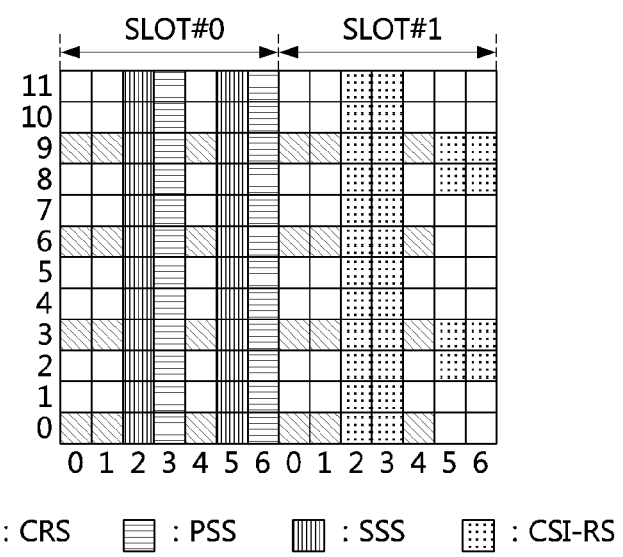
【FIG. 24】
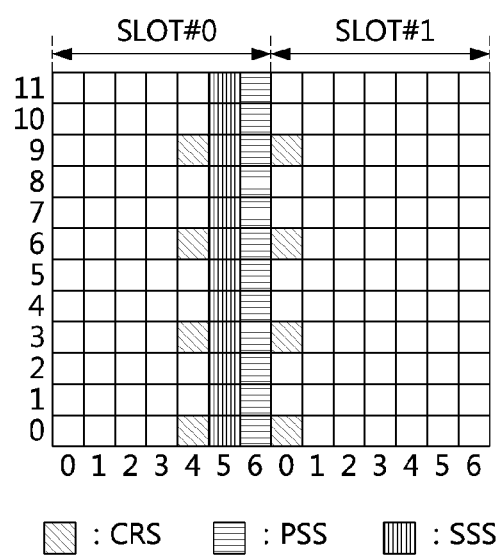

【FIG. 25】
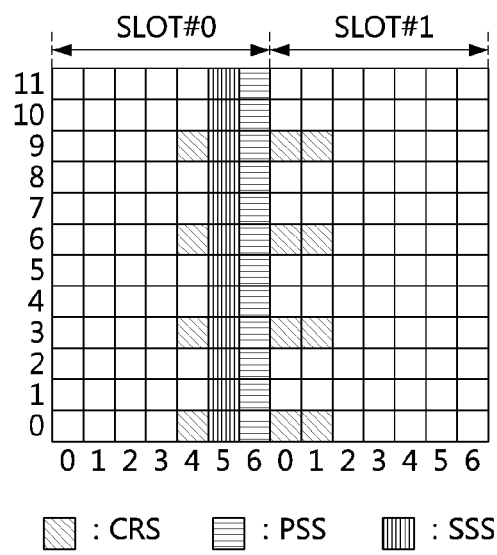
【FIG. 26】
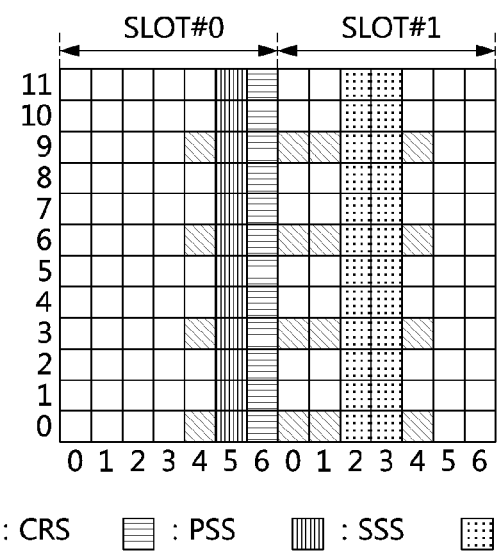

【FIG. 27】
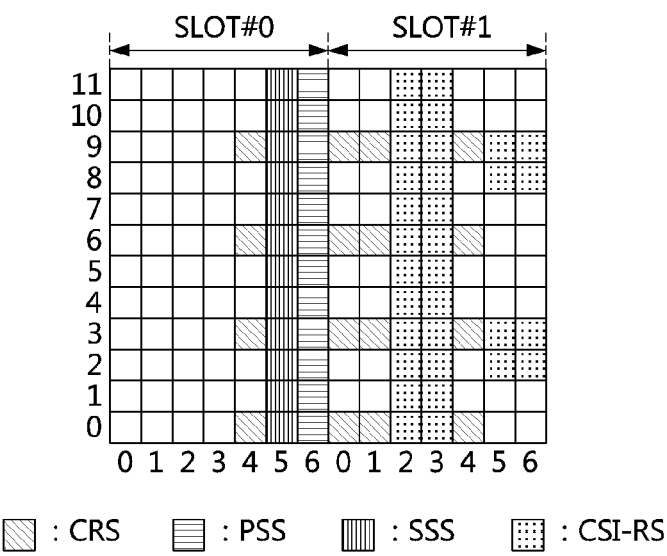
【FIG. 28】
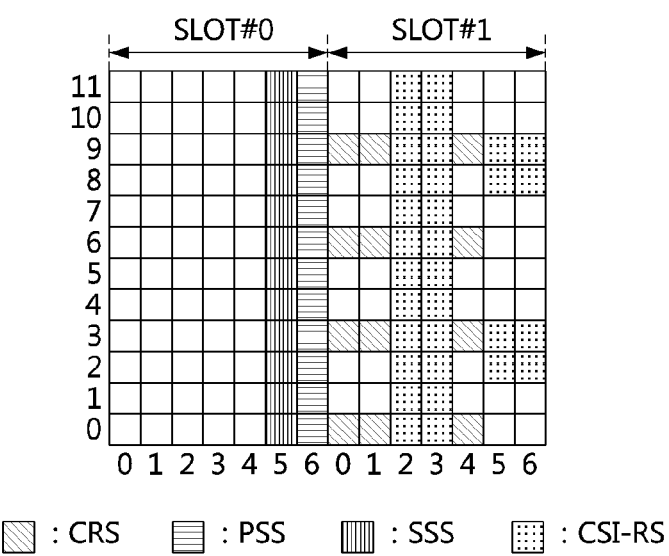

[FIG. 29]
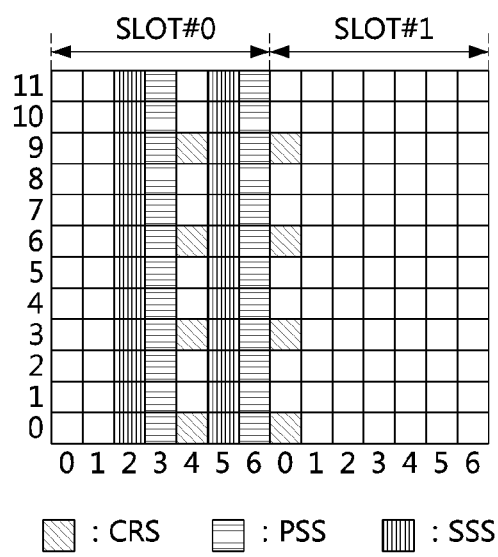
[FIG. 30]
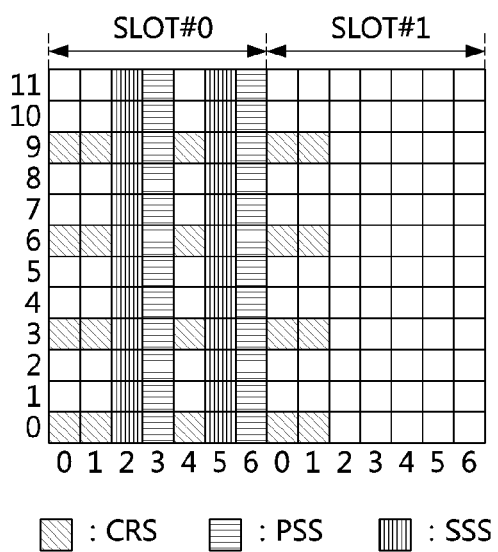

[FIG. 31]
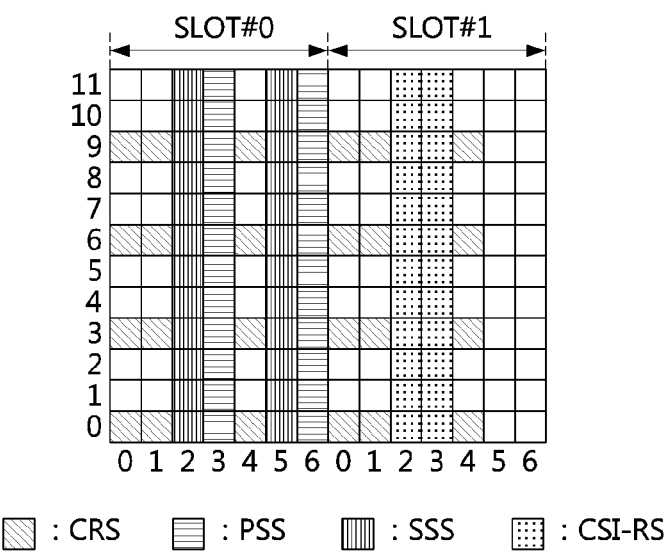
[FIG. 32]
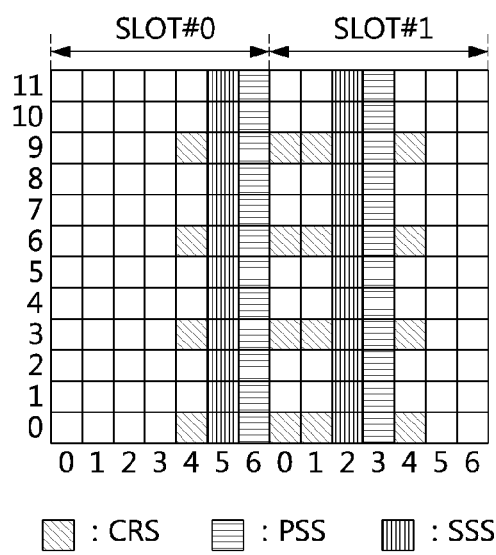

[FIG. 33]
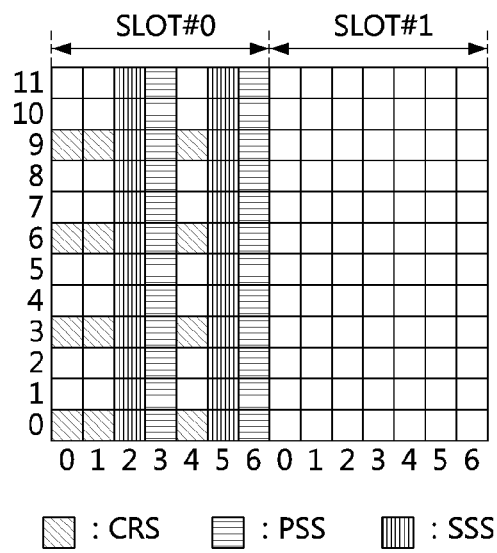
[FIG. 34]
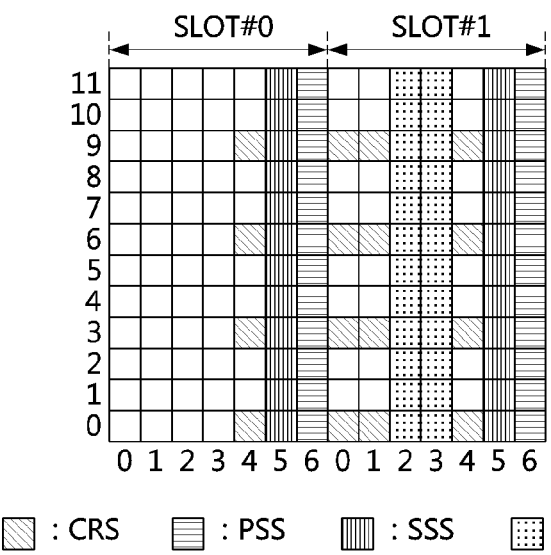

【FIG. 35】
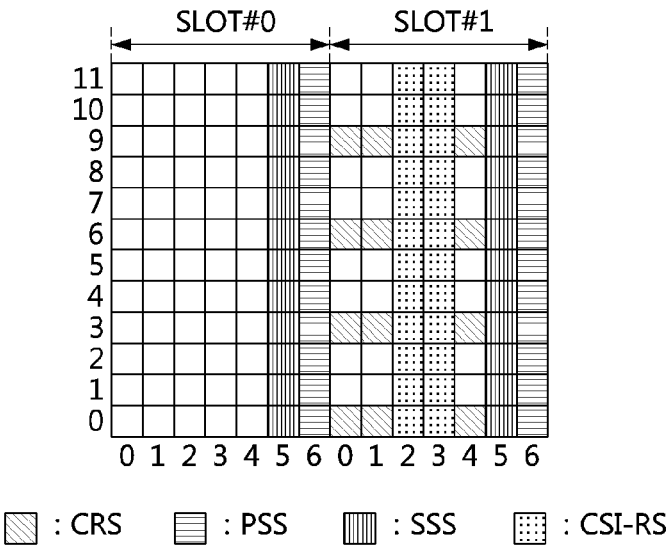
【FIG. 36】
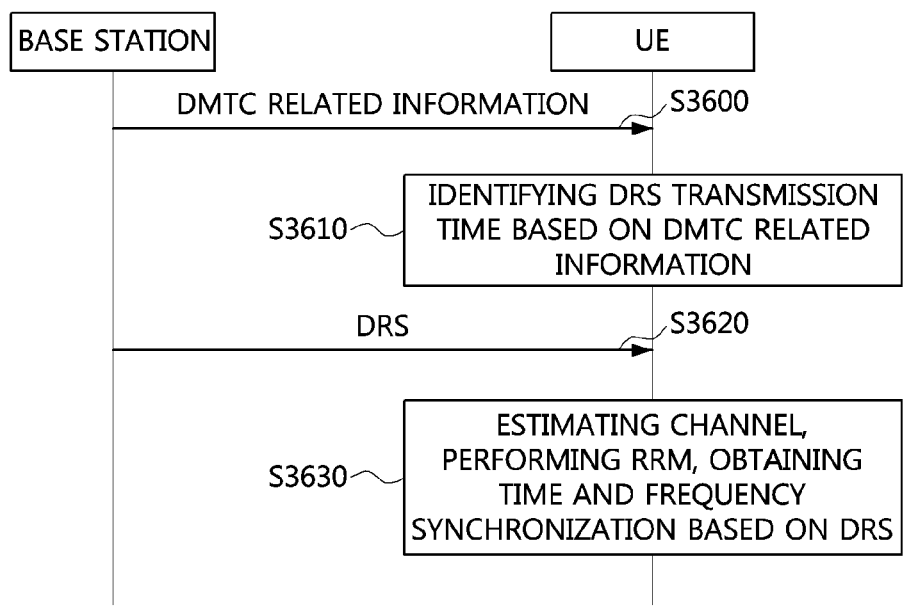

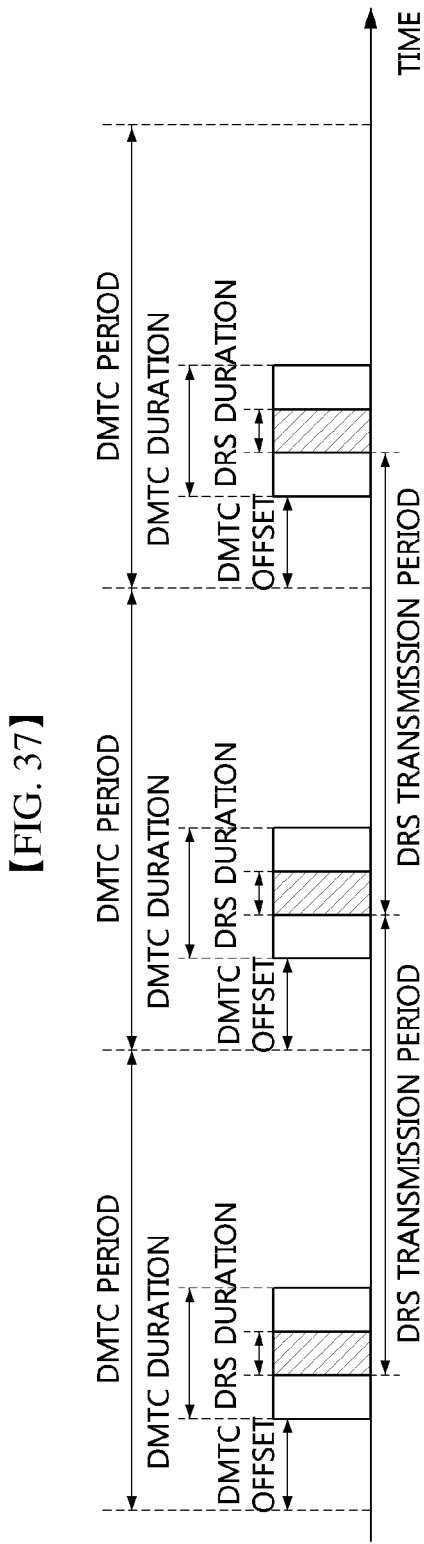
[FIG. 37]

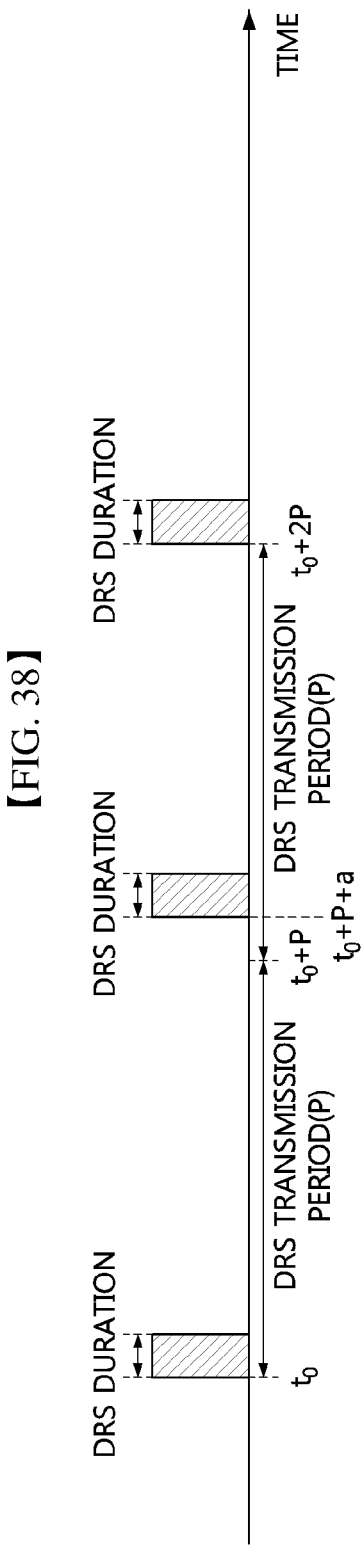
[FIG. 38]

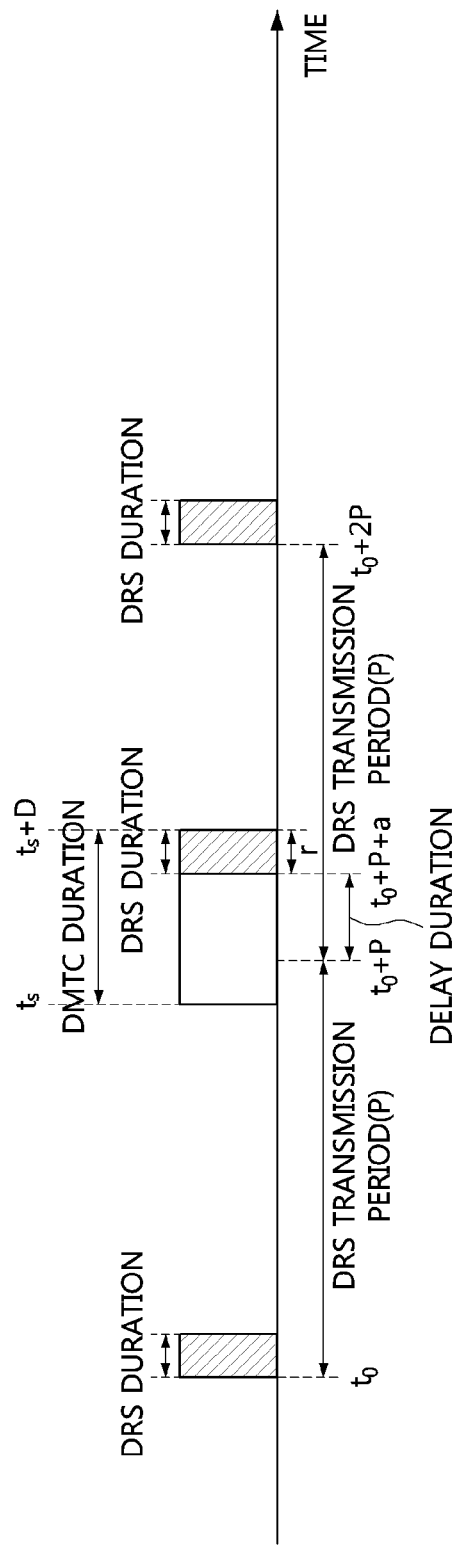
[FIG. 39]

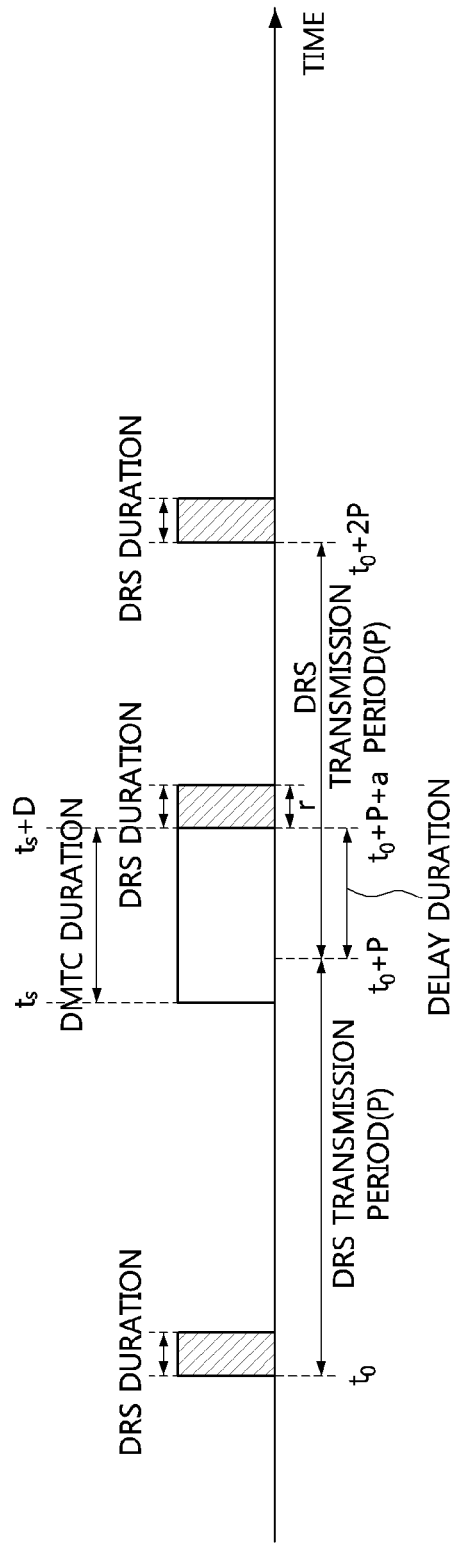
[FIG. 40]

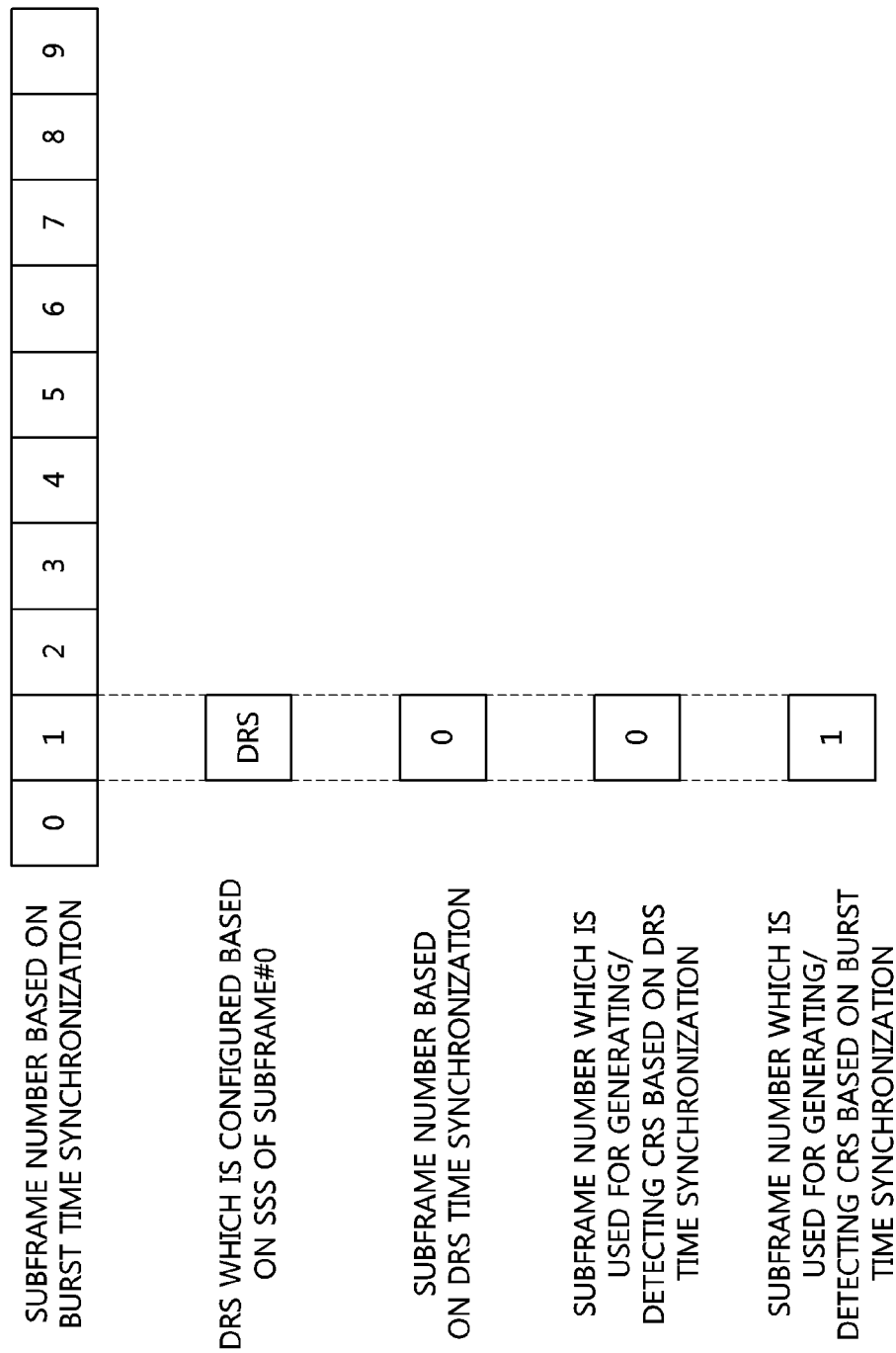

[FIG. 42]

| SUBFRAME NUMBER BASED ON BURST TIME SYNCHRONIZATION | 0 | 1 | 2 | 3 | 4 | 5 | 6 | 7 | 8 | 9 |
|---|---|---|---|---|---|---|---|---|---|---|
| SUBFRAME NUMBER WHICH IS USED FOR GENERATING/DETECTING SSS | 0 | 0 | 0 | 0 | 0 | 5 | 5 | 5 | 5 | 5 |
| SUBFRAME NUMBER WHICH IS USED FOR GENERATING/DETECTING CRS | 0 | 1 | 2 | 3 | 4 | 5 | 6 | 7 | 8 | 9 |

[FIG. 43]

| SUBFRAME NUMBER BASED ON BURST TIME SYNCHRONIZATION | 0 | 1 | 2 | 3 | 4 | 5 | 6 | 7 | 8 | 9 |
|---|---|---|---|---|---|---|---|---|---|---|
| SUBFRAME NUMBER WHICH IS USED FOR GENERATING/DETECTING SSS | 0 | 0 | 0 | 0 | 0 | 5 | 5 | 5 | 5 | 5 |
| SUBFRAME NUMBER WHICH IS USED FOR GENERATING/DETECTING CRS | 0 | 0 | 0 | 0 | 0 | 5 | 5 | 5 | 5 | 5 |

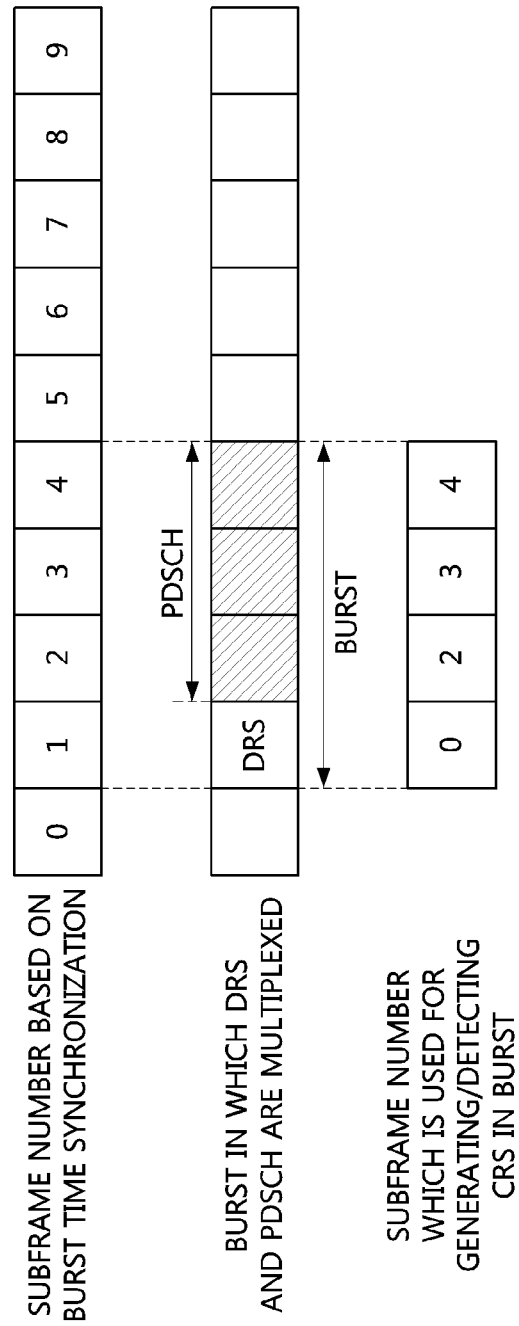
[FIG. 44]

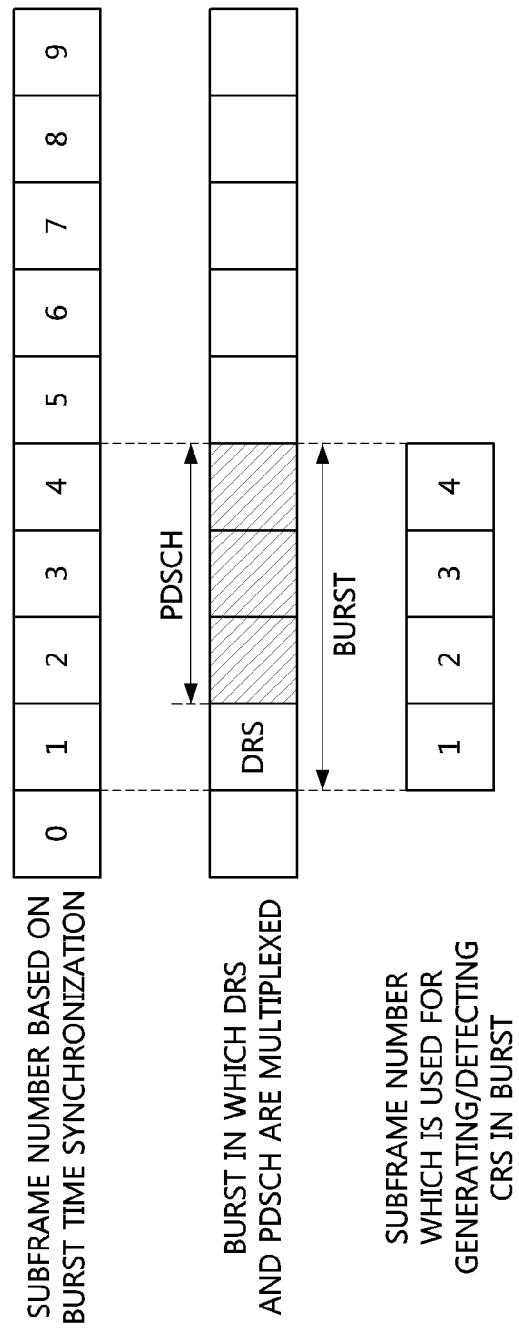

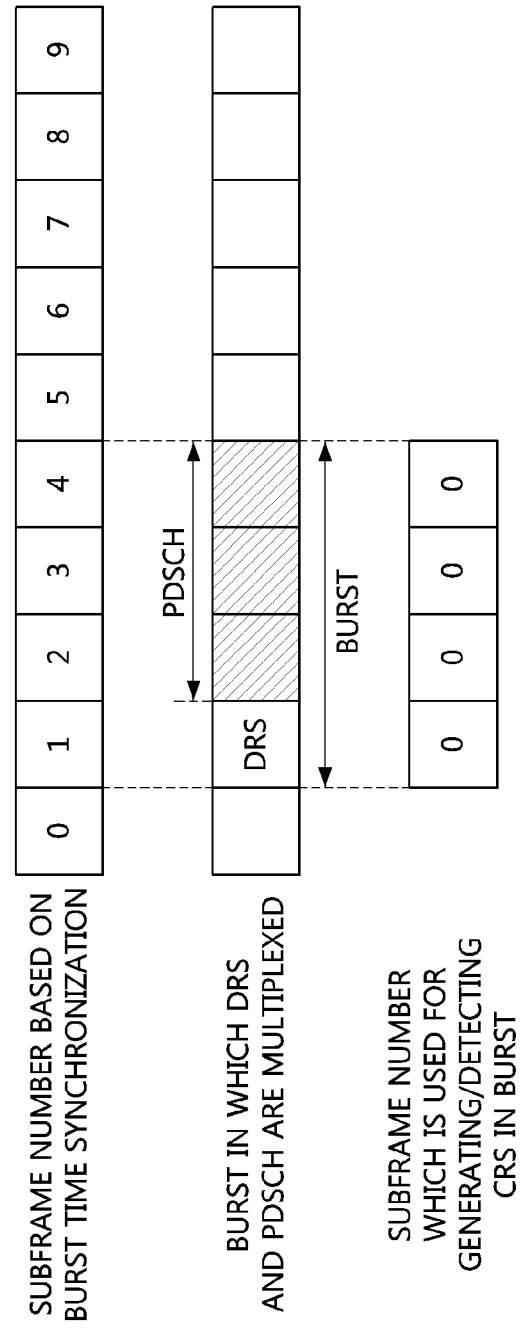

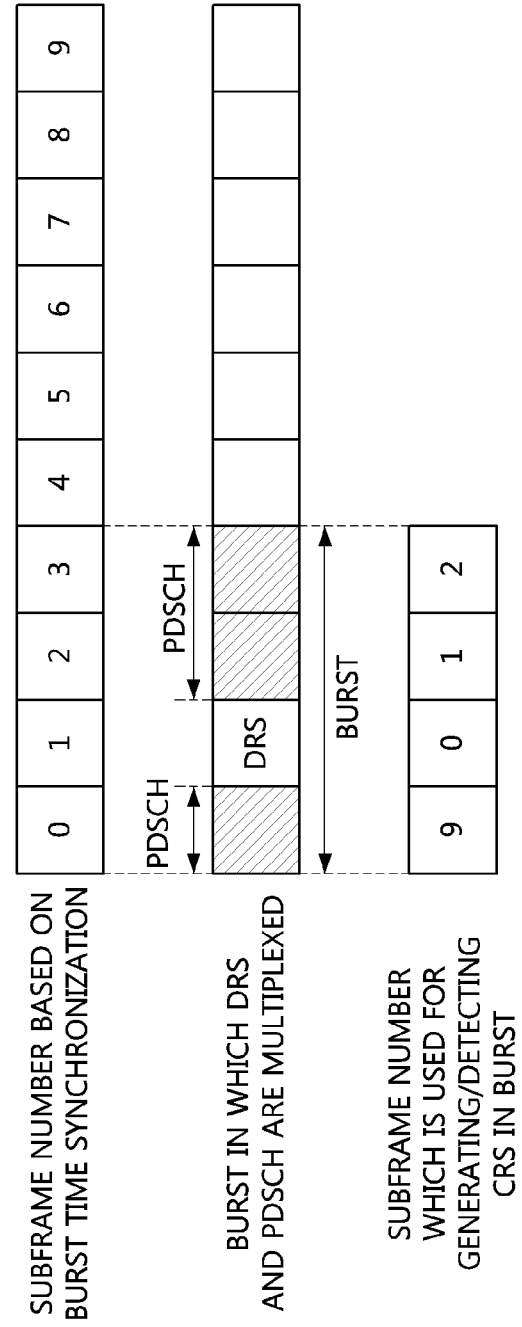
[FIG. 47]

METHOD AND APPARATUS FOR TRANSMITTING AND RECEIVING SIGNAL IN COMMUNICATION NETWORK

CROSS REFERENCE TO RELATED APPLICATIONS

This application is a National Phase entry of PCT Application No. PCT/KR2016/008658, filed on Aug. 5, 2016, which claims priority under 35 U.S.C. § 119(e), 120 and 365(c) to Korean Patent Application No. 10-2015-0114089, filed on Aug. 12, 2015, Korean Patent Application No. 10-2015-0135749, filed on Sep. 24, 2015, and Korean Patent Application No. 10-2015-0149005, filed on Oct. 26, 2015.

TECHNICAL FIELD

The present disclosure relates to technologies for transmitting and receiving a signal in a cellular communication network, and more particularly to technologies for transmitting and receiving a discovery signal or a discovery reference signal (DRS).

BACKGROUND ART

Various wireless communication technologies are being developed in accordance with advancement of information communication technologies. Wireless communication technologies may be generally classified into technologies using licensed bands and technologies using unlicensed bands (e.g., industrial-scientific-medical (ISM) band) according to bands used by respective technologies. Since a licensed band is exclusively used by a specific operator, the technology using the licensed band may provide better reliability, communication quality, etc. than that using an unlicensed band.

There exists, as a representative cellular communication technology using the licensed band, a Long Term Evolution (LTE) or LTE-Advanced (LTE-A) standardized in a 3rd generation partnership project (3GPP). Thus, a base station or a user equipment (UE) supporting LTE or LTE-A may transmit or receive signals through the licensed band. Also, there exists, as a representative wireless communication technology using the unlicensed band, a wireless local area network (WLAN) defined in IEEE 802.11. Thus, an access point or a station supporting the WLAN may transmit or receive signals through the unlicensed band.

Meanwhile, as mobile traffics are increasing explosively, additional licensed bands are required in order to process such the increasing mobile traffics through licensed bands. However, licensed bands are limited resources. Since a licensed band is obtained usually through an auction held among operators, astronomical investment may be demanded for obtaining the additional licensed bands. In order to resolve the above-described problem, a method for providing LTE or LTE-A services through the unlicensed band may be considered.

In the case that LTE or LTE-A services are provided through the unlicensed band, it may be necessary to coexist with a communication node (e.g., access point, station, and so on) supporting WLAN. For coexistence in the unlicensed band, a communication node (e.g., base station, UE, and so on) supporting LTE or LTE-A may use the unlicensed band based on listen before talk (LBT), and so on. In this case, the communication node supporting LTE or LTE-A may not transmit a signal in desired time. In addition, interferences between a signal which is transmitted from the communication node supporting LTE or LTE-A and a signal which is transmitted from the communication node supporting WLAN may be generated in the unlicensed band. Therefore, for coexistence in the unlicensed band, it is necessary for methods for transmitting and receiving a signal.

Meanwhile, this description on the related arts is written for understanding of the background of the present disclosure. Thus, information on other than conventional technologies, which are already known to those skilled in this technology domain to which the technologies of the present disclosure belong, may be included in this description.

DISCLOSURE

Technical Problem

In order to resolve the above-described problem, the present disclosure is to provide a method for transmitting and receiving a discovery signal or a discovery reference signal (DRS) and an apparatus therefor.

Technical Solution

An operation method of a user equipment (UE) supporting an unlicensed band according to an embodiment of the present disclosure to achieve the above-described objective, comprises receiving, from a base station, discovery signal measurement timing configuration (DMTC) related information including a DMTC period and a DMTC offset; identifying a DMTC duration, in which a discovery reference signal (DRS) is transmitted, based on the DMTC related information; and receiving, from the base station, the DRS through a subframe except for a specific subframe corresponding to a DRS period in the DMTC duration.

Here, the DRS may be transmitted through a subframe after the specific subframe corresponding to the DRS period in the DMTC duration.

Here, the DRS may include a cell-specific reference signal (CRS), a primary synchronization signal (PSS), a secondary synchronization signal (SSS), and a channel state information-reference signal (CSI-RS).

Here, the CRS may correspond to antenna port 0.

Here, when a radio frame includes subframes #0 to 9 in the unlicensed band, the PSS may be configured in the subframe #0 or 5.

Here, when a radio frame includes subframes #0 to 9 in the unlicensed band, the SSS may be configured in the subframe #0 or 5.

Here, when a radio frame includes subframes #0 to 9 in the unlicensed band and the SSS is configured in at least one of the subframes #1 to 4, the SSS may use a sequence for an existing SSS to be configured in the subframe #0.

Here, when a radio frame includes subframes #0 to 9 in the unlicensed band and the SSS is configured in at least one of the subframes #6 to 9, the SSS may use a sequence for an existing SSS to be configured in the subframe #5.

Here, when a radio frame includes subframes #0 to 9 in the unlicensed band and each subframe includes two slots, a sequence of the CRS may be generated based on numbers corresponding to slots in which the SSS is configured.

Here, when the SSS is configured in at least one of the subframes #0 to 4, the sequence of the CRS may be generated based on slot numbers 0 and 1.

Here, when the SSS is configured in at least one of the subframes #5 to 9, the sequence of the CRS may be generated based on slot numbers 10 and 11.

An operation method of a base station in a communication network according to other embodiment of the present disclosure to achieve the above-described objective, comprises transmitting configuration information indicating a discovery signal measurement timing configuration (DMTC) duration; generating a discovery reference signal (DRS); and transmitting the DRS through a subframe except for a specific subframe corresponding to a DRS period in the DMTC duration of an unlicensed band.

Here, the DRS may be transmitted through a subframe after the specific subframe corresponding to the DRS period in the DMTC duration.

Here, the DRS may include a cell-specific reference signal (CRS), a primary synchronization signal (PSS), a secondary synchronization signal (SSS), and a channel state information-reference signal (CSI-RS).

Here, the CRS may correspond to antenna port 0.

Here, when a radio frame includes subframes #0 to 9 in the unlicensed band, the PSS may be configured in the subframe #0 or 5.

Here, when a radio frame includes subframes #0 to 9 in the unlicensed band, the SSS may be configured in the subframe #0 or 5.

Here, when a radio frame includes subframes #0 to 9 in the unlicensed band and the SSS is configured in at least one of the subframes #1 to 4, the SSS may use a sequence for an existing SSS to be configured in the subframe #0.

Here, wherein, when a radio frame includes subframes #0 to 9 in the unlicensed band and the SSS is configured in at least one of the subframes #6 to 9, the SSS may use a sequence for an existing SSS to be configured in the subframe #5.

Here, when a radio frame includes subframes #0 to 9 in the unlicensed band and each subframe includes two slots, a sequence of the CRS may be generated based on numbers corresponding to slots in which the SSS is configured.

Here, when the SSS is configured in at least one of the subframes #0 to 4, the sequence of the CRS may be generated based on slot numbers 0 and 1.

Here, when the SSS is configured in at least one of the subframes #5 to 9, the sequence of the CRS may be generated based on slot numbers 10 and 11.

Advantageous Effects

According to the present disclosure, a success rate of signal transmission can be enhanced in an unlicensed band. Signals can be transmitted or received efficiently in the unlicensed band. Therefore, performance of a communication network can be enhanced.

DESCRIPTION OF DRAWINGS

FIG. 1 is a conceptual diagram illustrating a first embodiment of a wireless communication network;

FIG. 2 is a conceptual diagram illustrating a second embodiment of a wireless communication network;

FIG. 3 is a conceptual diagram illustrating a third embodiment of a wireless communication network;

FIG. 4 is a conceptual diagram illustrating a fourth embodiment of a wireless communication network;

FIG. 5 is a block diagram illustrating an embodiment of a communication node constituting a wireless communication network;

FIG. 6 is a conceptual diagram illustrating an embodiment of a type 1 frame;

FIG. 7 is a conceptual diagram illustrating an embodiment of a type 2 frame;

FIG. 8 is a conceptual diagram illustrating an embodiment of a resource grid of a slot included in a subframe;

FIG. 9 is a conceptual diagram illustrating an embodiment of a CRS based on one antenna port (i.e., antenna port 0);

FIG. 10 is a conceptual diagram illustrating an embodiment of a CRS based on two antenna ports (i.e., antenna ports 0 and 1);

FIG. 11 is a conceptual diagram illustrating an embodiment of a CRS based on four antenna ports (i.e., antenna ports 0, 1, 2, and 3);

FIG. 12 is a conceptual diagram illustrating an embodiment of a CSI-RS based on CSI-RS configuration 0;

FIG. 13 is a conceptual diagram illustrating an embodiment of PSS and SSS configurations when a normal CP is used in a network based on a FDD manner;

FIG. 14 is a conceptual diagram illustrating an embodiment of PSS and SSS configurations when a normal CP is used in a network based on a TDD manner;

FIG. 15 is a conceptual diagram illustrating an embodiment of DRS configurations in a network based on a FDD manner;

FIG. 16 is a conceptual diagram illustrating an embodiment of DRS configurations in a network based on a TDD manner;

FIG. 17 is a conceptual diagram illustrating an embodiment of DRS configurations based on signals corresponding to antenna ports 0 and 1;

FIG. 18 is a conceptual diagram illustrating an embodiment of DRS configurations based on signals corresponding to antenna ports 0 to 3;

FIG. 19 is a conceptual diagram illustrating other embodiment of DRS configurations based on signals corresponding to antenna ports 0 to 3;

FIG. 20 is a conceptual diagram illustrating other embodiment of DRS configurations in a network based on a TDD manner;

FIG. 21 is a conceptual diagram illustrating an embodiment of PSS and SSS configurations;

FIG. 22 is a conceptual diagram illustrating other embodiment of PSS and SSS configurations;

FIG. 23 is a conceptual diagram illustrating an embodiment of PSS and SSS configurations which are repeated in a time domain;

FIG. 24 is a conceptual diagram illustrating a first embodiment of DRS configurations;

FIG. 25 is a conceptual diagram illustrating a second embodiment of DRS configurations;

FIG. 26 is a conceptual diagram illustrating a third embodiment of DRS configurations;

FIG. 27 is a conceptual diagram illustrating a fourth embodiment of DRS configurations;

FIG. 28 is a conceptual diagram illustrating a fifth embodiment of DRS configurations;

FIG. 29 is a conceptual diagram illustrating a sixth embodiment of DRS configurations;

FIG. 30 is a conceptual diagram illustrating a seventh embodiment of DRS configurations;

FIG. 31 is a conceptual diagram illustrating an eighth embodiment of DRS configurations;

FIG. 32 is a conceptual diagram illustrating a ninth embodiment of DRS configurations;

FIG. 33 is a conceptual diagram illustrating a tenth embodiment of DRS configurations;

FIG. 34 is a conceptual diagram illustrating an eleventh embodiment of DRS configurations;

FIG. 35 is a conceptual diagram illustrating a twelfth embodiment of DRS configurations;

FIG. 36 is a sequence chart illustrating an embodiment of a method for transmitting and receiving a DRS;

FIG. 37 is a timing diagram illustrating DRS transmission/reception timing indicated by DMTC related information;

FIG. 38 is a timing diagram illustrating an embodiment of DRS delay transmission;

FIG. 39 is a timing diagram illustrating an embodiment of a delay period of a DRS;

FIG. 40 is a timing diagram illustrating other embodiment of a delay period of a DRS;

FIG. 41 is a conceptual diagram illustrating subframe numbers based on each of burst time synchronization and DRS time synchronization;

FIG. 42 is a conceptual diagram illustrating a first embodiment of subframe numbers which are used for generating and detecting a CRS included in a DRS;

FIG. 43 is a conceptual diagram illustrating a second embodiment of subframe numbers which are used for generating and detecting a CRS included in a DRS;

FIG. 44 is a conceptual diagram illustrating a third embodiment of subframe numbers which are used for generating and detecting a CRS included in a DRS;

FIG. 45 is a conceptual diagram illustrating a fourth embodiment of subframe numbers which are used for generating and detecting a CRS included in a DRS;

FIG. 46 is a conceptual diagram illustrating a fifth embodiment of subframe numbers which are used for generating and detecting a CRS included in a DRS; and FIG. 47 is a conceptual diagram illustrating a sixth embodiment of subframe numbers which are used for generating and detecting a CRS included in a DRS.

MODE FOR INVENTION

The present disclosure may be modified in various ways and the present disclosure may include various embodiments. The embodiments will be shown in figures and described in detail. However, the present disclosure is not limited to specific embodiments. It should be understood that the present disclosure includes all modifications, similar embodiments, and alternative embodiments belonging to idea and technical scope thereof.

The terms "first, second, and so on" will be used for describing various elements. However, the elements are not limited thereto. These terms are only used to distinguish one element from another. For example, a first element could be termed a second element, and, similarly, the second element could be termed the first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, in the case that an element is referred to as being "directly connected" or "directly coupled" to another element, it will be understood that there are no intervening elements.

The terminology used herein is for the purpose of describing particular embodiments only and is not intended to be limiting of the present disclosure. As used herein, the singular forms "a," "an," and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present disclosure will be described in greater detail with reference to the accompanying drawings. In order to facilitate general understanding in describing the present disclosure, the same components in the drawings are denoted with the same reference signs, and repeated description thereof will be omitted.

Wireless communication networks to which embodiments according to the present disclosure will be described. However, the wireless communication networks to which embodiments according to the present disclosure are applied are not restricted to what will be described below. That is, embodiments according to the present disclosure may be applied to various wireless communication networks.

FIG. 1 is a conceptual diagram illustrating a first embodiment of a wireless communication network.

Referring to FIG. 1, a first base station 110 may support cellular communications (e.g., Long Term Evolution (LTE), LTE-Advanced (LTE-A), Licensed Assisted Access (LAA), etc. standardized in a 3rd Generation Partnership Project (3GPP)). The first base station 110 may support technologies such as a Multiple Input Multiple Output (MIMO) (e.g., Single-User (SU)—MIMO, Multi-User (MU)—MIMO, massive MIMO, etc.), a Coordinated multi-point transmission/reception (CoMP), a Carrier Aggregation (CA), etc. The first base station 110 may operate in a licensed band (F1), and form a macro cell. The first base station 100 may be connected to other base stations (e.g., a second base station 120, a third base station 130, etc.) through ideal backhaul links or non-ideal backhaul links.

The second base station 120 may be located in coverage of the first base station 110. Also, the second base station 120 may operate in an unlicensed band (F3), and form a small cell. The third base station 130 may also be located in coverage of the first base station 110. The third base station 130 may operate in the unlicensed band (F3), and form a small cell. Each of the second base station 120 and the third base station 130 may support a Wireless Local Area Network (WLAN) standardized in an Institute of Electrical and Electronics Engineers (IEEE) 802.11. Each user equipment (UE) connected to the first base station 110 may transmit and receive signals through a CA using the licensed band (F1) and the unlicensed band (F3).

FIG. 2 is a conceptual diagram illustrating a second embodiment of a wireless communication network.

Referring to FIG. 2, each of a first base station 210 and a second base station 220 may support cellular communications (e.g., LTE, LTE-A, LAA, etc.). Each of the first base station 210 and the second base station 220 may support MIMO (e.g., SU-MIMO, MU-MIMO, massive MIMO, etc.), CoMP, CA, etc. Also, each of the base stations 210 and 220 may operate in the licensed band (F1), and form each small cell. Each of the base stations 210 and 220 may be located in coverage of a base station forming a macro cell. The first base station 210 may be connected with a third base station 230 through an ideal backhaul link or a non-ideal backhaul link. Also, the second base station 220 may be connected with a fourth base station 240 through an ideal backhaul link or a non-ideal backhaul link.

The third base station 230 may be located in coverage of the first base station 210. The third base station 230 may operate in the unlicensed band (F3), and form a small cell. The fourth base station 240 may be located in coverage of the second base station 220. The fourth base station 240 may operate in the unlicensed band (F3), and form a small cell. Each of the base stations 230 and 240 may support WLAN standardized in IEEE 802.11. Each of the first base station 210, an UE connected to the first base station 210, the second base station 220, and an UE connected to the second base station 220 may transmit and receive signals through a CA using the licensed band (F1) and the unlicensed band (F3).

FIG. 3 is a conceptual diagram illustrating a third embodiment of a wireless communication network.

Referring to FIG. 3, each of a first base station 310, a second base station 320, and a third base station 330 may support cellular communications (e.g., LTE, LTE-A, LAA, etc.). Each of the first base station 310, the second base station 320, and the third base station 330 may support MIMO (e.g., SU-MIMO, MU-MIMO, massive MIMO, etc.), CoMP, CA, etc. The first base station 310 may operate in the licensed band (F1), and form a macro cell. The first base station 310 may be connected to other base stations (e.g., the second base station 320, the third base station 330, etc.) through ideal backhaul links or non-ideal backhaul links. The second base station 320 may be located in coverage of the first base station 310. The second base station 320 may operate in the licensed band (F1), and form a small cell. The third base station 330 may be located in coverage of the first base station 310. The third base station 330 may operate in the licensed band (F1), and form a small cell.

The second base station 320 may be connected with a fourth base station 340 through an ideal backhaul link or a non-ideal backhaul link. The fourth base station 340 may be located in coverage of the second base station 320. The fourth base station 340 may operate in the unlicensed band (F3), and form a small cell. The third base station 330 may be connected with a fifth base station 350 through an ideal backhaul link or a non-ideal backhaul link. The fifth base station 350 may be located in coverage of the third base station 330. The fifth base station 350 may operate in the unlicensed band (F3), and form a small cell. Each of the base stations 340 and 350 may support WLAN standardized in IEEE 802.11.

Each of the first base station 310, an UE (not-depicted) connected to the first base station 310, the second base station 320, an UE (not-depicted) connected to the second base station 320, the third base station 330, and an UE (not-depicted) connected to the third base station 330 may transmit and receive signals through a CA using the licensed band (F1) and the unlicensed band (F3).

FIG. 4 is a conceptual diagram illustrating a fourth embodiment of a wireless communication network.

Referring to FIG. 4, each of a first base station 410, a second base station 420, and a third base station 430 may support cellular communications (e.g., LTE, LTE-A, LAA, etc.). Each of the first base station 410, the second base station 420, and the third base station 430 may support MIMO (e.g., SU-MIMO, MU-MIMO, massive MIMO, etc.), CoMP, CA, etc. The first base station 410 may operate in the licensed band (F1), and form a macro cell. The first base station 410 may be connected to other base stations (e.g., the second base station 420, the third base station 430, etc.) through ideal backhaul links or non-ideal backhaul links. The second base station 420 may be located in coverage of the first base station 410. The second base station 420 may operate in the licensed band (F2), and form a small cell. The third base station 430 may be located in coverage of the first base station 410. The third base station 430 may operate in the licensed band (F2), and form a small cell. Each of the second base station 420 and the third base station 430 may operate in the licensed band (F2) different from the licensed band (F1) in which the first base station 410 operates.

The second base station 420 may be connected with a fourth base station 440 through an ideal backhaul link or a non-ideal backhaul link. The fourth base station 440 may be located in coverage of the second base station 420. The fourth base station 440 may operate in the unlicensed band (F3), and form a small call. The third base station 430 may be connected with a fifth base station 450 through an ideal backhaul link or a non-ideal backhaul link. The fifth base station 450 may be located in coverage of the third base station 430. The fifth base station 450 may operate in the unlicensed band (F3), and form a small cell. Each of the base stations 440 and 450 may support WLAN standardized in IEEE 802.11.

Each of the first base station 410 and an UE (not-depicted) connected to the first base station 410 may transmit and receive signals through a CA using the licensed band (F1) and the unlicensed band (F3). Each of the second base station 420, an UE (not-depicted) connected to the second base station 420, the third base station 430, and an UE (not-depicted) connected to the third base station 430 may transmit and receive signals through a CA using the licensed band (F2) and the unlicensed band (F3).

The above-described communication nodes constituting a wireless communication network (e.g., a base station, an UE, etc.) may transmit signals according to a Listen-Before-Talk (LBT) procedure in the unlicensed band. That is, the communication node may determine whether the unlicensed band is occupied or not by performing an energy detection operation. The communication node may transmit a signal when the unlicensed band is determined as idle state. In this case, the communication node may transmit a signal when the unlicensed band is maintained as idle state during a contention window according to a random backoff operation. On the contrary, when the unlicensed band is determined as a busy state, the communication node may not transmit a signal.

Alternatively, the communication node may transmit a signal based on a Carrier Sensing Adaptive Transmission (CSAT) operation. That is, the communication node may transmit a signal based on a pre-configured duty cycle. The communication node may transmit a signal when a current duty cycle is a duty cycle assigned for communication nodes supporting cellular communications. On the contrary, the communication node may not transmit a signal when a current duty cycle is a duty cycle assigned for communication nodes supporting other communications (e.g., WALN, etc.) except cellular communications. The duty cycle may be determined adaptively based on the number of communication nodes supporting WLAN in the unlicensed band, a usage state of the unlicensed band, etc.

The communication node may perform discontinuous transmission in the unlicensed band. For example, if a maximum transmission duration or a maximum channel occupancy time (max COT) is configured for the unlicensed band, the communication node may transmit signals during the maximum transmission duration or the maxim channel occupancy time. In a case that the communication node cannot transmit whole signals during the current maximum transmission duration (or, maximum channel occupancy time), the communication node may transmit the rest of signals in a next maximum transmission duration (or, next maximum channel occupancy time). Also, the communication node may select a carrier having relatively smaller interferences among unlicensed bands, and operate in the selected carrier. Also, in the case that the communication node transmits signals in the unlicensed band, transmission power may be controlled in order to reduce interferences to other communication nodes.

Meanwhile, the communication node may support communication protocols based on code division multiple access (CDMA), wideband CDMA (WCDMA), time division multiple access (TDMA), frequency division multiple access (FDMA), single carrier FDMA (SC-FDMA), orthogonal frequency division multiplexing (OFDM), or orthogonal frequency division multiple access (OFDMA).

A base station among communication nodes may be referred to as a Node-B (NB), an evolved Node-B (eNB), a base transceiver station (BTS), a radio base station, a radio transceiver, an access point (AP), or an access node. Also, a user equipment (UE) among communication nodes may be referred to as a terminal, an access terminal, a mobile terminal, a station, a subscriber station, a portable subscriber station, a mobile station, a node, or a device. The communication node may have a structure which will be described below.

FIG. 5 is a block diagram illustrating an embodiment of a communication node constituting a wireless communication network.

Referring to FIG. 5, a communication node 500 may include at least one processor 510, a memory 520 and a transceiver 530 connected to a network and performing communication. Further, the communication node 500 may include an input interface unit 540, an output interface unit 550, and a storage 560. The respective components included in the communication node 500 may be connected via a bus 570 to communicate with each other.

The processor 510 may perform a program command stored in the memory 520 and/or the storage 560. The processor 510 may be a central processing unit (CPU), a graphics processing unit (GPU) or a dedicated processor in which the methods according to embodiments of the present disclosure are performed. The memory 520 and the storage 560 may include a volatile storage medium and/or a non-volatile storage medium. For example, the memory 520 may include a read only memory (ROM) and/or a random access memory (RAM).

Operation methods of the communication node in the wireless communication network will be described below. Although a method (e.g., signal transmission or reception) performed by a first communication node will be described, a second communication node corresponding thereto may perform a method (e.g., signal reception or transmission) corresponding to the method performed by the first communication node. That is, when an operation of the UE is described, the base station corresponding thereto may perform an operation corresponding to the operation of the UE. On the contrary, when an operation of the base station is described, the UE may perform an operation corresponding to an operation of the base station.

Meanwhile, the carrier aggregation (CA) may be applied to at least one of unlicensed band cells and at least one of licensed band cells. Configuration, addition, modification, or release of the unlicensed band cell may be performed through a radio resource control (RRC) signaling (e.g., procedure for transmitting/receiving RRCConnectionReconfiguration message (hereinafter, referred to as "RRC message")). The RRC message may be transmitted to a UE through the licensed band cell, and may include necessary information for managements and operations of the unlicensed band cell.

Unlike the licensed band, a period during which signals can be transmitted continuously in the unlicensed band may be restricted within the maximum transmission duration (or, maximum occupation duration). Also, in the case that signals are transmitted based on LBT, signals are transmitted when transmissions of other communication nodes have completed. When LTE (or, LTE-A) services are provided through the unlicensed band, transmission of a communication node supporting LTE or LTE-A services may have non-periodical, non-continuous, and opportunistic characteristics. According to such the characteristics, signals which are continuously transmitted by the communication node supporting LTE or LTE-A services during a predetermined time in an unlicensed band may be referred to as "unlicensed band burst."

In addition, a set of consecutive subframes including a combination of one or more channels (e.g., a physical control format indicator channel (PCFICH), a physical hybrid-automatic repeat request (HARQ) indicator channel (PHICH), a physical downlink control channel (PDCCH), a physical downlink shared channel (PDSCH), a physical multicast channel (PMCH), a physical uplink control channel (PUCCH), a physical uplink shared channel (PUSCH), etc.) and signals (e.g., synchronization signals, reference signals, etc.) defined in the licensed band may be transmitted through the unlicensed band. In this case, the transmission of subframes may be referred to as "unlicensed band transmission."

Frames used for transmission in the unlicensed band may be classified into downlink unlicensed band burst frames, uplink unlicensed band burst frames, and downlink/uplink unlicensed band burst frames. The downlink unlicensed band burst frame may include subframes to which the unlicensed band transmission is applied, and further include unlicensed band signals. In the downlink unlicensed band burst frame, the unlicensed band signal may be located before the subframe to which the unlicensed band transmission is applied. The unlicensed band signal may be configured so that timing of the subframe (or, slot, OFDM symbol) to which the unlicensed band transmission is applied coincides with timing of a subframe (or, slot, OFDM symbol) in the licensed band. Also, the unlicensed band signal may be used for automatic gain control (AGC), synchronization acquisition, channel estimation, etc. required for receiving data transmitted based on the unlicensed band transmission.

Meanwhile, the cellular communication network (e.g., LTE network) may support frequency division duplexing (FDD) or time division duplexing (TDD). A frame based on FDD may be defined as a type 1 frame, and a frame based on TDD may be defined as a type 2 frame.

FIG. 6 is a conceptual diagram illustrating an embodiment of a type 1 frame.

Referring to FIG. 6, a radio frame 600 may comprise 10 subframes, and each subframe may comprise two slots. Thus, the radio frame 600 may comprise 20 slots (e.g., slot #0, slot #1, slot #2, slot #3, . . . , slot #18, slot #19). The length ($T_f$) of the radio frame 600 may be 10 milliseconds (ms). Also, the length of each subframe may be 1 ms. Also, the length (Toot) of each slot may be 0.5 ms. Here, $T_s$ may be 1/30,720,000 second.

Each slot may comprise a plurality of OFDM symbols in time domain, and comprise a plurality of resource blocks (RBs) in frequency domain Each resource block may comprise a plurality of subcarriers in frequency domain. The number of OFDM symbols constituting each slot may be determined according to configuration of a cyclic prefix (CP). The CP may be classified into a normal CP and an extended CP. If the normal CP is used, each slot may comprise 7 OFDM symbols, and each subframe may comprise 14 OFDM symbols. If the extended CP is used, each slot may comprise 6 OFDM symbols, and each subframe may comprise 12 OFDM symbols.

FIG. 7 is a conceptual diagram illustrating an embodiment of a type 2 frame.

Referring to FIG. 7, a radio frame 700 may comprise two half frames, and each half frame may comprise 5 subframes. Thus, the radio frame 700 may comprise 10 subframes. The length ($T_f$) of the radio frame 700 may be 10 ms, and the length of each half frame may be 5 ms. The length of each subframe may be 1 ms. Here, $T_s$ may be 1/30,720,000 second.

The radio frame 700 may include at least one downlink subframe, at least one uplink subframe, and at least one special subframe. Each of the downlink subframe and the uplink subframe may comprise two slots. The length ($T_{slot}$) of each slot may be 0.5 ms. Each of subframe #1 and subframe #6, among subframes constituting the radio frame 700, may be a special subframe. Each special subframe may include a downlink pilot time slot (DwPTS), a guard period (GP), and an uplink pilot time slot (UpPTS).

The DwPTS may be regarded as included in downlink duration, and used for cell search, and time and frequency synchronization acquisition of an UE. The GP may be used for resolving interference to uplink data transmission which may occur due to delay of downlink data reception. Also, the GP may include a time required for switching between downlink data reception operation to uplink data transmission operation. The UpPTS may be used for uplink channel estimation, and time and frequency synchronization acquisition of an UE, etc.

The lengths of the DwPTS, GP, and UpPTS included in the special subframe may be controlled variably as needed. Also, the numbers and positions of the downlink subframes, uplink subframes, and special subframes, included in the radio frame 700, may vary as needed.

FIG. 8 is a conceptual diagram illustrating an embodiment of a resource grid of a slot included in a subframe.

Referring to FIG. 8, when the normal CP is used, each resource block (RB) of a slot included in a downlink subframe or an uplink subframe may comprise 7 OFDM symbols in time domain, and 12 subcarriers in frequency domain. In this case, a resource defined by a single OFDM symbol in time domain and a single subcarrier in frequency domain may be referred to as a resource element (RE).

In downlink transmission of a cellular communication network (e.g., LTE network), allocation of resources for an UE may be performed in unit of RBs, and mapping of reference signals and synchronization signals may be performed in unit of REs.

Meanwhile, the reference signal may be used for channel quality measurement, channel estimate for data demodulation, and so on. The reference signal may be generated based on a sequence. For example, the sequence used for generating the reference signal may include a constant amplitude zero auto-correlation (CAZAC) sequence, a pseudo-random (PN) sequence, a cyclically shifted sequence, and so on. The CAZAC sequence may include a zadoff-chu based sequence (ZC-based sequence), and so on. The PN sequence may include a m-sequence, a gold sequence, a kasami sequence, and so on.

The reference signal may be classified into a cell-specific reference signal (CRS), a UE-specific reference signal, a channel state information-reference signal (CSI-RS), a positioning reference signal (PRS), and so on. The CRS may be transmitted to all UEs belonging to a cell and used for the channel estimate. The UE-specific reference signal may be transmitted to a specific UE or a specific group belonging to a cell and used for data demodulation at the specific UE or the specific group. Here, the specific group may include at least one UE. The CSI-RS may be used for the channel quality measurement. The CRS may be configured for respective antenna ports. The CRS for respective antenna ports may be as follows.

FIG. 9 is a conceptual diagram illustrating an embodiment of a CRS based on one antenna port (i.e., antenna port 0), FIG. 10 is a conceptual diagram illustrating an embodiment of a CRS based on two antenna ports (i.e., antenna ports 0 and 1), and FIG. 11 is a conceptual diagram illustrating an embodiment of a CRS based on four antenna ports (i.e., antenna ports 0, 1, 2, and 3).

Referring to FIGS. 9 to 11, a base station may use a plurality of antennas, and a resource grid may be configured for each of the plurality of antennas. The 1 may indicate an OFDM symbol number (or OFDM symbol index, OFDM symbol position). In the case that the slot includes 7 OFDM symbols in the time domain (i.e., in the case that the normal CP is used), the 1 may indicate an OFDM symbol #0, an OFDM symbol #1, an OFDM symbol #2, an OFDM symbol #3, an OFDM symbol #4, an OFDM symbol #5, and an OFDM symbol #6.

The k may indicate a subcarrier number (or subcarrier index, subcarrier position). In the case that the resource block includes 12 subcarriers in the frequency domain, the k may indicate a subcarrier #0, a subcarrier #1, a subcarrier #2, a subcarrier #3, a subcarrier #4, a subcarrier #5, a subcarrier #6, a subcarrier #7, a subcarrier #8, a subcarrier #9, a subcarrier #10, and a subcarrier #11.

$R_0$ may indicate a CRS of a first antenna among the plurality of antennas in the antenna port 0. $R_1$ may indicate a CRS of a second antenna among the plurality of antennas in the antenna port 1. $R_2$ may indicate a CRS of a third antenna among the plurality of antennas in the antenna port 2. $R_3$ may indicate a CRS of a fourth antenna among the plurality of antennas in the antenna port 3.

Each position of $R_0$, $R_1$, $R_2$, and $R_3$ may not be overlapped respectively in the subframe. For removing interferences between antennas, resource elements used for the CRS of one antenna may not be used for the CRS of other antenna. The CRS may be configured per 6 subcarriers in same OFDM symbol. That is, 5 subcarriers may exist between CRSs in same OFDM symbol.

Meanwhile, the CRS position may be configured regardless of UE in the frequency and time domains of the subframe. That is, a sequence used for generating CRS (hereinafter, referred to as "CRS sequence") may be configured regardless of UE. Therefore, all UEs located in a cell may receive the CRS. The CRS position and sequence may be configured based on a cell identity (ID), and so on. For example, in the time domain, the CRS position may be configured based on an antenna number, the number of OFDM symbols in the resource block, and so on. In the frequency domain, the CRS position may be configured based on an antenna number, the number of OFDM symbols in the resource block, a cell ID, an OFDM symbol number, a slot number, and so on.

The CRS sequence may be applied in the unit of OFDM symbol in the subframe. The CRS sequence may be variable according to a cell ID, a slot number, an OFDM symbol number, a type of the CP, and so on. The number of subcarriers in which the reference signals for respective antenna ports (e.g., CRS) are configured may be 2 in one OFDM symbol. In the case that the subframe includes $N_{RB}$ indicating the number of resource blocks in the frequency domain, the number of subcarriers in which the reference signals for respective antenna ports (e.g., CRS) are configured may be "$2 \times N_{RB}$" in one OFDM symbol. In this case, the length of CRS sequence may be "$2 \times N_{RB}$." The CRS sequence may be defined as following equation 1.

$$r_{l,n_s}(m) = \frac{1}{\sqrt{2}}(1 - 2 \cdot c(2m)) + j\frac{1}{\sqrt{2}}(1 - 2 \cdot c(2m+1)), \quad \text{[Equation 1]}$$
$$m = 0, 1, \ldots, 2N_{RB}^{max,DL} - 1$$

The $r_{l,n_s}(m)$ may indicate the CRS sequence. The l may indicate an OFDM symbol number. The $n_s$ is may indicate a slot number. The $N_{RB}^{maxDL}$ may indicate the maximum number of resource blocks in the downlink. The m may indicate an index of the resource block. The function c(*) of the equation 1 may be defined as following equation 2.

$$c(n) = (x_1(n+N_C) + x_2(n+N_C)) \bmod 2$$

$$x_1(n+31) = (x_1(n+3) + x_1(n)) \bmod 2$$

$$x_2(n+31) = (x_2(n+3) + x_2(n+2) + x_2(n+1) + x_2(n)) \bmod 2 \quad \text{[Equation 2]}$$

The $N_c$ may be 1600. Initial values of the function $x_1(*)$ in the equation 2 may be defined as following equation 3.

$$x_1(0) = 1, x_1(n) = 0, n = 1, \ldots, 30 \quad \text{[Equation 3]}$$

The $c_{init}$, as an initial value of the function $x_2(*)$ in the equation 2, may be configured to be variable for respective cases. For example, the function x2(*) may be initialized according to a cell ID, a slot number, an OFDM symbol number, a type of the CP, and so on for respective OFDM symbols. The $c_{init}$, as the initial value of the function $x_2(*)$ of the equation 2, may be defined as following equation 4.

$$c_{init} = 2^{10} \cdot (7 \cdot (n_s+1)+l+1) \cdot (2 \cdot N_{ID}^{cell}+1) + 2 \cdot N_{ID}^{cell} + N_{CP} \quad \text{[Equation 4]}$$

The $N_{CP}$ may be configured as 1 when the normal CP is used, or the $N_{CP}$ may be configured as 0 when the extended CP is used. The $N_{ID}^{cell}$ may indicate a cell ID. The l may indicate an OFDM symbol number. The $n_s$ may indicate a slot number.

Meanwhile, a reference signal $a_{k,l}^{(p)}$ which is transmitted through l-th OFDM symbol of k-th subcarrier in a resource block of antenna port p may be defined as following equation 5.

$$a_{k,l}^{(p)} = r_{l,n_s}(m') \quad \text{[Equation 5]}$$

The subcarrier number (k) and the OFDM symbol number (l) may be defined as following equation 6.

$$k = 6m + (v + v_{shift}) \bmod 6 \quad \text{[Equation 6]}$$

-continued
$$l = \begin{cases} 0, N_{symb}^{DL} - 3 & \text{if } p \in \{0, 1\} \\ 1 & \text{if } p \in \{2, 3\} \end{cases}$$
$$m = 0, 1, \ldots, 2 \cdot N_{RB}^{DL} - 1$$
$$m' = m + N_{RB}^{max,DL} - N_{RB}^{DL}$$

The $N_{symb}^{DL}$ may indicate the number of OFDM symbols in one slot in the downlink. The $N_{RB}^{DL}$ may indicate the number of resource blocks in the downlink. The $N_{RB}^{max,DL}$ may indicate the maximum number of resource blocks in the downlink. The v used for determining a subcarrier number may be defined as following equation 7.

$$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s \bmod 2) & \text{if } p = 2 \\ 3 + 3(n_s \bmod 2) & \text{if } p = 3 \end{cases} \quad \text{[Equation 7]}$$

The p may indicate an antenna port number. The $n_s$ may indicate a slot number. The $v_{shift}$, as a value of frequency shift according to a cell, may be configured as "$N_{ID}^{cell} \bmod 6$." Here, "x mod y" may indicate a remaining value according to a calculation by which x is divided y.

The CSI-RS may be used for estimating channel state information (CSI) in the LTE network. The UE may estimate the CSI based on the CSI-RS received from the base station and report the estimated CSI to the base station. The CSI may include a channel quality indicator (CQI), a precoding matrix indicator (PMI), a rank indicator (RI), and so on.

For reducing inter-cell interferences in a multiple cell environment, the CSI-RS may have different maximum 32 configurations. The CSI-RS configurations may be different according to the number of antenna ports which are used in a cell. The CSI-RS configurations used in neighboring cells may be different. The antenna port used for transmitting the CSI-RS may be referred to as "CSI-RS port." In a resource grid of the CSI-RS port, resource elements to which the CSI-RS are allocated may be referred to as "CSI-RS pattern" or "CSI-RS resource configuration." The CSI-RS may be transmitted through maximum 8 antenna ports (e.g., "p=15," "p=15, 16," "p=15, 16, 17, 18," . . . , and "p=15, . . . , 22"). Each of 7 antenna ports except for "p=15, . . . , 22" among the 8 antenna ports may correspond to CSI-RS port 0, CSI-RS port 1, CSI-RS port 2, CSI-RS port 3, CSI-RS port 4, CSI-RS port 5 and CSI-RS port 6, respectively.

In the case that the normal CP is used, following table 1 may indicate an embodiment of the CSI-RS configurations which may be used in the type 1 frame (i.e., frame based on the FDD manner) and the type 2 frame (i.e., frame based on the TDD manner).

TABLE 1

| CSI-RS | Number of CSI-RS configurations | | | | | |
|---|---|---|---|---|---|---|
| config- | 1 or 2 | | 4 | | 8 | |
| uration | (k', l') | $n_s$ mod 2 | (k', l') | $n_s$ mod 2 | (k', l') | $n_s$ mod 2 |
| 0 | (9, 5) | 0 | (9, 5) | 0 | (9, 5) | 0 |
| 1 | (11, 2) | 1 | (11, 2) | 1 | (11, 2) | 1 |

TABLE 1-continued

| CSI-RS config- uration | Number of CSI-RS configurations | | | | | |
|---|---|---|---|---|---|---|
| | 1 or 2 | | 4 | | 8 | |
| | (k', l') | $n_s$ mod 2 | (k', l') | $n_s$ mod 2 | (k', l') | $n_s$ mod 2 |
| 2 | (9, 2) | 1 | (9, 2) | 1 | (9, 2) | 1 |
| 3 | (7, 2) | 1 | (7, 2) | 1 | (7, 2) | 1 |
| 4 | (9, 5) | 1 | (9, 5) | 1 | (9, 5) | 1 |
| 5 | (8, 5) | 0 | (8, 5) | 0 | | |
| 6 | (10, 2) | 1 | (10, 2) | 1 | | |
| 7 | (8, 2) | 1 | (8, 2) | 1 | | |
| 8 | (6, 2) | 1 | (6, 2) | 1 | | |
| 9 | (8, 5) | 1 | (8, 5) | 1 | | |
| 10 | (3, 5) | 0 | | | | |
| 11 | (2, 5) | 0 | | | | |
| 12 | (5, 2) | 1 | | | | |
| 13 | (4, 2) | 1 | | | | |
| 14 | (3, 2) | 1 | | | | |
| 15 | (2, 2) | 1 | | | | |
| 16 | (1, 2) | 1 | | | | |
| 17 | (0, 2) | 1 | | | | |
| 18 | (3, 5) | 1 | | | | |
| 19 | (2, 5) | 1 | | | | |

In the case that the normal CP is used, following table 2 may indicate an embodiment of the CSI-RS configurations which may be used in the type 2 frame. That is, following table 2 may indicate the embodiment of the CSI-RS configurations for only the type 2 frame.

TABLE 2

| CSI-RS config- uration | Number of CSI-RS configurations | | | | | |
|---|---|---|---|---|---|---|
| | 1 or 2 | | 4 | | 8 | |
| | (k', l') | $n_s$ mod 2 | (k', l') | $n_s$ mod 2 | (k', l') | $n_s$ mod 2 |
| 20 | (11, 1) | 1 | (11, 1) | 1 | (11, 1) | 1 |
| 21 | (9, 1) | 1 | (9, 1) | 1 | (9, 1) | 1 |
| 22 | (7, 1) | 1 | (7, 1) | 1 | (7, 1) | 1 |
| 23 | (10, 1) | 1 | (10, 1) | 1 | | |
| 24 | (8, 1) | 1 | (8, 1) | 1 | | |
| 25 | (6, 1) | 1 | (6, 1) | 1 | | |
| 26 | (5, 1) | 1 | | | | |
| 27 | (4, 1) | 1 | | | | |
| 28 | (3, 1) | 1 | | | | |
| 29 | (2, 1) | 1 | | | | |
| 30 | (1, 1) | 1 | | | | |
| 31 | (0, 1) | 1 | | | | |

In the case that (k',l') of the tables 1 and 2 is applied to following equation 8, resource elements to which the corresponding CSI-RS are allocated may be determined in the CSI-RS port. The k' may indicate a subcarrier number. The may indicate an OFDM symbol number. The $n_s$ may indicate a slot number. The CSI-RS sequence $r_{l,n_s}(m')$ in the $n_s$ may be mapped according to the $a_{k,l}^{(p)}$ which is used as a reference symbol of the CSI-RS port.

$$a_{k,l}^{(p)} = w_{l''} \cdot r_{l,n_s}(m') \quad \text{[Equation 8]}$$

Variables of the equation 8 may be defined as following equation 9.

$$k = k' + 12m + \begin{cases} -0 & \text{for } p \in \{15, 16\}, \text{Normal } CP \\ -6 & \text{for } p \in \{17, 18\}, \text{Normal } CP \\ -1 & \text{for } p \in \{19, 20\}, \text{Normal } CP \\ -7 & \text{for } p \in \{21, 22\}, \text{Normal } CP \\ -0 & \text{for } p \in \{15, 16\}, \text{Extended } CP \\ -3 & \text{for } p \in \{17, 18\}, \text{Extended } CP \\ -6 & \text{for } p \in \{19, 20\}, \text{Extended } CP \\ -9 & \text{for } p \in \{21, 22\}, \text{Extended } CP \end{cases} \quad \text{[Equation 9]}$$

$$l = l' + \begin{cases} l'' & CSI\text{-}RS \text{ configurations } 0\text{-}19, \text{Normal } CP \\ 2l'' & CSI\text{-}RS \text{ configurations } 20\text{-}31, \text{Normal } CP \\ l'' & CSI\text{-}RS \text{ configurations } 0\text{-}27, \text{Extended } CP \end{cases}$$

$$w_{l''} = \begin{cases} 1 & p \in \{15, 17, 19, 21\} \\ (-1)^{l''} & p \in \{16, 18, 20, 22\} \end{cases}$$

$$l'' = 0, 1$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

The CSI-RS sequence may be defined as following equation 10. A function c(*) of following equation 10 may be identical to the function c(*) of the equation 2.

$$r_{l,n_s}(m) = \frac{1}{\sqrt{2}}(1 - 2 \cdot c(2m)) + j\frac{1}{\sqrt{2}}(1 - 2 \cdot c(2m + 1)), \quad \text{[Equation 10]}$$

$$m = 0, 1, \ldots, N_{RB}^{max,DL} - 1$$

An initial value ($c_{init}$) of the CSI-RS may be defined as following equation 11. The in following equation 11 may be identical to a cell ID.

$$c_{init} = 2^{10} \cdot (7 \cdot (n_s+1)+l+1) \cdot (2 \cdot N_{ID}^{CSI}+1) + 2 \cdot N_{ID}^{CSI} + N_{CP} \quad \text{[Equation 11]}$$

FIG. 12 is a conceptual diagram illustrating an embodiment of a CSI-RS based on CSI-RS configuration 0.

Referring to FIG. 12, $R_{15}$, $R_{16}$, $R_{17}$, Rig, $R_{19}$, $R_{20}$, $R_{21}$, and $R_{22}$ may indicate the CSI-RS. $R_{15}$ and Rib may be respectively allocated to OFDM symbols #5 and 6 of a subcarrier #9 in a first slot of a subframe. $R_{17}$ and $R_{18}$ may be respectively allocated to OFDM symbols #5 and 6 of a subcarrier #3 in a first slot of a subframe. $R_{19}$ and $R_{20}$ may be respectively allocated to OFDM symbols #5 and 6 of a subcarrier #8 in a first slot of a subframe. $R_{21}$ and $R_{22}$ may be respectively allocated to OFDM symbols #5 and 6 of a subcarrier #2 in a first slot of a subframe.

Meanwhile, a CSI-RS period ($T_{CSI-RS}$) and a CSI-RS subframe offset ($\Delta_{CSI-RS}$) may be determined based on CSI-RS subframe configuration ($I_{CSI-RS}$) as following table 3.

TABLE 3

| $I_{CSI-RS}$ | $T_{CSI-RS}$ (UNIT: SUBFRAME) | $\Delta_{CSI-RS}$ (UNIT: SUBFRAME) |
|---|---|---|
| 0~4 | 5 | $I_{CSI-RS}$ |
| 5~14 | 10 | $I_{CSI-RS}$-5 |
| 15~34 | 20 | $I_{CSI-RS}$-15 |
| 35~74 | 40 | $I_{CSI-RS}$-35 |
| 75~154 | 80 | $I_{CSI-RS}$-75 |

The CSI-RS may be transmitted in a radio frame and a slot which satisfy with following equation 12. The $n_f$ may indicate a radio frame number, and the $n_s$ may indicate a slot number.

$$(10 n_f + \lfloor n_s/2 \rfloor - \Delta_{CSI\text{-}RS}) \bmod T_{CSI\text{-}RS} = 0 \qquad \text{[Equation 12]}$$

Meanwhile, the synchronization signal may be transmitted from the base station. The UE may adjust time and frequency synchronization with the base station and identify a cell ID based on the synchronization signal. The synchronization signal may be classified into a primary synchronization signal (PSS) and a secondary synchronization signal (SSS). The PSS may be used for obtaining synchronization of the time and frequency domains such as OFDM symbol synchronization, slot synchronization, and so on. The SSS may be used for obtaining frame synchronization and identifying cell group ID and a type of the CP (i.e., normal CP, extended CP).

FIG. 13 is a conceptual diagram illustrating an embodiment of PSS and SSS configurations when a normal CP is used in a network based on a FDD manner.

Referring to FIG. 13, the PSS may be configured in the OFDM symbol #6 in the first slot of the subframe #0 and the OFDM symbol #6 in the first slot of the subframe #5. The SSS may be configured in the OFDM symbol #5 in the first slot of the subframe #0 and the OFDM symbol #5 in the first slot of the subframe #5.

FIG. 14 is a conceptual diagram illustrating an embodiment of PSS and SSS configurations when a normal CP is used in a network based on a TDD manner.

Referring to FIG. 14, the PSS may be configured in the OFDM symbol #2 in the first slot of the subframe #1 and the OFDM symbol #2 in the first slot of a the subframe #6. The SSS may be configured in the OFDM symbol #6 in the second slot of the subframe #0 and the OFDM symbol #6 in the second slot of the subframe #5.

Meanwhile, the synchronization signal may be generated based on a sequence. The synchronization signal may be used for identifying a cell ID by using different sequences. 3 sequences for the PSS may exist. 168 sequences for the SSS may exist. 504 cell IDs may be identified by using combinations of the 3 sequences for the PSS and the 168 sequences for the SSS. 168 cell groups may be classified by the SSS, and a unique ID in each cell group may be classified by the PSS.

As following equation 13, a cell ID $N_{ID}^{Cell}$ may be generated based on $N_{ID}^{(1)}$ and $N_{ID}^{(2)}$. The $N_{ID}^{(1)}$ may be classified by the SSS and indicate one of 0, 1, 2, ..., and 167. The $N_{ID}^{(2)}$ may be classified by the PSS and indicate one of 0, 1, and 2.

$$N_{ID}^{Cell} = 3 N_{ID}^{(1)} + N_{ID}^{(2)} \qquad \text{[Equation 13]}$$

The PSS may be generated based on the Zadoff-chu sequence $d_u(n)$ of following equation 14.

$$d_u(n) = \begin{cases} e^{-j\frac{\pi u n(n+1)}{63}} & n = 0, 1, \ldots, 30 \\ e^{-j\frac{\pi u (n+1)(n+2)}{63}} & n = 31, 32, \ldots, 61 \end{cases} \qquad \text{[Equation 14]}$$

In the Zadoff-chu sequence $d_u(n)$, a root index (u) may be configured according to the $N_{ID}^{(2)}$ as following table 4.

TABLE 4

| $N_{ID}^{(2)}$ | u |
| --- | --- |
| 0 | 25 |
| 1 | 29 |
| 2 | 34 |

Transmission positions $\alpha_{k,l}$ of the PSS may be defined in the time and frequency domains as following equation 15.

$$\alpha_{k,j} = d(n), n = 0, \ldots, 61 \qquad \text{[Equation 15]}$$
$$k = n - 31 + \frac{N_{RB}^{DL} N_{SC}^{RB}}{2}$$

The k may indicate a subcarrier number. The l may indicate an OFDM symbol number. The $N_{RB}^{DL}$ may indicate the total number of resource blocks in the downlink. The $N_{SC}^{RB}$ may indicate the number of subcarriers included in one resource block. The d(n) may be the Zadoff-chu sequence $d_u(n)$ of the equation 14. The PSS may be configured in resource elements indicated by the equation 15. In addition, the PSS may be configured in the OFDM symbol illustrated in FIGS. 13 and 14 in the time domain. Meanwhile, the subcarrier indicated by following equation 16 may be used as a guard subcarrier. That is, the PSS may not be transmitted in the subcarrier indicated by following equation 16.

$$k = n - 31 + \frac{N_{RB}^{DL} N_{SC}^{RB}}{2} \qquad \text{[Equation 16]}$$
$$n = -5, -4, \ldots, -1. 62, 63, \ldots, 66$$

The SSS may be generated based on a concatenation form in which 2 m-sequences having the length of 31 are interleaved. The m-sequence (d(2n), d(2n+1)) may be configured based on subframe numbers in which the SSS is transmitted (e.g., subframe #0, #5) as following equation 17.

$$d(2n) = \begin{cases} s_0^{(m_0)}(n) c_0(n), & \text{Subframe \#0} \\ s_1^{(m_1)}(n) c_0(n), & \text{Subframe \#5} \end{cases} \qquad \text{[Equation 17]}$$

$$d(2n+1) = \begin{cases} s_1^{(m_1)}(n) c_1(n) z_1^{(m_0)}(n), & \text{Subframe \#0} \\ s_0^{(m_0)}(n) c_1(n) z_1^{(m_1)}(n), & \text{Subframe \#5} \end{cases}$$

The n may have 0 to 30. The $m_0$ and $m_1$ may be configured based on the $N_{ID}^{(1)}$ as following tables 5 and 6.

TABLE 5

| $N_{ID}^{(1)}$ | $m_0$ | $m_1$ |
| --- | --- | --- |
| 0 | 0 | 1 |
| 1 | 1 | 2 |
| 2 | 2 | 3 |
| 3 | 3 | 4 |
| 4 | 4 | 5 |
| 5 | 5 | 6 |
| 6 | 6 | 7 |
| 7 | 7 | 8 |
| 8 | 8 | 9 |
| 9 | 9 | 10 |
| 10 | 10 | 11 |

TABLE 5-continued

| $N_{ID}^{(1)}$ | $m_0$ | $m_1$ |
|---|---|---|
| 11 | 11 | 12 |
| 12 | 12 | 13 |
| 13 | 13 | 14 |
| 14 | 14 | 15 |
| 15 | 15 | 16 |
| 16 | 16 | 17 |
| 17 | 17 | 18 |
| 18 | 18 | 19 |
| 19 | 19 | 20 |
| 20 | 20 | 21 |
| 21 | 21 | 22 |
| 22 | 22 | 23 |
| 23 | 23 | 24 |
| 24 | 24 | 25 |
| 25 | 25 | 26 |
| 26 | 26 | 27 |
| 27 | 27 | 28 |
| 28 | 28 | 29 |
| 29 | 29 | 30 |
| 30 | 0 | 2 |
| 31 | 1 | 3 |
| 32 | 2 | 4 |
| 33 | 3 | 5 |
| 34 | 4 | 6 |
| 35 | 5 | 7 |
| 36 | 6 | 8 |
| 37 | 7 | 9 |
| 38 | 8 | 10 |
| 39 | 9 | 11 |
| 40 | 10 | 12 |
| 41 | 11 | 13 |
| 42 | 12 | 14 |
| 43 | 13 | 15 |
| 44 | 14 | 16 |
| 45 | 15 | 17 |
| 46 | 16 | 18 |
| 47 | 17 | 19 |
| 48 | 18 | 20 |
| 49 | 19 | 21 |
| 50 | 20 | 22 |
| 51 | 21 | 23 |
| 52 | 22 | 24 |
| 53 | 23 | 25 |
| 54 | 24 | 26 |
| 55 | 25 | 27 |
| 56 | 26 | 28 |
| 57 | 27 | 29 |
| 58 | 28 | 30 |
| 59 | 0 | 3 |
| 60 | 1 | 4 |
| 61 | 2 | 5 |
| 62 | 3 | 6 |
| 63 | 4 | 7 |
| 64 | 5 | 8 |
| 65 | 6 | 9 |
| 66 | 7 | 10 |
| 67 | 8 | 11 |
| 68 | 9 | 12 |
| 69 | 10 | 13 |
| 70 | 11 | 14 |
| 71 | 12 | 15 |
| 72 | 13 | 16 |
| 73 | 14 | 17 |
| 74 | 15 | 18 |
| 75 | 16 | 19 |
| 76 | 17 | 20 |
| 77 | 18 | 21 |
| 78 | 19 | 22 |
| 79 | 20 | 23 |
| 80 | 21 | 24 |
| 81 | 22 | 25 |
| 82 | 23 | 26 |
| 83 | 24 | 27 |

TABLE 6

| $N_{ID}^{(1)}$ | $m_0$ | $m_1$ |
|---|---|---|
| 84 | 25 | 28 |
| 85 | 26 | 29 |
| 86 | 27 | 30 |
| 87 | 0 | 4 |
| 88 | 1 | 5 |
| 89 | 2 | 6 |
| 90 | 3 | 7 |
| 91 | 4 | 8 |
| 92 | 5 | 9 |
| 93 | 6 | 10 |
| 94 | 7 | 11 |
| 95 | 8 | 12 |
| 96 | 9 | 13 |
| 97 | 10 | 14 |
| 98 | 11 | 15 |
| 99 | 12 | 16 |
| 100 | 13 | 17 |
| 101 | 14 | 18 |
| 102 | 15 | 19 |
| 103 | 16 | 20 |
| 104 | 17 | 21 |
| 105 | 18 | 22 |
| 106 | 19 | 23 |
| 107 | 20 | 24 |
| 108 | 21 | 25 |
| 109 | 22 | 26 |
| 110 | 23 | 27 |
| 111 | 24 | 28 |
| 112 | 25 | 29 |
| 113 | 26 | 30 |
| 114 | 0 | 5 |
| 115 | 1 | 6 |
| 116 | 2 | 7 |
| 117 | 3 | 8 |
| 118 | 4 | 9 |
| 119 | 5 | 10 |
| 120 | 6 | 11 |
| 121 | 7 | 12 |
| 122 | 8 | 13 |
| 123 | 9 | 14 |
| 124 | 10 | 15 |
| 125 | 11 | 16 |
| 126 | 12 | 17 |
| 127 | 13 | 18 |
| 128 | 14 | 19 |
| 129 | 15 | 20 |
| 130 | 16 | 21 |
| 131 | 17 | 22 |
| 132 | 18 | 23 |
| 133 | 19 | 24 |
| 134 | 20 | 25 |
| 135 | 21 | 26 |
| 136 | 22 | 27 |
| 137 | 23 | 28 |
| 138 | 24 | 29 |
| 139 | 25 | 30 |
| 140 | 0 | 6 |
| 141 | 1 | 7 |
| 142 | 2 | 8 |
| 143 | 3 | 9 |
| 144 | 4 | 10 |
| 145 | 5 | 11 |
| 146 | 6 | 12 |
| 147 | 7 | 13 |
| 148 | 8 | 14 |
| 149 | 9 | 15 |
| 150 | 10 | 16 |
| 151 | 11 | 17 |
| 152 | 12 | 18 |
| 153 | 13 | 19 |
| 154 | 14 | 20 |
| 155 | 15 | 21 |
| 156 | 16 | 22 |
| 157 | 17 | 23 |
| 158 | 18 | 24 |
| 159 | 19 | 25 |
| 160 | 20 | 26 |
| 161 | 21 | 27 |

TABLE 6-continued

| $N_{ID}^{(1)}$ | $m_0$ | $m_1$ |
|---|---|---|
| 162 | 22 | 28 |
| 163 | 23 | 29 |
| 164 | 24 | 30 |
| 165 | 0 | 7 |
| 166 | 1 | 8 |
| 167 | 2 | 9 |

The values described in the tables 5 and 6 may be calculated based on following equation 18.

$$m_0 = m' \bmod 31 \quad \text{[Equation 18]}$$
$$m_1 = (m_0 + \lfloor m'/31 \rfloor + 1) \bmod 31$$
$$m' = N_{ID}^{(1)} + q(q+1)/2,$$
$$q = \left\lfloor \frac{N_{ID}^{(1)} + q'(q'+1)/2}{30} \right\rfloor,$$
$$q' = \lfloor N_{ID}^{(1)}/30 \rfloor$$

The function s(*) of the equation 17 may be defined as following equation 19.

$$s_0^{(m_0)} = \tilde{s}((n+m_0) \bmod 31)$$
$$s_1^{(m_1)} = \tilde{s}((n+m_1) \bmod 31) \quad \text{[Equation 19]}$$

Here, "$\tilde{s}(i)=1-2x(i)$, $0 \leq i \leq 30$" may be defined, and the function x(*) may be defined as following equation 20.

$$x(\bar{i}+5) = (x)(\bar{i}+2) + x(\bar{i}) \bmod 2, \; 0 \leq \bar{i} \leq 25 \quad \text{[Equation 20]}$$

In the equation 20, an initial condition may be "x(0)=0, x(1)=0, x(2)=0, x(3)=0, and x(4)=1." The function c(*) in the equation 17 may be defined as following equation 21.

$$c_0(n) = \tilde{c}((n+N_{ID}^{(2)}) \bmod 31)$$
$$c_1(n) = \tilde{c}((n+N_{ID}^{(2)}+3) \bmod 31) \quad \text{[Equation 21]}$$

The $N_{ID}^{(2)}$ may be a unique ID (or identification ID) in a cell group used for generating the PSS and have one of 0, 1, and 2. Here, "$\tilde{c}(t)=1-2x(i)$, $0 \leq i \leq 30$" may be defined, and the function x(*) may be defined as following equation 22.

$$x(\bar{i}+5) = (x(\bar{i}+3) + x(\bar{i})) \bmod 2, \; 0 \leq \bar{i} \leq 25 \quad \text{[Equation 22]}$$

In the equation 22, an initial condition may be "x(0)=0, x(1)=0, x(2)=0, x(3)=0, and x(4)=1." The function z(*) in the equation 17 may be defined as following equation 23.

$$z_1^{(m_0)}(n) = \tilde{z}((n+m_0 \bmod 8)) \bmod 31)$$
$$z_1^{(m_1)}(n) = \tilde{z}((n+m_1 \bmod 8)) \bmod 31) \quad \text{[Equation 23]}$$

The $m_0$ and the $m_1$ may be the values described in the tables 5 and 6. "$\tilde{z}(i)=1-2x(i)$, $0 \leq i \leq 30$" may be defined, and the function x(*) may be defined as following equation 24.

$$x(\bar{i}+5) = (x(\bar{i}+4) + x(\bar{i}+2) + x(\bar{i}+1) + x(\bar{i})) \bmod 2 \quad \text{[Equation 24]}$$

In the equation 24, an initial condition may be "x(0)=0, x(1)=0, x(2)=0, x(3)=0, and x(4)=1."

Transmission positions $\alpha_{k,l}$ of the SSS may be defined as following equation 25.

$$\alpha_{k,i} = d(n), n = 0, \ldots, 61 \quad \text{[Equation 25]}$$
$$k = n - 31 + \frac{N_{RB}^{DL} N_{SC}^{RB}}{2}$$
$$l = \begin{cases} N_{symb}^{DL} - 2, & \text{In the case of FDD system} \\ N_{symb}^{DL} - 1, & \text{In the case of TDD system} \end{cases}$$

The k may indicate a subcarrier number. The l may indicate an OFDM symbol number. The $N_{RB}^{DL}$ may indicate the total number of resource blocks in the downlink. The $N_{SC}^{RB}$ may indicate the number of subcarriers included in one resource block. The SSS may transmitted in positions indicated by the equation 25. In addition, the SSS may be allocated to the OFDM symbols illustrated in FIGS. 13 and 14 in the time domain. Meanwhile, the subframe indicated by following equation 26 may be used for the guard subframe. That is, the SSS may not be transmitted in the subcarrier indicated by the following equation 26.

$$k = n - 31 + \frac{N_{RB}^{DL} N_{SC}^{RB}}{2} \quad \text{[Equation 26]}$$
$$l = \begin{cases} N_{symb}^{DL} - 2, & \text{In the case of FDD system} \\ N_{symb}^{DL} - 1, & \text{In the case of TDD system} \end{cases}$$
$$n = -5, -4, \ldots, -1, 62, 63, \ldots, 66$$

Meanwhile, the base station may transmit a discovery signal or a discovery reference signal (DRS) for radio resource management (RRM), detection of time and frequency synchronization, and so on in the unlicensed band. In the network based on the FDD manner, the DRS may be configured in 1 to 5 subframes. In the network based on the TDD manner, the DRS may be configured in 2 to 5 subframes. The DRS may include the synchronization signal (e.g., PSS, SSS) and the reference signal (e.g., CRS, CSI-RS (e.g., non-zero power CSI-RS), and so on) corresponding to antenna port 0.

In the case that the DRS is configured in 2 or more subframes in the network based on the FDD manner, the PSS and the SSS may be transmitted through a first subframe. In the case that the DRS is configured in 2 or more subframes in the network based on the TDD manner, the SSS may transmitted through a first subframe and the PSS may be transmitted through a second subframe.

FIG. 15 is a conceptual diagram illustrating an embodiment of DRS configurations in a network based on a FDD manner.

Referring to FIG. 15, the DRS may include the synchronization signal (e.g., PSS, SSS) and the reference signal (e.g., CRS, CSI-RS, and so on) corresponding to antenna port 0. In the case that the CSI-RS may not be included in the DRS, the DRS may include the CRS, the PSS, and the SSS. In the slot #0 of the subframe #0, the CRS may be configured in the OFDM symbol #0, signals (e.g., reference signal or synchronization signal) may not be configured in the OFDM symbols #1 to 3, the CRS may be configured in the OFDM symbol #4, the SSS may be configured in the OFDM symbol #5, and the PSS may be configured in the OFDM symbol #6. The CSI-RS instead of the SSS and the PSS may be configured in the OFDM symbols #5 and 6 of the slot #0 in the subframe #0.

In the slot #1 of the subframe #0, the CRS may be configured in the OFDM symbol #0, signals (e.g., reference signal or synchronization signal) may not be configured in the OFDM symbol #1, the CSI-RS may be configured in the OFDM symbols #2 and 3, the CRS may be configured in the OFDM symbol #4, and the CSI-RS may be configured in the OFDM symbols #5 and 6.

The CRS and CSI-RS configurations in the subframes #1 to 4 may be identical to the CRS and CSI-RS configurations in the subframe #0. The PSS and SSS may not be configured in the subframes #1 to #4. The CSI-RS may be configured in OFDM symbols, which correspond to numbers of OFDM symbols in which the PSS and SSS of the subframe #0 are configured, among all OFDM symbols included in the subframes #1 to #4. Therefore, the CSI-RS instead of the PSS and SSS may be configured in the subframes #1 to #4. In this case, the number of subcarriers occupied by the CSI-RS may be configured to be different from the number of subcarriers occupied by the PSS and SSS.

FIG. 16 is a conceptual diagram illustrating an embodiment of DRS configurations in a network based on a TDD manner.

Referring to FIG. 16, the DRS may include the reference signal (e.g., CRS, CSI-RS, and so on) and synchronization signal (e.g., PSS, SSS). In the slot #0 of the subframe #0, the CRS may be configured in the OFDM symbol #0, signals (e.g., reference signal or synchronization signal) may not be configured in the OFDM symbols #1 to 3, the CRS may be configured in the OFDM symbol #4, and the CSI-RS may be configured in the OFDM symbols #5 and 6.

In the slot #1 of the subframe #0, the CRS may be configured in the OFDM symbol #0 and the CSI-RS may be configured in the OFDM symbols #1 to 3. Alternatively, in the slot #1 of the subframe #0, signals (e.g., reference signal or synchronization signal) may not be configured in the OFDM symbol #1 and the CSI-RS may be configured in the OFDM symbols #2 and 3. In the slot #1 of the subframe #0, the CRS may be configured in the OFDM symbol #4, the CSI-RS may be configured in the OFDM symbol #5, and the SSS may be configured in the OFDM symbol #6. Alternatively, the CSI-RS may be configured in the OFDM symbols #5 and 6 of the slot #1 in the subframe #0. That is, the CSI-RS instead of the SSS may be configured in the OFDM symbol #6 of the slot #1.

In the slot #2 of the subframe #1, the CRS may be configured in the OFDM symbol #0, signals (e.g., reference signal or synchronization signal) may not be configured in the OFDM symbol #1, the PSS may be configured in the OFDM symbol #2, and signals (e.g., reference signal or synchronization signal) may not be configured in the OFDM symbol #3. Alternatively, in the slot #2 of the subframe #1, the CSI-RS instead of the PSS may be configured in the OFDM symbol #2 and the CSI-RS may be configured in the OFDM symbol #3. In the slot #2 of the subframe #1, the CRS may be configured in the OFDM symbol #4 and the CSI-RS may be configured in the OFDM symbols #5 and 6.

In the slot #3 of the subframe #1, the CRS may be configured in the OFDM symbol #0 and the CSI-RS may be configured in the OFDM symbols #1 to 3. Alternatively, in the slot #3 of the subframe #1, signals (e.g., reference signal or synchronization signal) may not be configured in the OFDM symbol #1 and the CSI-RS may be configured in the OFDM symbols #2 and 3. In the slot #3 of the subframe #1, the CRS may be configured in the OFDM symbol #4 and the CSI-RS may be configured in the OFDM symbols #5 and 6.

The CRS, the PSS, the SSS, and the CSI-RS configurations in the subframes #2 to 4 may be identical to the CRS, the PSS, the SSS, and the CSI-RS configurations in the subframes #0 and 1. Alternatively, in the case that the PSS and the SSS may not be configured in the subframes #2 to 4, the CRS and the CSI-RS configurations in the subframes #2 to 4 may be identical to the CRS and the CSI-RS configurations in the subframes #0 and 1.

In the case that the PSS and the SSS are configured identically in the subframes #0 to 4, the SSS may be configured in the subframes #2 and 4, and the PSS may be configured in the subframe #3. Alternatively, the PSS may be configured in the subframes #2 and 4, and the SSS may be configured in the subframe #3. In the case that the PSS and the SSS are not configured in the subframes #2 to 4, the CSI-RS may be configured in OFDM symbols, which correspond to numbers of OFDM symbols in which the SSS of the subframe #0 and the PSS of the subframe #1 are configured respectively, among all OFDM symbols included in the subframes #2 to 4. In this case, the number of subcarriers occupied by the CSI-RS may be configured to be different from the number of subcarriers occupied by the PSS and the SSS.

The foregoing FIGS. 15 and 16 illustrate an embodiment of the DRS configurations when the DRS are configured in 5 subframes (e.g., subframes #0 to 4). In the case that the DRS are configured in 4 or less subframes, the DRS may be configured preferentially in a subframe having relatively low number. For example, in the case that the DRS are configured in 3 subframes, the DRS may be configured in the subframes #0 to 2, and the DRS configurations in the subframes #0 to 2 may be identical to the DRS configurations in the subframes #0 to 2 illustrated in FIGS. 15 and 16.

Meanwhile, the DRS configurations may be changed, if necessary. For example, the DRS may be configured based on the synchronization signal (e.g., PSS, SSS) and the reference signal (e.g., CRS, CSI-RS, and so on) corresponding to antenna ports 0 and 1. Alternatively, the DRS may be configured based on the synchronization signal (e.g., PSS, SSS) and the reference signal (e.g., CRS, CSI-RS, and so on) corresponding to antenna ports 0 to 3.

FIG. 17 is a conceptual diagram illustrating an embodiment of DRS configurations based on signals corresponding to antenna ports 0 and 1.

Referring to FIG. 17, the DRS may include the synchronization signal (e.g., PSS, SSS) and the reference signal (e.g., CRS, CSI-RS, and so on) corresponding to antenna ports 0 and 1. Here, the slot #0 may be a first slot included in an arbitrary subframe, and the slot #1 may be a second slot included in the arbitrary subframe. The CRS may be configured in the OFDM symbol #0 of the slot #0, signals (e.g., reference signal or synchronization signal) may not be configured in the OFDM symbols #1 to #3 of the slot #0, the CRS may be configured in the OFDM symbol #4 of the slot #0, the SSS may be configured in the OFDM symbol #5 of the slot #0, and the PSS may be configured in the OFDM symbol #6 of the slot #0. In addition, the CRS may be configured in the OFDM symbol #0 of the slot #1, signals (e.g., reference signal or synchronization signal) may not be configured in the OFDM symbol #1 of the slot #1, the CSI-RS may be configured in the OFDM symbols #2 and 3 of the slot #1, the CRS may be configured in the OFDM symbol #4 of the slot #1, and the CSI-RS may be configured in the OFDM symbols #5 and 6 of the slot #1.

Here, the DRS configurations in the subframe #0 has been described, but the DRS may be configured in maximum 5 subframes. In this case, the DRS configurations in the subframes #1 to 4 may be identical or similar to the foregoing DRS configurations in the subframe #0. In the case that an additional antenna port is used (e.g., multiple antenna ports are used), additional signals (e.g., CRS) may be transmitted through the subcarrier indicated by the equation 6. In addition, the DRS illustrated in FIG. 17 may be applied to the network based on the FDD or TDD manner.

FIG. 18 is a conceptual diagram illustrating an embodiment of DRS configurations based on signals corresponding to antenna ports 0 to 3.

Referring to FIG. 18, the DRS may include the synchronization signal (e.g., PSS, SSS) and the reference signal (e.g., CRS, CSI-RS, and so on) corresponding to antenna ports 0 to 3. Here, the slot #0 may be a first slot included in an arbitrary subframe, and the slot #1 may be a second slot included in the arbitrary subframe. The CRS may be configured in the OFDM symbols #0 and 1 of the slot #0, signals (e.g., reference signal or synchronization signal) may not be configured in the OFDM symbols #2 and #3 of the slot #0, the CRS may be configured in the OFDM symbol #4 of the slot #0, the SSS may be configured in the OFDM symbol #5 of the slot #0, and the PSS may be configured in the OFDM symbol #6 of the slot #0. In addition, the CRS may be configured in the OFDM symbols #0 and 1 of the slot #1, the CSI-RS may be configured in the OFDM symbols #2 and 3 of the slot #1, the CRS may be configured in the OFDM symbol #4 of the slot #1, and the CSI-RS may be configured in the OFDM symbols #5 and 6 of the slot #1.

The DRS illustrated in FIG. 18 further includes signals based on the antenna ports 2 and 3 in contrast to the DRS illustrated in FIG. 17, therefore, the CRS may be further configured in the OFDM symbol #1 of the slot #0 and the OFDM symbol #1 of the slot #1.

Here, the DRS configurations in the subframe #0 has been described, but the DRS may be configured in maximum 5 subframes. In this case, the DRS configurations in the subframes #1 to 4 may be identical or similar to the foregoing DRS configurations in the subframe #0. In the case that an additional antenna port is used (e.g., multiple antenna ports are used), additional signals (e.g., CRS) may be transmitted through the subcarrier indicated by the equation 6. In addition, the DRS illustrated in FIG. 18 may be applied to the network based on the FDD or TDD manner.

FIG. 19 is a conceptual diagram illustrating other embodiment of DRS configurations based on signals corresponding to antenna ports 0 to 3.

Referring to FIG. 19, the DRS may include the synchronization signal (e.g., PSS, SSS) and the reference signal (e.g., CRS, CSI-RS, and so on) corresponding to antenna ports 0 to 3. Here, the slot #0 may be a first slot included in an arbitrary subframe, and the slot #1 may be a second slot included in the arbitrary subframe. Here, the DRS may further include the CSI-RS which is configured in the OFDM symbols #2 and 3 of the slot #0 in contrast to the DRS illustrated in FIG. 18. The CSI-RS which is configured in the OFDM symbols #2 and 3 of the slot #0 may be transmitted through all subcarriers in the frequency domain (e.g., subcarriers #0 to 11) to be identical to the CSI-RS configured in the OFDM symbols #2 and 3 of the slot #1. Alternatively, the CSI-RS which is configured in the OFDM symbols #2 and 3 of the slot #0 may be transmitted through specific subcarriers in the frequency domain (e.g., subcarriers #2, 3, 8, and 9) to be identical to the CSI-RS configured in the OFDM symbols #5 and 6 of the slot #1.

Additional reference signals (e.g., CRS, CSI-RS, and so on) may be transmitted through at least one subcarrier in the corresponding OFDM symbol. For example, because signals (e.g., reference signal or synchronization signal) are not transmitted through the OFDM symbols #1 to 3 of the slot #0 in FIG. 17, the CSI-RS may be further configured in the OFDM symbols #1 to 3 of the slot #0. In addition, the DRS illustrated in FIG. 19 may be applied to the network based on the FDD or TDD manner.

Meanwhile, in the network based on the TDD manner, the reference signal (e.g., CRS, CSI-RS, and so on) may be further configured to be identical or similarly to the foregoing methods. For example, re-referring to FIG. 16, the reference signal (e.g., CRS, CSI-RS, and so on) may be further configured in the OFDM symbols #1 to 3 of the slot #0 in the subframe #0 and the OFDM symbols #1 and 3 of the slot #2 in the subframe #1.

FIG. 20 is a conceptual diagram illustrating other embodiment of DRS configurations in a network based on a TDD manner.

Referring to FIG. 20, the DRS may include the synchronization signal (e.g., PSS, SSS) and the reference signal (e.g., CRS, CSI-RS, and so on) corresponding to antenna ports 0 to 3. The CSI-RS may be further configured in the OFDM symbols #2 and 3 of the slot #0 in the subframe #0. The CSI-RS may be further configured in the OFDM symbols #1 and 3 of the slot #2 in the subframe #1. The CRS and the CSI-RS may be configured in the OFDM symbol #1 of the slot #2 in the subframe #1. Alternatively, the CRS or the CSI-RS may be configured in the OFDM symbol #1 of the slot #2 in the subframe #1.

The PSS and the SSS may be configured identically in the subframes #0 to 4. Alternatively, the PSS and the SSS may be configured differently in the subframes #0 to 4. In the case that the PSS and the SSS may be configured identically in the subframes #0 to 4, the DRS configurations of the subframes #2 and 4 may be identical to the DRS configurations of the subframe #0, and the DRS configurations of the subframe #3 may be identical to the DRS configurations of the subframe #1.

In the cast that the PSS and the SSS may be configured differently in the subframes #0 to 4 (e.g., PSS and SSS are not configured in the subframes #2 to 4), the CRS and the CSI-RS configurations in the subframes #2 to 4 may be identical to the CRS and the CSI-RS configurations in the subframes #0 and 1. In addition, the CSI-RS may be configured in OFDM symbols, which correspond to numbers of OFDM symbols in which the SSS of the subframe #0 and the PSS of the subframe #1 are configured respectively, all OFDM symbols included in the subframes #2 to 4. In this case, the number of subcarriers occupied by the CSI-RS may be configured to be different from the number of subcarriers occupied by the PSS and the SSS. For example, the number of subcarriers occupied by the CSI-RS may be less than 12 in one resource block.

Meanwhile, the DRS may be discontinuously transmitted, therefore, the CSI-RS may be separately configured in the subframe. A CSI-RS period may be configured based on the length of DRS duration. For example, the CSI-RS may be configured based on following equation 27. $\Delta_{CSI-RS}$ may indicate the CSI-RS period. $T_{DRS}$ may indicate the length of the DRS duration.

$$(10 n_f + \lfloor n_s/2 \rfloor - \Delta_{CSI-RS}) \bmod T_{DRS} = 0 \qquad \text{[Equation 27]}$$

The PSS and the SSS may be transmitted through all or some subcarriers among subcarriers occupied by the DRS. For example, the PSS and the SSS may be transmitted through subcarriers corresponding to 6 resource blocks.

FIG. 21 is a conceptual diagram illustrating an embodiment of PSS and SSS configurations.

Referring to FIG. 21, the DRS may include the reference signal (e.g., CRS, and so on) and the synchronization signal (e.g., PSS, SSS). The PSS and the SSS may be transmitted through bandwidth corresponding to one resource block among system bandwidth. In addition, the PSS and the SSS may be transmitted through a part of the system bandwidth as the equation 25. In the case that the PSS and the SSS are transmitted through some bandwidth, the CSI-RS may be transmitted through bandwidth, in which the PSS and the SSS are not transmitted, among the system bandwidth. The size of the bandwidth in which the PSS and the SSS are transmitted is not limited to the foregoing description, and the PSS and the SSS may be transmitted through bandwidth having variable size.

Meanwhile, for enhancing obtainment performance of the time and frequency synchronization based on the DRS, the PSS and the SSS may be repeatedly transmitted in the time and frequency domains.

FIG. 22 is a conceptual diagram illustrating other embodiment of PSS and SSS configurations.

Referring to FIG. 22, the DRS may include the reference signal (e.g., CRS, and so on) and the synchronization signal (e.g., PSS, SSS). The PSS and the SSS may be repeatedly transmitted in the frequency domain. The PSS and the SSS configurations may be applied to the network based on the FDD or TDD manner. For example, in the network based on the TDD manner, the PSS and the SSS may be transmitted through the system bandwidth or a part of the system bandwidth.

Meanwhile, in the case that the PSS and the SSS are transmitted through the system bandwidth, the PSS and the SSS which are transmitted 6 center resource blocks among the system bandwidth may be referred to as "basic PSS" and "basic SSS," respectively. In addition, the PSS and the SSS which are transmitted resource blocks except for 6 center resource blocks among the system bandwidth may be referred to as "extended PSS" and "extended SSS," respectively. The PSS occupying the system bandwidth may be configured by combining the basic PSS and the extended PSS, and referred to as "full-band PSS." The SSS occupying the system bandwidth may be configured by combining the basic SSS and the extended SSS, and referred to as "full-band SSS."

The extended PSS and the extended SSS may be generated based on the equations 14 to 26. That is, the full-band PSS including the basic PSS and the extended PSS may be a form that the basic PSS is repeatedly transmitted in the frequency domain. Transmission positions of the full-band PSS in the time and frequency domains may be defined as following equation 28.

$$\alpha_{k,i} = d(n), n = 0, \ldots, 61 \quad \text{[Equation 28]}$$
$$k = n - 31 + \frac{N_{RB}^{DL} N_{SC}^{RB}}{2} \pm 6\delta N_{SC}^{RB}, \delta = 0, \ldots, \beta$$

The $\beta$ may be defined as following equation 29.

$$\beta = \left\lfloor \frac{(N_{RB}^{\alpha}/2 - 3)}{6} \right\rfloor \quad \text{[Equation 29]}$$

Meanwhile, in the full-band PSS including the repeated basic PSS in the frequency domain, the guard subcarrier for the basic PSS may be repeated to be identical to the basic PSS in the frequency domain. The guard subcarrier for the full-band PSS may be defined as following equation 30.

$$k = n - 31 + \frac{N_{RB}^{DL} N_{SC}^{RB}}{2} \pm 6\delta N_{SC}^{RB}, \delta = 0, \ldots, \beta \quad \text{[Equation 30]}$$
$$n = -5, -4, \ldots, -1.62, 63, \ldots, 66$$

Similar to the full-band PSS, transmission positions of the full-band SSS may be defined in the time and frequency domains as following equation 31. $\beta$ in following equation 31 may be defined as the equation 29.

$$\alpha_{k,i} = d(n), n = 0, \ldots, 61 \quad \text{[Equation 31]}$$
$$k = n - 31 + \frac{N_{RB}^{DL} N_{SC}^{RB}}{2} \pm 6\delta N_{SC}^{RB}, \delta = 0, \ldots, \beta$$
$$l = \begin{cases} N_{symb}^{DL} - 2, & \text{In the case of } FDD \text{ system} \\ N_{symb}^{DL} - 1, & \text{In the case of } TDD \text{ system} \end{cases}$$

Meanwhile, in the full-band SSS including the repeated basic SSS in the frequency domain, the guard subcarrier for the basic SSS may be repeated to be identical to the basic SSS in the frequency domain. The guard subcarrier for the full-band SSS may be defined as following equation 32.

$$k = n - 31 + \frac{N_{RB}^{DL} N_{SC}^{RB}}{2} \pm 6\delta N_{SC}^{RB}, \delta = 0, \ldots, \beta \quad \text{[Equation 32]}$$
$$l = \begin{cases} N_{symb}^{DL} - 2, & \text{In the case of } FDD \text{ system} \\ N_{symb}^{DL} - 1, & \text{In the case of } TDD \text{ system} \end{cases}$$
$$n = -5, -4, \ldots, -1.62, 63, \ldots, 66$$

Meanwhile, the DRS may include the PSS and the SSS which are repeatedly configured in the time domain. In this case, the PSS and the SSS included in an existing DRS (i.e., DRS including the PSS and the SSS which are configured respectively in one OFDM symbol) may be referred to as "basic PSS" and "basic SSS," respectively. In addition, the PSS and the SSS which are further configured in the DRS except for the basic PSS and the basic SSS may be referred to as "additional PSS" and "additional SSS," respectively. The basic PSS may be identical to or different from the additional PSS. The basic SSS may be identical to or different from the additional SSS. That is, a plurality of PSS and a plurality of SSS may exist in time domain of the DRS, each of the plurality of PSS may be generated based on different sequences, and each of the plurality of SSS may be generated based on different sequences.

The basic PSS and the basic SSS may be used for existing functions such as detection of a cell ID, obtainment of time and frequency synchronization, and so on. The additional PSS and the additional SSS may be used for additional functions (e.g., stability of time and frequency synchronization, generation and detection of an additional cell ID, and so on). In the case of that it is necessary to identify the additional cell ID in contrast to the cell ID defined in the equation 13, the additional cell ID may be generated at least one of the additional PSS and the additional SSS, therefore, the additional cell ID may be detected at least one of the additional PSS and the additional SSS. The additional cell ID $N_{ID\_Add}^{Cell}$ based on the additional PSS and the additional SSS may be defined as following equation 33.

$$N_{ID\_Add}^{Cell} = 3N_{ID\_Add}^{(1)} + N_{ID\_ADD}^{(2)} \quad \text{[Equation 33]}$$

The $N_{ID\_Add}^{(1)}$ may be an additional cell group ID which is identified by the additional SSS. The $N_{ID\_ADD}^{(2)}$ may be an additional unique ID which is identified by the additional PSS. The additional cell ID may be detected using the additional PSS or the additional SSS because the additional cell ID is generated based on the additional PSS or additional SSS. Meanwhile, the number of available cell IDs may be increased by using both the existing cell ID and the additional cell ID. The extended cell ID may be configured as combinations of the existing cell ID and the additional cell ID. The extended cell ID $N_{ID\_Extend}^{Cell}$ may be defined as following equation 34.

$$N_{ID\_Extend}^{Cell} = 512 N_{ID}^{Cell} + N_{ID\_Add}^{Cell} \quad \text{[Equation 34]}$$

In addition, the additional cell ID based on the additional PSS may be defined as following equation 35.

$$N_{ID\_Add}^{Cell} = N_{ID\_ADD}^{(2)} \quad \text{[Equation 35]}$$

In addition, the additional cell ID based on the additional SSS may be defined as following equation 36.

$$N_{ID\_Add}^{Cell} = N_{ID\_ADD}^{(1)} \quad \text{[Equation 36]}$$

The additional PSS may be used for transmitting additional information besides functions related to the additional cell ID and the extended cell ID. For example, the additional PSS may be used for transmitting DRS related information (e.g., DRS length, the number of antenna ports corresponding to the CRS included in the DRS, and so on). In this case, the UE may identify the DRS related information by detecting the additional PSS. The DRS related information may be transmitted through the additional PSS which is generated based on different sequences. Functions of the additional SSS (e.g., functions for obtaining additional synchronization, detecting additional cell ID, detecting extended cell ID, and so on) may be indicated by the sequence of the additional PSS. In addition, the sequence of the additional PSS may indicate whether the DRS and the PDSCH are multiplexed in a current subframe.

FIG. 23 is a conceptual diagram illustrating an embodiment of PSS and SSS configurations which are repeated in a time domain.

Referring to FIG. 23, the DRS may include the reference signal (e.g., CRS, CSI-RS, and so on) and the synchronization signal (e.g., PSS, SSS). Here, the slot #0 may be a first slot included in an arbitrary subframe, and the slot #1 may be a second slot included in the arbitrary subframe. The SSS may be configured in the OFDM symbols #2 and 5 of the slot #0. The PSS may be configured in the OFDM symbols #3 and 6 of the slot #0. The additional PSS and additional SSS may be transmitted through OFDM symbols except for transmission positions of the CRS, the basic PSS and the basic SSS in the subframe. The transmission positions of the additional PSS and the additional SSS may be not limited to the foregoing description, and the additional PSS and the additional SSS may be transmitted through variable positions in the subframe. For example, the additional PSS and the additional SSS may be transmitted through the OFDM symbols #2-3 or the OFDM symbols #5-6 of the slot #1. Therefore, the PSS and the SSS may be repeatedly transmitted more than two times in one subframe. That is, the PSS and the SSS which are respectively repeated more than two times may be configured in one DRS.

Meanwhile, only PSS may be repeatedly configured in the DRS, or only SSS may be repeatedly configured in the DRS. In this case, the PSS or the SSS may be configured in OFDM symbols except for specific OFDM symbols in which the CRS is configured in the subframe. In addition, the sequences of the additional PSS and the additional SSS may be identical to the sequences of the basic PSS and the basic SSS included in the DRS. In the case that same PSS and SSS are repeatedly configured in the DRS, the OFDM symbol number in which the additional PSS and the additional SSS are configured (or relative positions of OFDM symbols in which the additional PSS and the additional SSS are configured in contrast to OFDM symbols in which the basic PSS and the basic SSS are configured) may be configured in advance. In this case, the UE may obtain the time synchronization without specific problems in view of DRS reception.

Meanwhile, a short DRS whose length is less than the length of the existing DRS may be configured. The short DRS may include the CRS, the PSS, and the SSS, and each of the CRS, the PSS, and the SSS may be configured in at least one OFDM symbol. The short DRS may further include the CSI-RS. In addition, the short DRS may not include at least one of the CRS and CSI-RS.

FIG. 24 is a conceptual diagram illustrating a first embodiment of DRS configurations.

Referring to FIG. 24, the DRS may include the reference signal (e.g., CRS, and so on) and the synchronization signal (e.g., PSS, SSS). Here, the slot #0 may be a first slot included in an arbitrary subframe, and the slot #1 may be a second slot included in the arbitrary subframe. The DRS may include the CRS configured in the OFDM symbol #4 of the slot #0, the SSS configured in the OFDM symbol #5 of the slot #0, the PSS configured in the OFDM symbol #6 of the slot #0, and the CRS configured in the OFDM symbol #0 of the slot #1. Therefore, the DRS may have the length of 4 OFDM symbols and may be the short DRS including minimum mandatory signals.

FIG. 25 is a conceptual diagram illustrating a second embodiment of DRS configurations.

Referring to FIG. 25, the DRS may include the synchronization signal (e.g., PSS, SSS) and the reference signal (e.g., CRS, and so on) corresponding to 4 antenna ports. Here, the slot #0 may be a first slot included in an arbitrary subframe, and the slot #1 may be a second slot included in the arbitrary subframe. The DRS may include the CRS configured in the OFDM symbol #4 of the slot #0, the SSS configured in the OFDM symbol #5 of the slot #0, the PSS configured in the OFDM symbol #6 of the slot #0, and the CRS configured in the OFDM symbols #0 and 1 of the slot #1. Therefore, the DRS may have the length of 5 OFDM symbols and may be the short DRS including minimum mandatory signals. The DRS illustrated in FIG. 25 may provide enhanced channel estimate performance and RRM performance in contrast to the DRS illustrated in FIG. 24.

FIG. 26 is a conceptual diagram illustrating a third embodiment of DRS configurations.

Referring to FIG. 26, the DRS may include the reference signal (e.g., CRS, CSI-RS, and so on) and the synchronization signal (e.g., PSS, SSS). Here, the slot #0 may be a first slot included in an arbitrary subframe, and the slot #1 may be a second slot included in the arbitrary subframe. Here, the DRS may further include the CSI-RS and the CRS in contrast to the DRS illustrated in FIG. 25. The DRS may include the CRS configured in the OFDM symbol #4 of the slot #0, the SSS configured in the OFDM symbol #5 of the slot #0, the PSS configured in the OFDM symbol #6 of the slot #0, the CRS configured in the OFDM symbols #0 and 1 of the slot #1, the CSI-RS configured in the OFDM symbols #2 and 3 of the slot #1, and the CRS configured in the OFDM symbol #4 of the slot #1. Alternatively, the CRS may not be configured in the OFDM symbol #4 of the slot #1.

The DRS may have the length of 8 OFDM symbols and may be the short DRS including minimum mandatory signals. Because the DRS further includes the CSI-RS, the DRS may be used for channel estimate based on the CSI-RS. The CRS configured in the OFDM symbol #4 of the slot #1 may be used for interpolating channel estimate information between CRSs.

FIG. 27 is a conceptual diagram illustrating a fourth embodiment of DRS configurations.

Referring to FIG. 27, the DRS may include the reference signal (e.g., CRS, CSI-RS, and so on) and the synchronization signal (e.g., PSS, SSS). Here, the slot #0 may be a first slot included in an arbitrary subframe, and the slot #1 may be a second slot included in the arbitrary subframe. Here, the DRS may further include the CSI-RS in contrast to the DRS illustrated in FIG. 26, therefore, enhanced channel estimate performance may be provided.

The DRS may include the CRS configured in the OFDM symbol #4 of the slot #0, the SSS configured in the OFDM symbol #5 of the slot #0, the PSS configured in the OFDM symbol #6 of the slot #0, the CRS configured in the OFDM symbols #0 and 1 of the slot #1, the CSI-RS configured in the OFDM symbols #2 and 3 of the slot #1, the CRS configured in the OFDM symbol #4 of the slot #1, and the CSI-RS configured in the OFDM symbols #5 and 6 of the slot #1. The DRS may have the length of 10 OFDM symbols and may be the short DRS including minimum mandatory signals.

FIG. 28 is a conceptual diagram illustrating a fifth embodiment of DRS configurations.

Referring to FIG. 28, the DRS may include the reference signal (e.g., CRS, CSI-RS, and so on) and the synchronization signal (e.g., PSS, SSS). Here, the slot #0 may be a first slot included in an arbitrary subframe, and the slot #1 may be a second slot included in the arbitrary subframe. The DRS may include the SSS configured in the OFDM symbol #5 of the slot #0, the PSS configured in the OFDM symbol #6 of the slot #0, the CRS configured in the OFDM symbols #0 and 1 of the slot #1, the CSI-RS configured in the OFDM symbols #2 and 3 of the slot #1, the CRS configured in the OFDM symbol #4 of the slot #1, and the CSI-RS configured in the OFDM symbols #5 and 6 of the slot #1. Alternatively, the CRS and the CSI-RS may not be configured in the slot #1. The DRS may have the length of 9 OFDM symbols and may be the short DRS including minimum mandatory signals. Because a starting part of the DRS includes the synchronization signal, the UE may detect other signals after detecting the synchronization signal in the DRS received from the base station.

FIG. 29 is a conceptual diagram illustrating a sixth embodiment of DRS configurations.

Referring to FIG. 29, the DRS may include the reference signal (e.g., CRS, and so on) and the synchronization signal (e.g., PSS, SSS). Here, the slot #0 may be a first slot included in an arbitrary subframe, and the slot #1 may be a second slot included in the arbitrary subframe. The DRS may include the SSS configured in the OFDM symbol #2 of the slot #0, the PSS configured in the OFDM symbol #3 of the slot #0, the CRS configured in the OFDM symbol #4 of the slot #0, the SSS configured in the OFDM symbol #5 of the slot #0, the PSS configured in the OFDM symbol #6 of the slot #0, and the CRS configured in the OFDM symbol #0 of the slot #1. The synchronization signal may be repeatedly configured in the DRS. For example, the SSS may be repeatedly transmitted through the OFDM symbols #2 and 5 of the slot #0, and the PSS may be repeatedly transmitted through the OFDM symbols #3 and 6 of the slot #0.

The DRS may have the length of 6 OFDM symbols and may be the short DRS including minimum mandatory signals. The SSS and the PSS which are respectively configured in the OFDM symbols #2 and 3 of the slot #0 may be used as an initial signal indicating a start of the DRS and may be used for obtainment of time and frequency synchronization, channel estimate, and so on. The SSS configured in the OFDM symbol #2 of the slot #0 may be identical to or different from the SSS configured in the OFDM symbol #5 of the slot #0. The PSS configured in the OFDM symbol #3 of the slot #0 may be identical to or different from the PSS configured in the OFDM symbol #6 of the slot #0. The synchronization signals which are transmitted through the OFDM symbols #2 and 3 of the slot #0 may be configured regardless of the subframe number in which the DRS is transmitted, in this case same signals may be transmitted through the OFDM symbols #2 and 3 of the slot #0 in each of all subframes.

FIG. 30 is a conceptual diagram illustrating a seventh embodiment of DRS configurations.

Referring to FIG. 30, the DRS may include the reference signal (e.g., CRS, and so on) and the synchronization signal (e.g., PSS, SSS). Here, the slot #0 may be a first slot included in an arbitrary subframe, and the slot #1 may be a second slot included in the arbitrary subframe. Here, the DRS may further include the CRS in contrast to the DRS illustrated in FIG. 29. The DRS may include the CRS configured in the OFDM symbols #0 and 1 of the slot #0, the SSS configured in the OFDM symbol #2 of the slot #0, the PSS configured in the OFDM symbol #3 of the slot #0, the CRS configured in the OFDM symbol #4 of the slot #0, the SSS configured in the OFDM symbol #5 of the slot #0, the PSS configured in the OFDM symbol #6 of the slot #0, and the CRS configured in the OFDM symbols #0 and 1 of the slot #1.

The DRS may have the length of 9 OFDM symbols and may be the short DRS including minimum mandatory signals. The CRS configured in the OFDM symbols #0 and 1 of the slot #0 may correspond to 4 antenna ports in the DRS. In addition, other CRS besides the CRS configured in the OFDM symbol #1 of the slot #1 may be further configured in the DRS by adding an antenna port. Therefore, channel estimate performance, RRM performance, and so on may be enhanced by configuring the additional CRS in the DRS.

FIG. 31 is a conceptual diagram illustrating an eighth embodiment of DRS configurations.

Referring to FIG. 31, the DRS may include the reference signal (e.g., CRS, CSI-RS, and so on) and the synchronization signal (e.g., PSS, SSS). Here, the slot #0 may be a first slot included in an arbitrary subframe, and the slot #1 may be a second slot included in the arbitrary subframe. Here, the DRS may further include the CRS and the CSI-RS in contrast to the DRS illustrated in FIG. 30. The DRS may include the CRS configured in the OFDM symbols #0 and 1 of the slot #0, the SSS configured in the OFDM symbol #2 of the slot #0, the PSS configured in the OFDM symbol #3 of the slot #0, the CRS configured in the OFDM symbol #4 of the slot #0, the SSS configured in the OFDM symbol #5 of the slot #0, the PSS configured in the OFDM symbol #6 of the slot #0, the CRS configured in the OFDM symbols #0 and 1 of the slot #1, the CSI-RS configured in the OFDM symbols #2 and 3 of the slot #1, and the CRS configured in the OFDM symbol #4 of the slot #1. Alternatively, the CRS may not be configured in the OFDM symbol #4 of the slot #1. The DRS may have the length of 12 OFDM symbols and may be the short DRS including minimum mandatory signals. Additional channel estimate may be available by the CSI-RS included in the DRS.

FIG. 32 is a conceptual diagram illustrating a ninth embodiment of DRS configurations.

Referring to FIG. 32, the DRS may include the reference signal (e.g., CRS, and so on) and the synchronization signal (e.g., PSS, SSS). Here, the slot #0 may be a first slot included in an arbitrary subframe, and the slot #1 may be a second slot included in the arbitrary subframe. Here, the DRS may further include the CRS, the PSS, and the SSS in contrast to the DRS illustrated in FIG. 25. The DRS may include the CRS configured in the OFDM symbol #4 of the slot #0, the SSS configured in the OFDM symbol #5 of the slot #0, the PSS configured in the OFDM symbol #6 of the slot #0, the CRS configured in the OFDM symbols #0 and 1 of the slot #1, the SSS configured in the OFDM symbol #2 of the slot #1, the PSS configured in the OFDM symbol #3 of the slot #1, and the CRS configured in the OFDM symbol #4 of the slot #1. Alternatively, the CRS may not be configured in the OFDM symbol #4 of the slot #1.

The DRS may have the length of 8 OFDM symbols and may be the short DRS including minimum mandatory signals. The synchronization signals (e.g., additional PSS, additional SSS) may be repeatedly transmitted through the OFDM symbols #2 and 3 of the slot #1 in the DRS. The SSS configured in the OFDM symbol #2 of the slot #1 may be identical to or different from the SSS configured in the OFDM symbol #5 of the slot #0. The PSS configured in the OFDM symbol #3 of the slot #1 may be identical to or different from the PSS configured in the OFDM symbol #6 of the slot #0.

FIG. 33 is a conceptual diagram illustrating a tenth embodiment of DRS configurations.

Referring to FIG. 33, the DRS may include the reference signal (e.g., CRS, and so on) and the synchronization signal (e.g., PSS, SSS). Here, the slot #0 may be a first slot included in an arbitrary subframe, and the slot #1 may be a second slot included in the arbitrary subframe. Here, the DRS may be configured to include some signals included the DRS illustrated in FIG. 30. DRS may include the CRS configured in the OFDM symbols #0 and 1 of the slot #0, the SSS configured in the OFDM symbol #2 of the slot #0, the PSS configured in the OFDM symbol #3 of the slot #0, the CRS configured in the OFDM symbol #4 of the slot #0, the SSS configured in the OFDM symbol #5 of the slot #0, and the PSS configured in the OFDM symbol #6 of the slot #0. The DRS may have the length of 7 OFDM symbols and may be the short DRS including minimum mandatory signals. Here, the reference signal and the synchronization signal may not be configured in the slot #1.

FIG. 34 is a conceptual diagram illustrating an eleventh embodiment of DRS configurations.

Referring to FIG. 34, the DRS may include the reference signal (e.g., CRS, CSI-RS, and so on) and the synchronization signal (e.g., PSS, SSS). Here, the slot #0 may be a first slot included in an arbitrary subframe, and the slot #1 may be a second slot included in the arbitrary subframe. Here, the DRS may further include the CRS, the PSS, the SSS, and the CSI-RS in contrast to the DRS illustrated in FIG. 24. The DRS may include the CRS configured in the OFDM symbol #4 of the slot #0, the SSS configured in the OFDM symbol #5 of the slot #0, the PSS configured in the OFDM symbol #6 of the slot #0, the CRS configured in the OFDM symbols #0 and 1 of the slot #1, the CSI-RS configured in the OFDM symbols #2 and 3 of the slot #1, the CRS configured in the OFDM symbol #4 of the slot #1, the SSS configured in the OFDM symbol #5 of the slot #1, and the PSS configured in the OFDM symbol #6 of the slot #1.

The DRS may have the length of 10 OFDM symbols and may be the short DRS including minimum mandatory signals. The additional SSS and the additional PSS may be transmitted through the OFDM symbols #5 and 6 of the slot #1. The SSS configured in the OFDM symbol #5 of the slot #1 may be identical to or different from the SSS configured in the OFDM symbol #5 of the slot #0. The PSS configured in the OFDM symbol #6 of the slot #1 may be identical to or different from the PSS configured in the OFDM symbol #6 of the slot #0.

FIG. 35 is a conceptual diagram illustrating a twelfth embodiment of DRS configurations.

Referring to FIG. 35, the DRS may include the reference signal (e.g., CRS, and so on) and the synchronization signal (e.g., PSS, SSS). Here, the slot #0 may be a first slot included in an arbitrary subframe, and the slot #1 may be a second slot included in the arbitrary subframe. Here, the DRS may be configured to include some signals included in the DRS illustrated in FIG. 34. The DRS may include the SSS configured in the OFDM symbol #5 of the slot #0, the PSS configured in the OFDM symbol #6 of the slot #0, the CRS configured in the OFDM symbols #0 and 1 of the slot #1, the CSI-RS configured in the OFDM symbols #2 and 3 of the slot #1, the CRS configured in the OFDM symbol #4 of the slot #1, the SSS configured in the OFDM symbol #5 of the slot #1, and the PSS configured in the OFDM symbol #6 of the slot #1.

The DRS may have the length of 9 OFDM symbols and may be the short DRS including minimum mandatory signals. The CRS may not be configured in the OFDM symbol #4 of the slot #0, in this case the synchronization signal may be located in a starting part of the DRS. The synchronization signal configured in the OFDM symbols #5 and 6 of the slot #0 may be used for detecting the DRS, informing a start of the DRS, and so on. In this case, substantive DRS may include the signals configured in the slot #1. The SSS configured in the OFDM symbol #5 of the slot #0 may be identical to or different from the SSS configured in the OFDM symbol #5 of the slot #1, and the PSS configured in the OFDM symbol #6 of the slot #0 may be identical to or different from the PSS configured in the OFDM symbol #6 of the slot #1.

Methods for transmitting and receiving the foregoing DRS will be described below.

FIG. 36 is a sequence chart illustrating an embodiment of a method for transmitting and receiving a DRS.

Referring to FIG. 36, each of the base station and the UE may support the licensed band (e.g., primary cell (PCell)) and the unlicensed band (e.g., secondary cell (SCell)). The timing of the radio frame and the subframe in the unlicensed band may be identical to or different from the timing the radio frame and the subframe in the licensed band. For example, in the case that the carrier aggregation (CA) is used, the timing of the radio frame and the subframe in the unlicensed band may be identical to the timing the radio frame and the subframe in the licensed band. The wireless communication network illustrated in FIGS. 1 to 4 may consist of the base station and the UE. Each of the base station and the UE may identical or similar to the communication node 500 illustrated in FIG. 5.

The base station may transmit discovery signal measurement timing configuration (DMTC) related information to the UE (S3600). The DMTC related information may be transmitted through the licensed band or the unlicensed band. For example, the DMTC related information may be transmitted to the UE through RRC signaling in the licensed band. Alternatively, the DMTC related information may be transmitted to the UE through a control channel (e.g., PDCCH, EPDCCH, and so on) in the licensed band or the unlicensed band. The DMTC related information may include a DMTC period, DMTC duration, a DMTC offset (e.g., start time of the DMTC duration), a DRS transmission period, DRS duration, and so on. For example, the DMTC related information may include only the DMTC period and the DMTC offset. The information included in the DMTC related information may not be limited to the foregoing description, and the DMTC related information may include variable information to be needed for transmitting and receiving the DRS. The DMTC period, the DMTC duration, the DMTC offset, the DRS transmission period, and the DRS duration may be defined as follows.

FIG. 37 is a timing diagram illustrating DRS transmission/reception timing indicated by DMTC related information.

Referring to FIG. 37, the start time of the DMTC duration may be configured based on the DMTC period and the DMTC offset. The DMTC duration may include a plurality of subframes. For example, the length of the DMTC duration may be 6 ms, in this case the DMTC duration may include 6 subframes. The DRS may be transmitted through an arbitrary subframe among the plurality of subframes included in the DMTC duration. Duration in which the DRS is transmitted in the DMTC duration may be referred to as "DRS duration." The DMTC period may be one of 40 ms, 80 ms, 160 ms, and so on. The DMTC period may not be limited to the foregoing description and may be configured variable. For example, the DMTC period may be configured less than 40 ms or more than 160 ms. Regarding DMTC offset configurations, a variable T may be defined as following equation 37.

$$T = \text{DMTC PERIOD}/10 \qquad \text{[Equation 37]}$$

The DMTC duration may be initiated at the subframe indicated by following equation 39 in the radio frame indicated by the variable T and following equation 38. In the equation 38, FLOOR(X) may indicate a minimum integer which is more than X.

$$\text{RADIO FRAME NUMBER} \bmod T = \text{FLOOR}(\text{DMTC OFFSET}/10) \qquad \text{[Equation 38]}$$

$$\text{SUBFRAME NUMBER} = \text{DMTC OFFSET} \bmod 10 \qquad \text{[Equation 39]}$$

The DRS duration may be configured in the DMTC duration. The DRS duration may include a plurality of subframes. For example, the DRS duration may include 5 subframes. The DRS duration may be configured based on the DRS transmission period. The DRS may be transmitted through the DRS duration. The transmission time of the DRS may be determined based on timing of a cell in which the DRS is transmitted.

Re-referring to FIG. 36, the UE may receive the DMTC related information from the base station and identify the transmission time of the DRS based on the DMTC related information (S3610). For example, in the case that the DMTC related information includes the DMTC period and the DMTC offset, the UE may identify the DMTC duration based on the DMTC period and the DMTC offset, and determine that the DRS is transmitted through an arbitrary subframe among the plurality of subframes included in the DMTC duration. Alternatively, in the case that the DMTC related information includes the DRS duration and the DRS transmission period, the UE may determine that the DRS is transmitted through the DRS duration. In this case, the UE may determine that the DRS is transmitted based on the DRS transmission period.

The base station may transmit the DRS to the UE through the arbitrary subframe among the plurality of subframes included in the DMTC duration indicated by the DMTC related information (S3620). Alternatively, the base station may transmit the DRS to the UE through the DRS duration. Here, the DRS may be at least one DRS illustrated in FIGS. 15 to 35 and may be transmitted through the unlicensed band.

The base station may basically transmit the DRS according to the DRS transmission period. However, a case in which the DRS cannot be transmitted according to the DRS transmission period by features of the unlicensed band (e.g., resources corresponding to the DRS duration are occupied by other communication node in the unlicensed band) may be occurred. In this case, the base station may transmit the DRS through a subframe prior to the DRS duration in the DMTC duration. Alternatively, the base station may transmit the DRS through a subframe after the DRS duration in the DMTC duration (i.e., DRS delay transmission). The DRS delay transmission may be performed as follows.

FIG. 38 is a timing diagram illustrating an embodiment of DRS delay transmission.

Referring to FIG. 38, in the case that a first transmission time of the DRS is $t_0$ and the DRS transmission period is P, a second transmission time of the DRS is "$t_0+P$." However, in the case that transmission of the DRS is impossible at "$t_0+P$," the DRS may be transmitted at "$t_0+P+a$" which is delayed as a. Here, a may be multiple of slot length (e.g., 0.5 m) or subframe length (e.g., 1 m). A third transmission time of the DRS may be determined based on the first transmission time and the DRS transmission period regardless of the second transmission time. For example, the DRS may be transmitted at "$t_0+2P$" as the third transmission time. Meanwhile, it is preferable that the DRS is transmitted in preconfigured maximum delay duration though the DRS delay transmission is allowed. The maximum delay duration may be configured as follows.

FIG. 39 is a timing diagram illustrating an embodiment of a delay period of a DRS.

Referring to FIG. 39, the DRS may be transmitted at $t_0$ as the first transmission time. In the case that the DRS transmission is impossible at "$t_0+P$" as the second transmission time, the DRS transmission may be delayed until a time that the DRS duration may be terminated in the DMTC duration. For example, in the case that the DMTC duration is from $t_s$ to "$t_s+D$" and the length of the DRS duration is r, the maximum delay duration may be "$(t_s+D)-(t_0+P)-r$." Therefore, the DRS transmission should be initiated in "$(t_s+D)-(t_0+P)-r$." Alternatively, the DRS transmission may be delayed until a time that the DRS duration may be terminated prior to Xms from an end time of the DMTC duration. In this case, the maximum delay duration may be "$(t_s+D)-(t_0+P)-r-\text{Xms}$." Here, Xms may be one of 0.5 ms, 1 ms, and so on. Therefore, the DRS transmission should be initiated in "$(t_s+D)-(t_0+P)-r-\text{Xms}$." A third transmission time of the DRS may be determined based on the first transmission time and the DRS transmission period regardless of the second transmission time. For example, the DRS may be transmitted at "$t_0+2P$" as the third transmission time.

FIG. 40 is a timing diagram illustrating other embodiment of a delay period of a DRS.

Referring to FIG. 40, the DRS may be transmitted at $t_0$ as the first transmission time. In the case that the DRS transmission is impossible at "$t_0+P$" as the second transmission time, the DRS transmission may be delayed until the end time of the DMTC duration. For example, in the case that the DMTC duration is from $t_s$ to "$t_s+D$" and the length of the DRS duration is r, the maximum delay duration may be "$(t_s+D)-(t_0+P)$." Therefore, the DRS transmission should be initiated in "$(t_s+D)-(t_0+P)$." Alternatively, the DRS transmission may be delayed until a time prior to Xms from the end time of the DMTC duration. In this case, the maximum delay duration may be "$(t_s+D)-(t_0+P)-$Xms." Here, Xms may be one of 0.5 ms, 1 ms, and so on. Therefore, the DRS transmission should be initiated in "$(t_s+D)-(t_0+P)-$Xms." A third transmission time of the DRS may be determined based on the first transmission time and the DRS transmission period regardless of the second transmission time. For example, the DRS may be transmitted at "$t_0+2P$" as the third transmission time.

Alternatively, the DRS may be transmitted out of the DMTC duration. In this case, the DRS may be transmitted in the maximum delay duration. Here, the maximum delay duration may be configured as multiple of the DMTC duration, half of the DRS transmission period, and so on. In the case that the DRS transmission is impossible in the foregoing maximum delay duration, the corresponding DRS may not be transmitted.

In the case that the DRS transmission is delayed, a sequence used for generating the SSS included in the DRS (hereinafter, referred to as "SSS sequence"), a CRS sequence, and so on will be described below. In the case that the DRS transmission is delayed, the DRS may be transmitted through a subframe except for the subframes #0 and 5. The SSS sequence for the DRS whose transmission is delayed (hereinafter, referred to as "delayed DRS") may be identical to the SSS sequence used for the DRS whose transmission is not delayed (e.g., the DRS is transmitted through the subframes #0 or 5).

For example, in the case that the DRS is transmitted through at least one of subframes #1 to 4 (i.e., DRS transmission is delayed), the SSS sequence for the delayed DRS may be identical to the SSS sequence for the DRS which is transmitted through the subframe #0 as following equation 40. In addition, in the case that the DRS is transmitted through at least one of subframes #6 to 9 (i.e., DRS transmission is delayed), the SSS sequence for the delayed DRS may be identical to the SSS sequence for the DRS which is transmitted through the subframe #5 as following equation 40. Following equation 40 may be generated based on the equation 17.

$$d(2n) = \begin{cases} s_0^{(m_0)}(n)c_0(n), & \text{Subframes\#0 to 4} \\ s_1^{(m_1)}(n)c_0(n), & \text{Subframes\#5 to 9} \end{cases}$$

$$d(2n+1) = \begin{cases} s_1^{(m_1)}(n)c_1(n)z_1^{(m_0)}, & \text{Subframes\#0 to 4} \\ s_0^{(m_0)}(n)c_1(n)z_1^{(m_1)}, & \text{Subframes\#5 to 9} \end{cases}$$

[Equation 40]

The SSS sequence for the DRS may be generated regardless of a subframe number in which the DRS is transmitted. In this case, the SSS sequence for the DRS may be generated based on the sequence corresponding to the subframe #0 or 5 in the equation 17.

Meanwhile, the CRS sequence for the delayed DRS may be configured as follows. Referring to the equation 1, the CRS sequence may be generated based on a cell ID, a slot number, an OFDM symbol number, and so on. Here, the slot number is related to the subframe number, and the slot number and the subframe number may be estimated by detecting the SSS included in the DRS.

The time synchronization obtained from signals which are received in the unlicensed band (e.g., unlicensed band burst) or the time synchronization obtained from signals which are received in the licensed band may be referred to as "burst time synchronization." The time synchronization obtained from the SSS included in the DRS may be referred to as "DRS time synchronization." In the case that the DRS is transmitted through a subframe except for the subframes #0 and 5 (i.e., DRS transmission is delayed), the burst time synchronization may be different from the DRS time synchronization.

FIG. 41 is a conceptual diagram illustrating subframe numbers based on each of burst time synchronization and DRS time synchronization.

Referring to FIG. 41, the DRS which is configured based on the SSS configured in the subframe #0 according to the burst time synchronization may be transmitted through the subframe #1 according to the burst time synchronization. In a receiving phase, the UE may receive the DRS and identify that the subframe number in which the DRS is received is the subframe #0 (i.e., subframe #0 according to the DRS time synchronization). In this case, the UE may detect the CRS included in the DRS using the CRS sequence which is generated based on the subframe #0, slot numbers included in the corresponding subframe #0, and so on according to the DRS time synchronization.

Alternatively, the UE may identify that the subframe number in which the DRS is received is the subframe #1 (i.e., subframe #1 according to the burst time synchronization) according to the burst time synchronization regardless of the DRS time synchronization. In this case, the UE may detect the CRS included in the DRS using the CRS sequence which is generated based on the subframe #1, slot numbers included in the corresponding subframe #1, and so on according to the burst time synchronization.

Meanwhile, in a transmitting phase, the base station may generate the CRS included in the DRS using a subframe number, slot numbers included in the corresponding subframe, and so on according to the burst time synchronization. In this case, the CRS sequence may be generated based on the equations 1 to 4. Alternatively, the base station may generate the CRS included in the DRS using a subframe number, slot numbers included in the corresponding subframe, and so on according to the DRS time synchronization. In this case, the subframe number used for generating the CRS included in the DRS may be as follows.

FIG. 42 is a conceptual diagram illustrating a first embodiment of subframe numbers which are used for generating and detecting a CRS included in a DRS.

Referring to FIG. 42, in the case that the DRS is transmitted through at least one of subframes #0 to 4, the SSS sequence may be generated based on the subframe #0, and so on. In the case that the DRS is transmitted through at least one of subframes #5 to 9, the SSS sequence may be generated based on the subframe #5, and so on. The subframe number used for generating the CRS sequence may be identical to the subframe number according to the burst time synchronization. In this case, the base station may generate the CRS using the CRS sequence which is generated based on the subframe number, the slot numbers included in the corresponding subframe, and so on according to the burst time synchronization. The UE may detect the CRS using the CRS sequence which is generated based on the subframe number, the slot numbers included in the corresponding subframe, and so on according to the burst time synchronization.

FIG. 43 is a conceptual diagram illustrating a second embodiment of subframe numbers which are used for generating and detecting a CRS included in a DRS.

Referring to FIG. 43, in the case that the DRS is transmitted through at least one of subframes #0 to 4, the SSS sequence may be generated based on the subframe #0, and so on. In the case that the DRS is transmitted through at least one of subframes #5 to 9, the SSS sequence may be generated based on the subframe #5, and so on. The subframe number used for generating the CRS sequence may be identical to the subframe number used for generating the SSS sequence. In this case, the CRS sequence may be generated based on the equations 1, 2, 3, and 41.

$$C_{init}=2^{10}\cdot(7\cdot(\bar{n}_s+1)+l+1)\cdot(2\cdot N_{ID}^{cell}+1)+2\cdot N_{ID}^{cell}+N_{CP} \quad \text{[Equation 41]}$$

The $\bar{n}_s$ may indicate a slot number included in the subframe used for generating the SSS sequence. For example, in the case that the SSS sequence is generated based on the equation 40, the CRS sequence for the DRS which is transmitted through at least one of subframes #0 to 4 may be generated based on the slots #0 and 1 included in the subframe #0. In addition, the CRS sequence for the DRS which is transmitted through at least one of subframes #5 to 9 may be generated based on the slots #10 and 11 included in the subframe #5.

Therefore, the base station may generate the CRS using the CRS sequence which is generated based on the subframe number, the slot numbers included in the corresponding subframe, and so on used for generating the SSS sequence. The UE may obtain the DRS time synchronization by detecting the SSS included in the DRS and detect the CRS included in the DRS based on the DRS time synchronization.

Meanwhile, in the case that the CRS sequence is generated based on the subframe number used for generating the SSS sequence, and the DRS and a channel used for transmitting other information (e.g., PDCCH, EPDCCH, PDSCH, and so on) are multiplexed, thereby occurring exceptional situations as follows.

FIG. 44 is a conceptual diagram illustrating a third embodiment of subframe numbers which are used for generating and detecting a CRS included in a DRS.

Referring to FIG. 44, in the case that PDSCH (or PDCCH, EPDCCH, and so on) is transmitted through a subframe prior to or after a specific subframe in which the DRS is transmitted, the CRS sequence for the DRS may be generated based on the subframe number, the slot numbers included in the corresponding subframe, and so on used for generating the SSS sequence. In addition, the CRS sequence for a subframe in which PDSCH is configured may be generated based on the subframe number, the slot numbers included in the corresponding subframe, and so on according to the burst time synchronization. In this case, the UE may obtain the DRS time synchronization by detecting the SSS included in the DRS and detect the CRS included in the DRS using the subframe number, the slot numbers included in the corresponding subframe, and so on according to the DRS time synchronization. In addition, the UE may detect the CRS from the subframe in which PDSCH is configured using the subframe number, the slot numbers included in the corresponding subframe, and so on according to the burst time synchronization.

FIG. 45 is a conceptual diagram illustrating a fourth embodiment of subframe numbers which are used for generating and detecting a CRS included in a DRS.

Referring to FIG. 45, in the case that PDSCH (or PDCCH, EPDCCH, and so on) is transmitted through a subframe prior to or after a specific subframe in which the DRS is transmitted, the CRS sequences for the DRS and the subframe in which PDSCH is configured may be generated using the subframe number, the slot numbers included in the corresponding subframe, and so on according to the burst time synchronization. In this case, the UE may detect the CRS from the subframe in which the DRS and PDSCH are configured using the CRS sequence which is generated based on the subframe number, the slot numbers included in the corresponding subframe, and so on according to the burst time synchronization.

FIG. 46 is a conceptual diagram illustrating a fifth embodiment of subframe numbers which are used for generating and detecting a CRS included in a DRS.

Referring to FIG. 46, in the case that PDSCH (or PDCCH, EPDCCH, and so on) is transmitted through a subframe prior to or after a specific subframe in which the DRS is transmitted, the CRS sequences for the DRS and the subframe in which PDSCH is configured may be generated using the subframe number, the slot numbers included in the corresponding subframe, and so on used for generating the SSS sequence. In this case, the UE may obtain the DRS time synchronization by detecting the SSS included in the DRS and detect the CRS from the subframe in which the DRS and PDSCH are configured using the subframe number, the slot numbers included in the corresponding subframe, and so on according to the DRS time synchronization.

FIG. 47 is a conceptual diagram illustrating a sixth embodiment of subframe numbers which are used for generating and detecting a CRS included in a DRS.

Referring to FIG. 47, in the case that PDSCH (or PDCCH, EPDCCH, and so on) is transmitted through a subframe prior to or after a specific subframe in which the DRS is transmitted, the CRS sequence for the DRS may be generated based on the subframe number, the slot numbers included in the corresponding subframe, and so on used for generating the SSS sequence. According to the DRS time synchronization, it may be determined that the DRS is transmitted through the subframe #0. The subframe number prior to the subframe #0 in which the DRS is transmitted may be decreased by one. For example, the subframe number prior to the subframe #0 in which the DRS is transmitted may be configured sequentially as #9, 8, 7, 6, 5, 4, 3, 2, 1, and so on. In addition, the subframe number after the subframe #0 in which the DRS is transmitted may be increased by one. For example, the subframe number after the subframe #0 in which the DRS is transmitted may be configured sequentially as #1, 2, 3, 4, 5, 6, 7, 8, 9, and so on.

The CRS sequence for the subframe in which PDSCH is configured may be generated based on the foregoing subframe number. The CRS sequence for the subframe prior to the subframe #0, in which the DRS is transmitted, among the subframes in which PDSCH is configured may be generated based on the subframe #9, the slots #18 and 19 included in the subframe #19, and so on. The CRS sequences for the subframes after the subframe #0, in which the DRS is transmitted, among the subframes in which PDSCH is configured may be generated based on the subframes #1 and 2, the slots #2 to 5 included in the subframes #1 and 2, and so on. In this case, the UE may detect the CRS included in the DRS using the CRS sequence which is generated based on the subframe #0, the slots #0 and 1 included in the subframe #0, and so on, and may detect the CRS from the subframes in which PDSCH is configured using the CRS sequence which is generated based on the subframes #9 and 1-2, the slots #18-19 and 2-5 included in the subframes #9 and 1-2, and so on.

Re-referring to FIG. 36, the UE may receive the DRS from the base station. The DRS may be received from an arbitrary subframe among subframes included in the DMTC duration. The UE may detect the synchronization signal and the reference signal from the DRS using the foregoing sequence. The UE may obtain the time and frequency synchronization using the detected synchronization signal and perform the RRM, the channel estimate, the channel quality measurement, and so on using the detected reference signal (S3630).

The embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

The invention claimed is:

1. An operation method of a user equipment (UE) supporting an unlicensed band, the operation method comprising:
receiving, from a base station, discovery signal measurement timing configuration (DMTC) related information including a DMTC period and a DMTC offset;
identifying a DMTC duration, in which a discovery reference signal (DRS) including a cell-specific reference signal (CRS), a primary synchronization signal (PSS), and a secondary synchronization signal (SSS) is transmitted, based on the DMTC related information;
detecting the PSS and the SSS included in the DRS which is transmitted from the base station;
calculating a bit sequence of the CRS based on a slot number which is determined based on a subframe in which the SSS is detected; and
measuring the CRS included in the DRS using the bit sequence,
wherein a radio frame includes subframes #0 to 9, the bit sequence is calculated using the slot number which belongs to the subframe #0 when the SSS is detected in one subframe among the subframes #1 to 4, and the bit sequence is calculated using the slot number which belongs to the subframe #5 when the SSS is detected in one subframe among the subframes #6 to 9.

2. The operation method of claim 1, wherein the DRS further includes a channel state information-reference signal (CSI-RS).

3. The operation method of claim 1, wherein the CRS corresponds to antenna port 0.

4. The operation method of claim 1, wherein the PSS is configured in the subframe #0 or 5.

5. The operation method of claim 1, wherein, when the SSS is configured in at least one of the subframes #1 to 4, the SSS uses a sequence for an existing SSS to be configured in the subframe #0.

6. The operation method of claim 1, wherein, when the SSS is configured in at least one of the subframes #6 to 9, the SSS uses a sequence for an existing SSS to be configured in the subframe #5.

7. An operation method of a base station in a communication network, the operation method comprising:
transmitting configuration information indicating a discovery signal measurement timing configuration (DMTC) duration;
generating a primary synchronization signal (PSS) and a secondary synchronization signal (SSS);
calculating a bit sequence of a cell-specific reference signal (CRS) based on a slot number which is determined based on a subframe to be used for transmitting the SSS;
generating the CRS using the bit sequence; and
transmitting a discovery reference signal (DRS) including the PSS, the SSS, and the CRS in the DMTC duration of an unlicensed band,
wherein a radio frame includes subframes #0 to 9, the bit sequence is calculated using the slot number which belongs to the subframe #0 when the SSS is transmitted in one subframe among the subframes #1 to 4, and the bit sequence is calculated using the slot number which belongs to the subframe #5 when the SSS is transmitted in one subframe among the subframes #6 to 9.

8. The operation method of claim 7, wherein the DRS further includes a channel state information-reference signal (CSI-RS).

9. The operation method of claim 7, wherein the CRS corresponds to antenna port 0.

10. The operation method of claim 7 wherein the PSS is configured in the subframe #0 or 5.

11. The operation method of claim 7, wherein, when the SSS is configured in at least one of the subframes #1 to 4, the SSS uses a sequence for an existing SSS to be configured in the subframe #0.

12. The operation method of claim 7, wherein, when the SSS is configured in at least one of the subframes #6 to 9, the SSS uses a sequence for an existing SSS to be configured in the subframe #5.

* * * * *